US010220591B2

(12) United States Patent
Montagnani et al.

(10) Patent No.: US 10,220,591 B2
(45) Date of Patent: Mar. 5, 2019

(54) EMBOSSING-LAMINATING DEVICE

(71) Applicant: Fabio Perini S.p.A., Lucca (IT)

(72) Inventors: Franco Montagnani, Palaia (IT); Alessandro Muchetti, Capannori (IT); Mauro Ricci, S. Pietro a Vico (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 15/301,439

(22) PCT Filed: Apr. 1, 2015

(86) PCT No.: PCT/EP2015/057171
§ 371 (c)(1),
(2) Date: Oct. 3, 2016

(87) PCT Pub. No.: WO2015/150452
PCT Pub. Date: Oct. 8, 2015

(65) Prior Publication Data
US 2017/0028666 A1    Feb. 2, 2017

(30) Foreign Application Priority Data
Apr. 4, 2014    (IT) ................. FI2014A0075

(51) Int. Cl.
*B31F 1/07* (2006.01)
*B32B 37/12* (2006.01)
*B31F 1/28* (2006.01)

(52) U.S. Cl.
CPC ................ *B31F 1/07* (2013.01); *B32B 37/12* (2013.01); *B31F 1/2868* (2013.01); *B31F 2201/0728* (2013.01); *B31F 2201/0753* (2013.01); *B31F 2201/0776* (2013.01); *B32B 2317/12* (2013.01); *B32B 2432/00* (2013.01)

(58) Field of Classification Search
None
See application file for complete search history.

(56) References Cited

U.S. PATENT DOCUMENTS

| 3,730,080 | A | * | 5/1973 | Deligt | ................ | B31F 1/07 |
| | | | | | | 101/216 |
| 5,274,956 | A | * | 1/1994 | Figge | ................ | B21B 13/20 |
| | | | | | | 198/346.2 |
| 6,688,366 | B1 | | 2/2004 | Gambini | | |
| 8,381,646 | B2 | | 2/2013 | Catelli | | |

(Continued)

FOREIGN PATENT DOCUMENTS

EP    1820636 A1    8/2007

*Primary Examiner* — Barbara J Musser
(74) *Attorney, Agent, or Firm* — Breiner & Breiner, L.L.C.

(57) ABSTRACT

The embossing-laminating device includes load bearing structure with at least two side members, a first path, for a first ply of web material, and a second path for a second ply of web material. Along the first path, a first pressure roller and a first interchangeable embossing roller are arranged, which define therebetween a first embossing nip for the first ply of web material. Along the second path a second pressure roller and a second interchangeable embossing roller are arranged, which define a second embossing nip for the second ply of web material. The embossing-laminating device also includes a magazine including a plurality of seats for a plurality of interchangeable embossing rollers, as well as at least a first manipulator for replacing embossing rollers.

22 Claims, 40 Drawing Sheets

(56) References Cited

U.S. PATENT DOCUMENTS

| | | | |
|---|---|---|---|
| 2003/0075263 A1* | 4/2003 | Marschke | B31F 1/2868 |
| | | | 156/210 |
| 2005/0257894 A1 | 11/2005 | Biagiotti | |
| 2006/0086267 A1* | 4/2006 | Biagioni | B31F 1/07 |
| | | | 101/23 |
| 2008/0134911 A1 | 6/2008 | Gelli et al. | |
| 2010/0000687 A1 | 1/2010 | Gelli et al. | |
| 2010/0021696 A1* | 1/2010 | Hill | B31F 1/07 |
| | | | 428/187 |

* cited by examiner

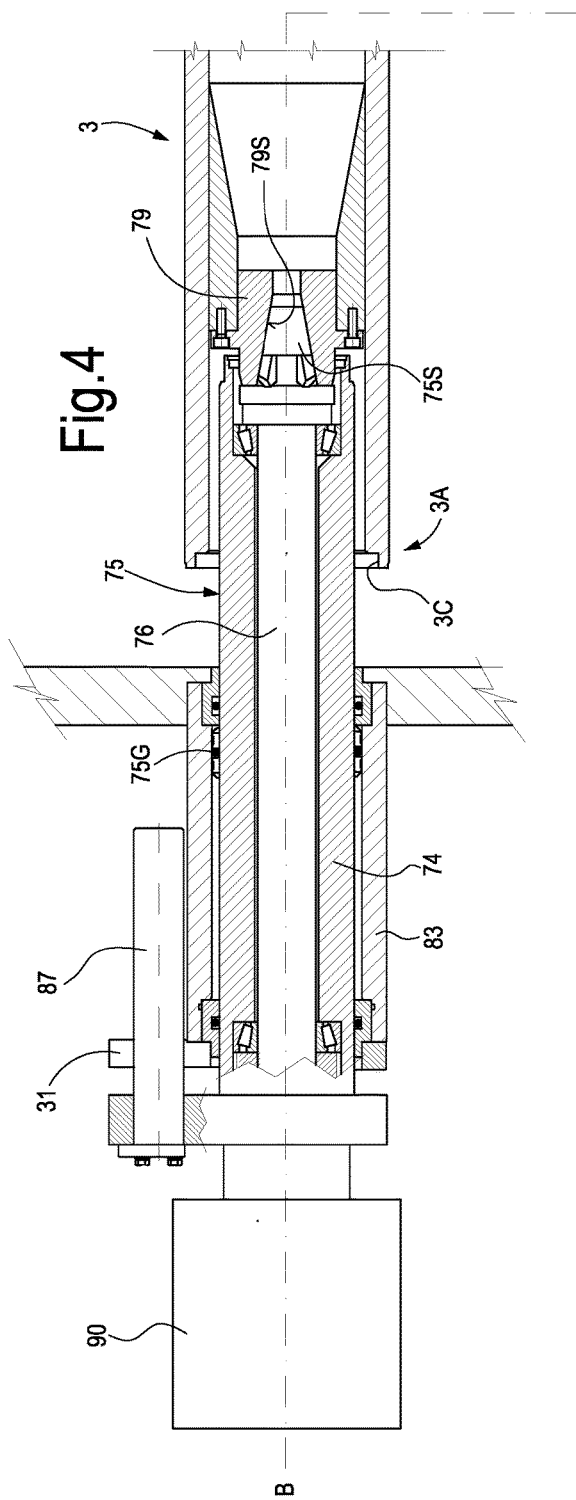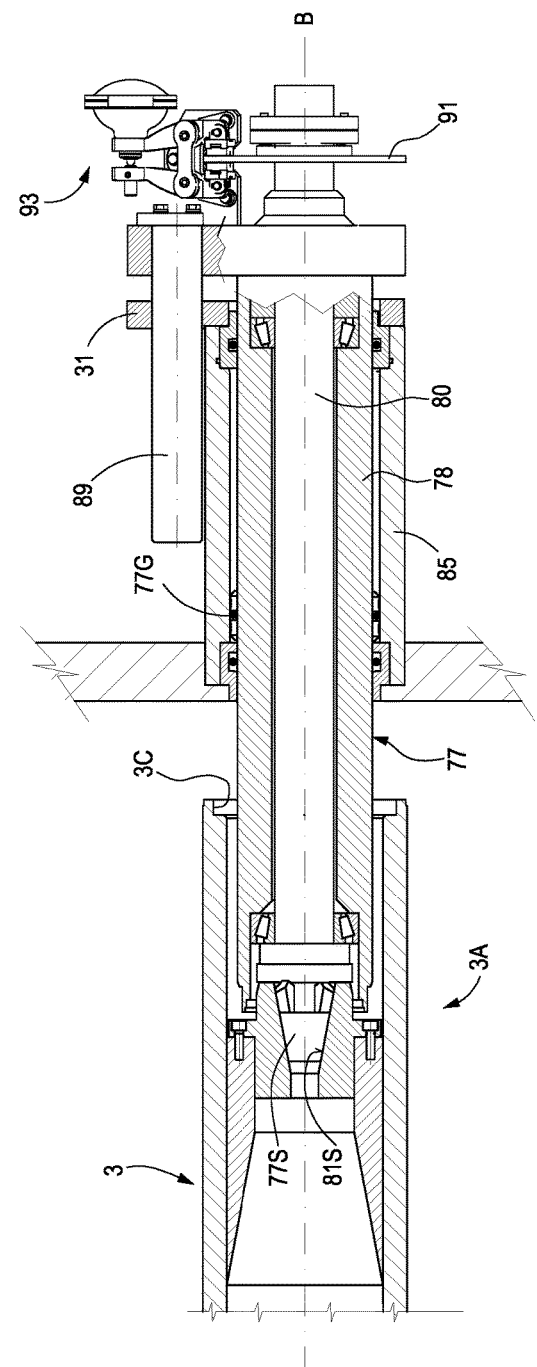
Fig.4

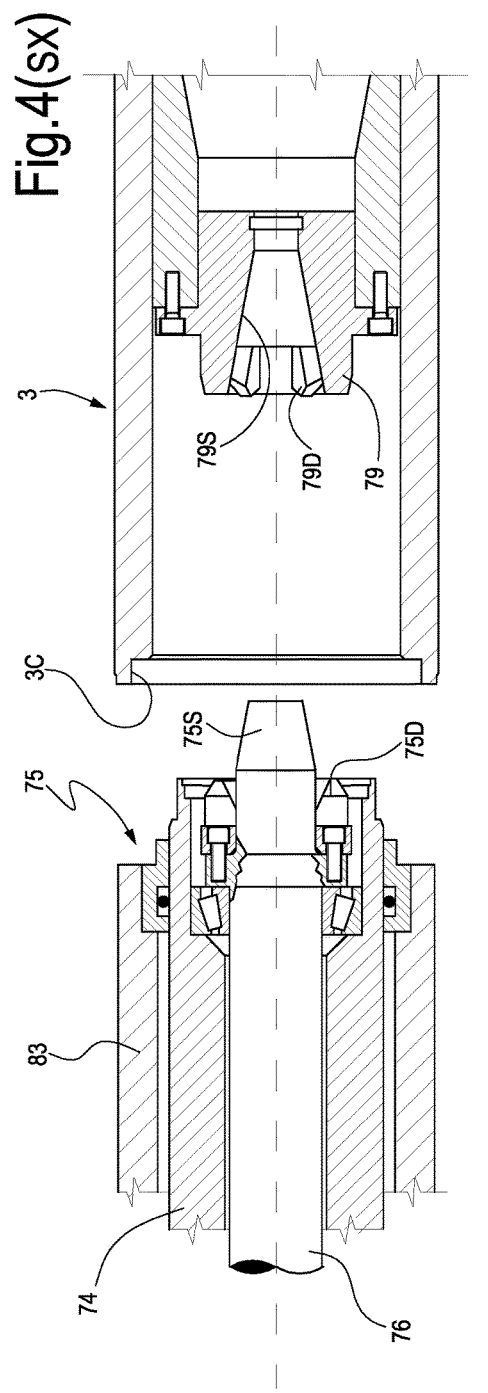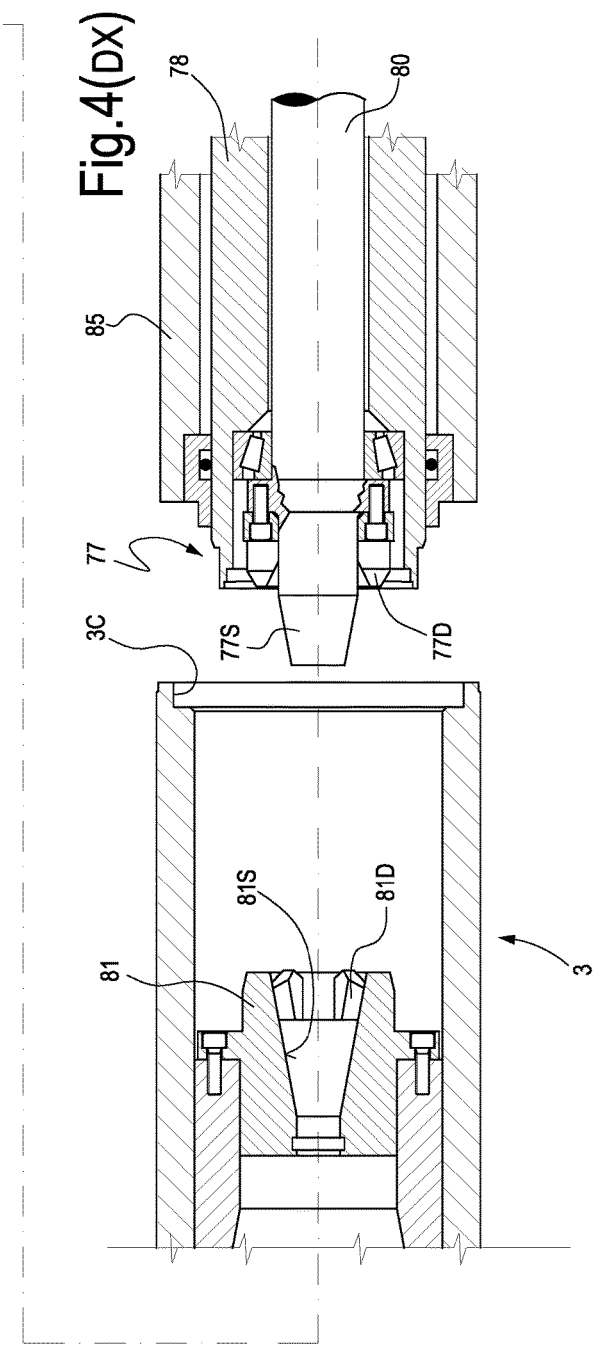

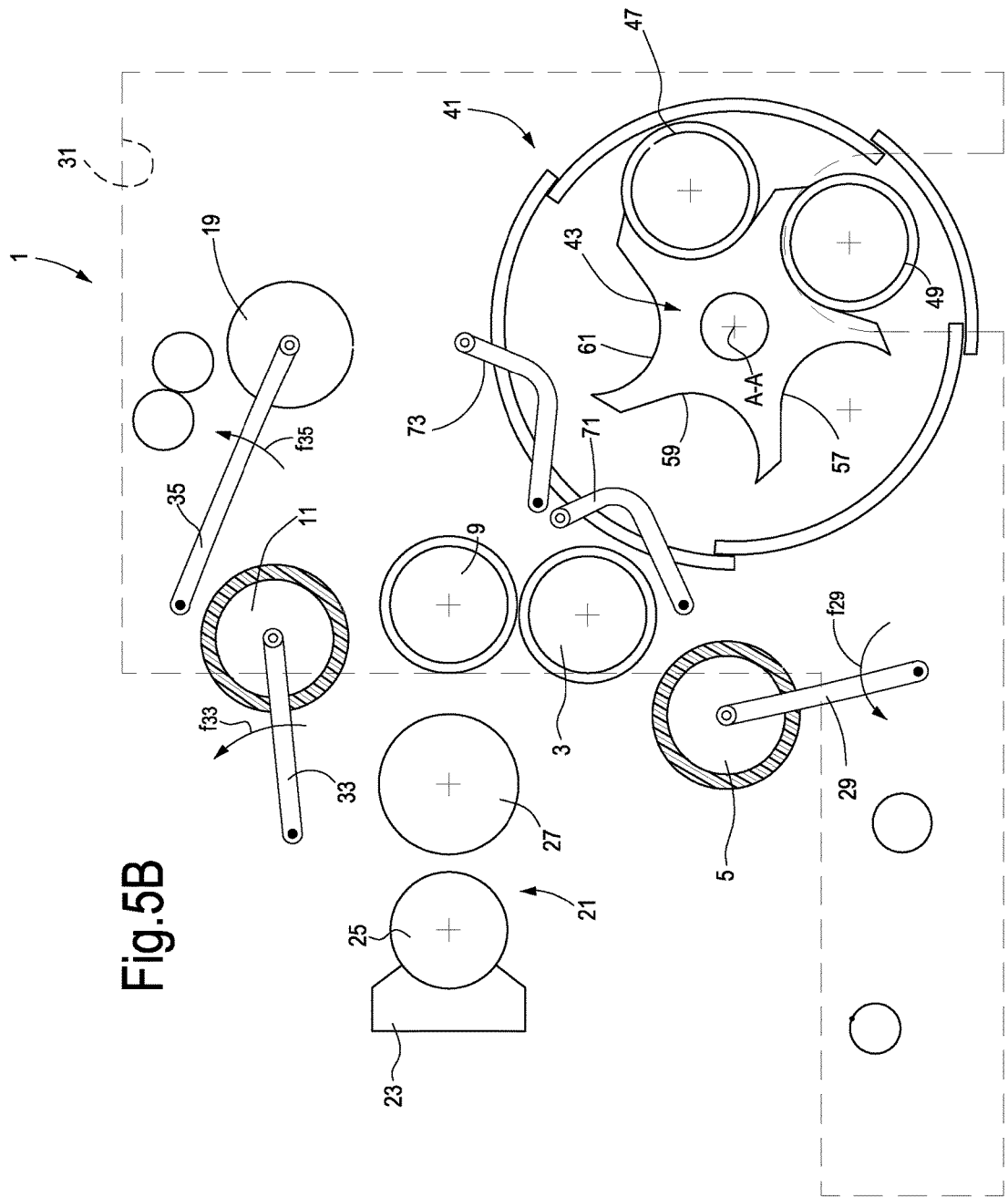

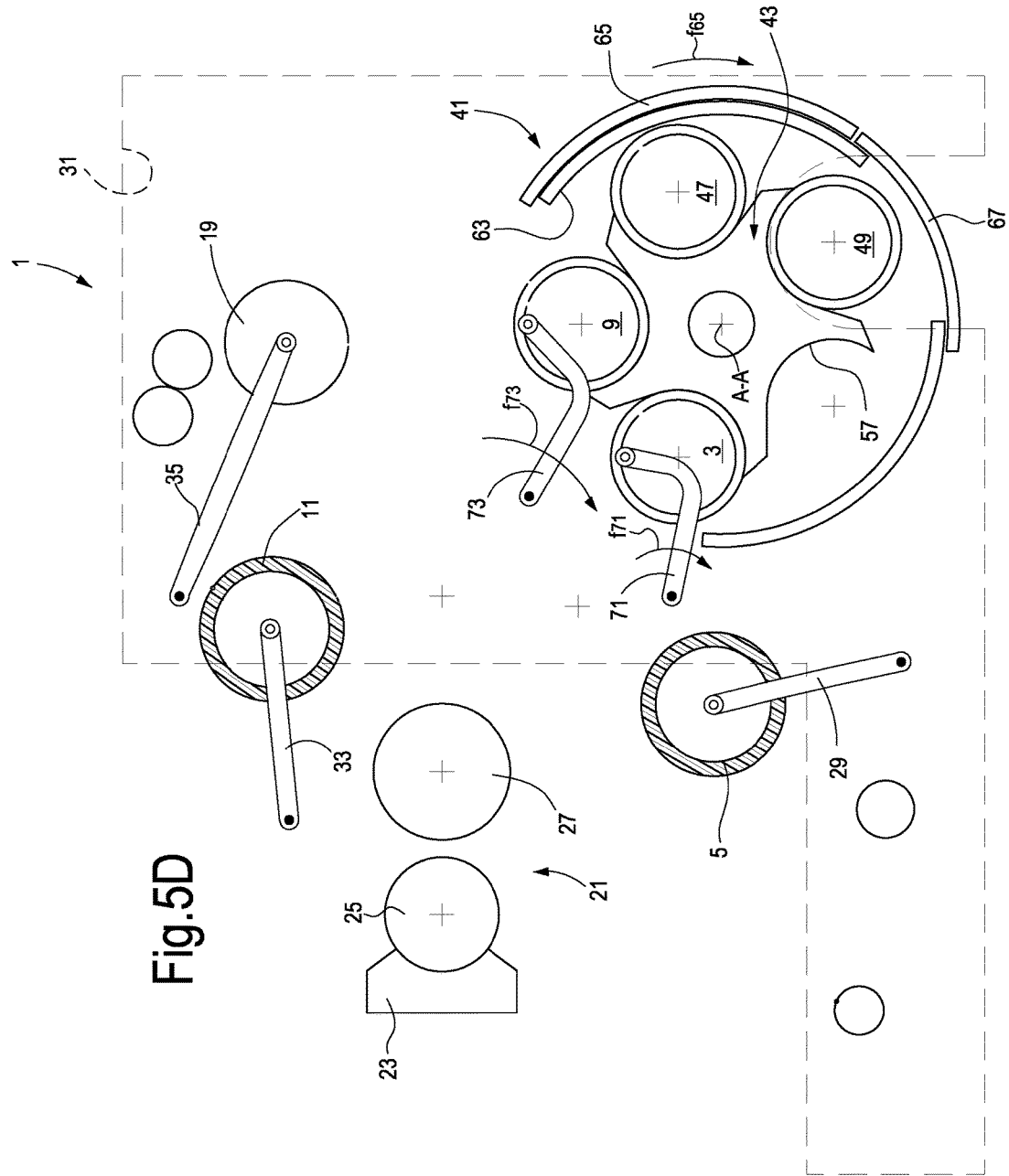

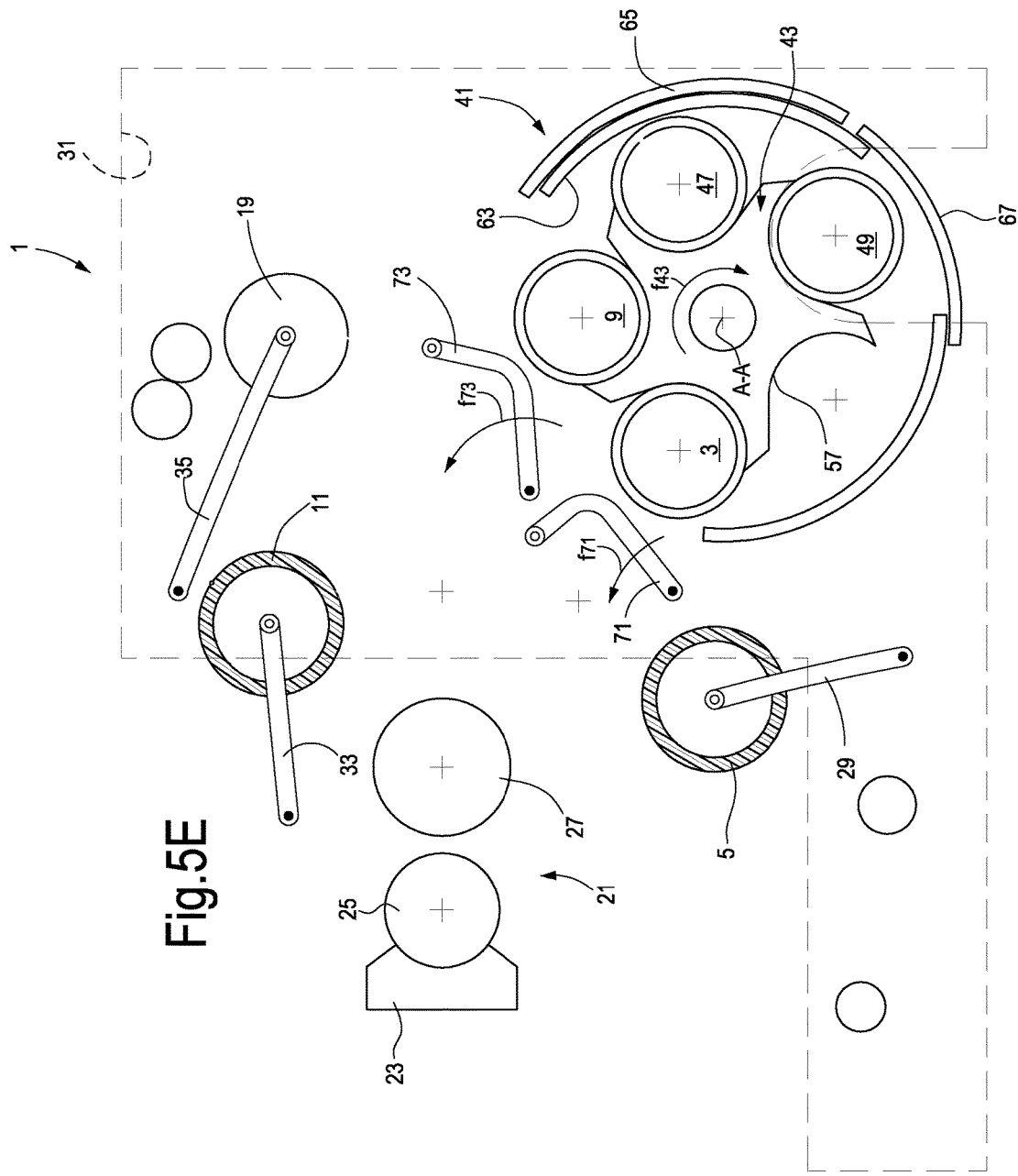

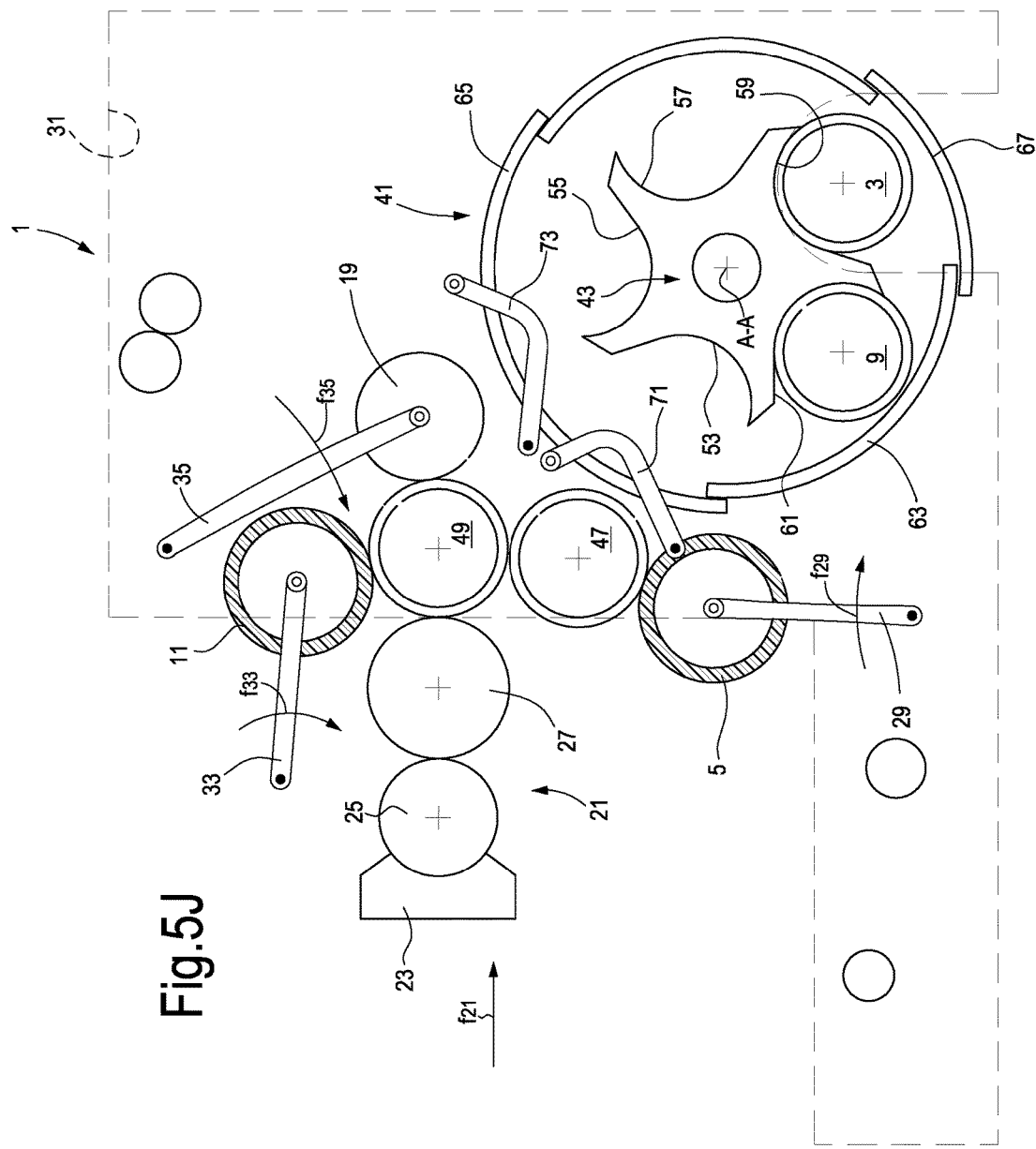

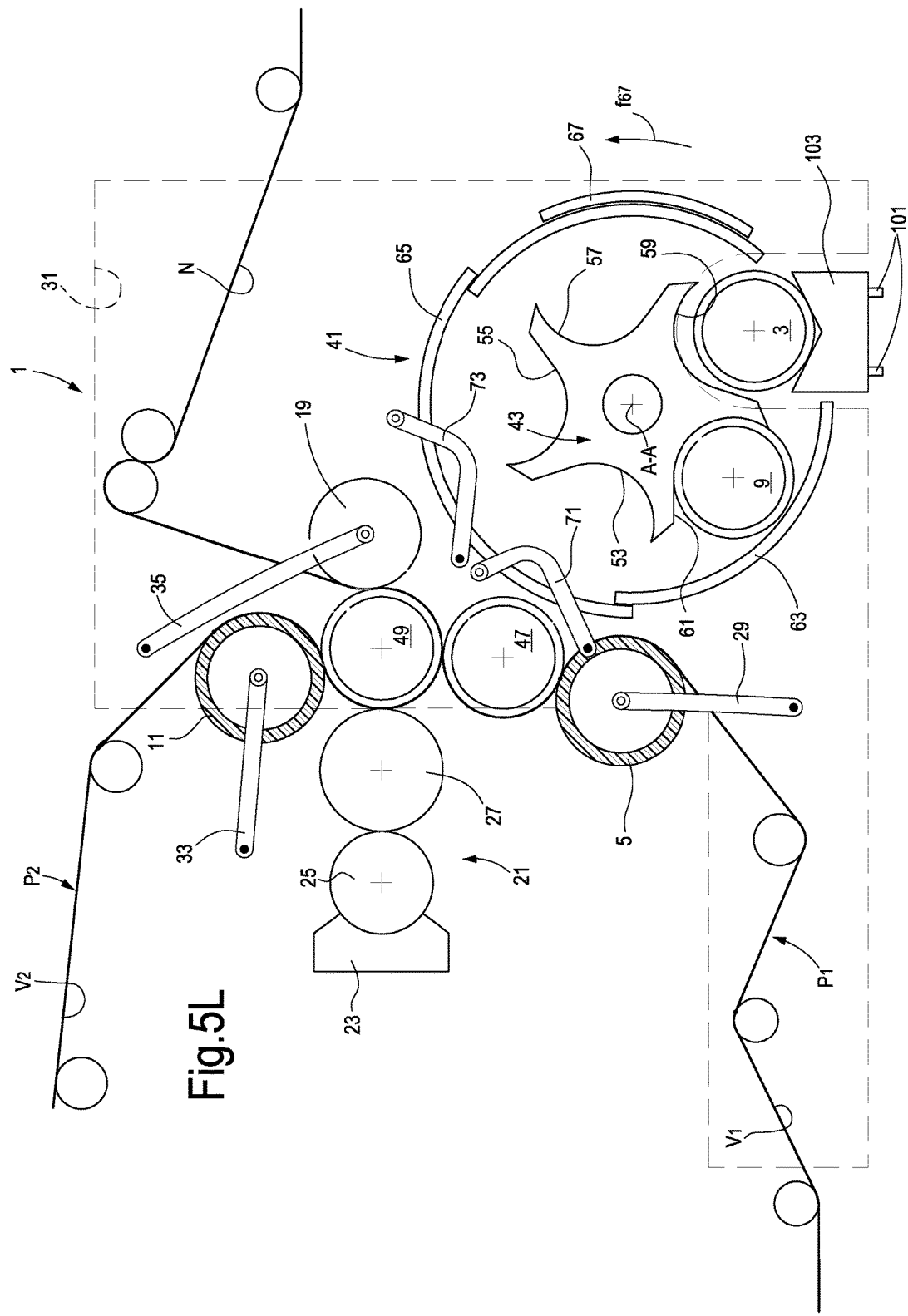

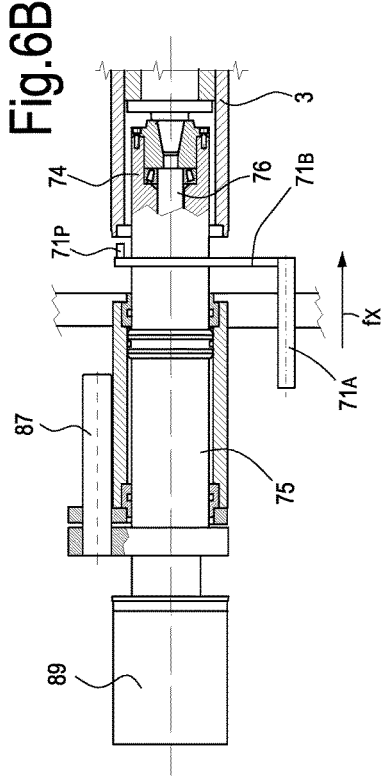
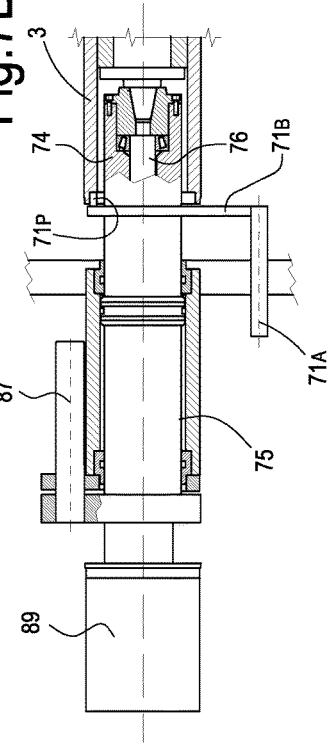
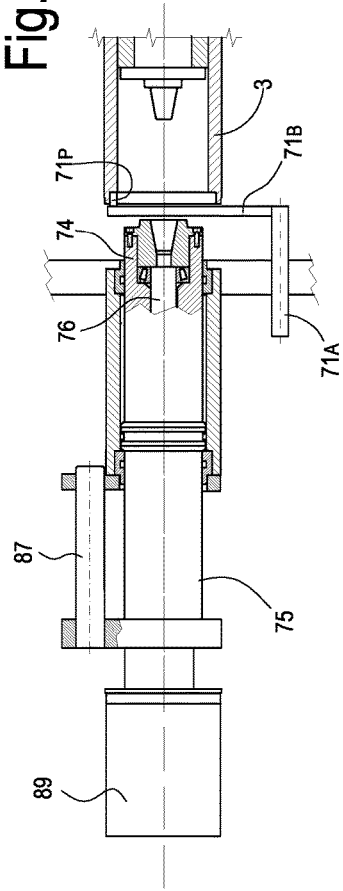
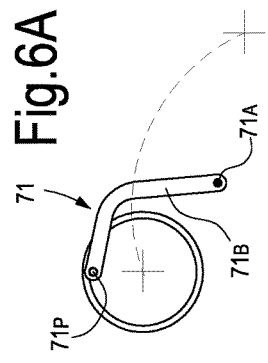
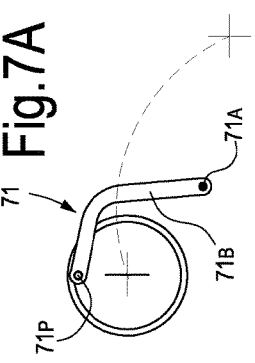
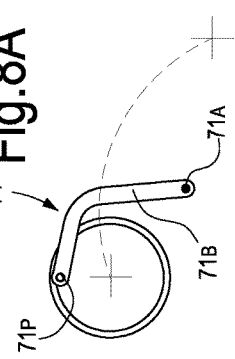

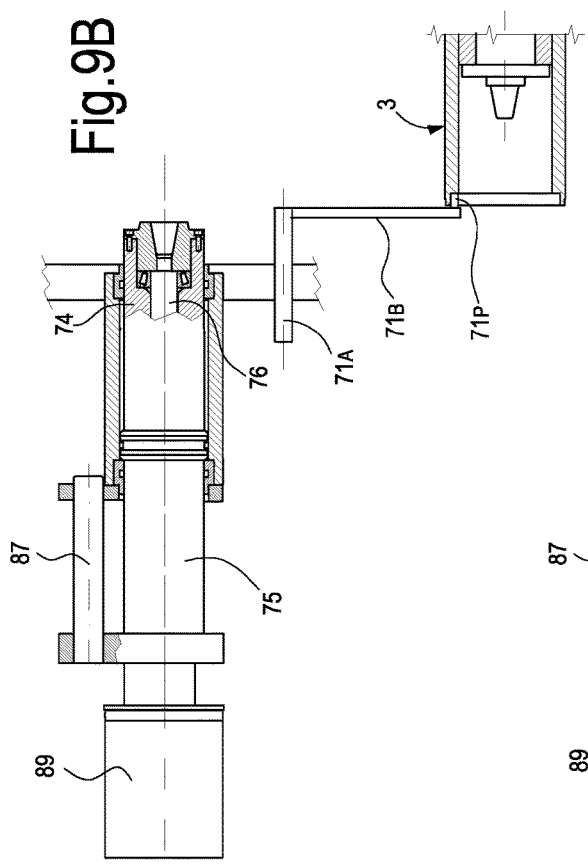
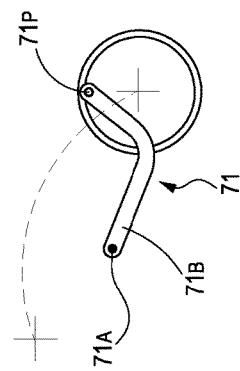
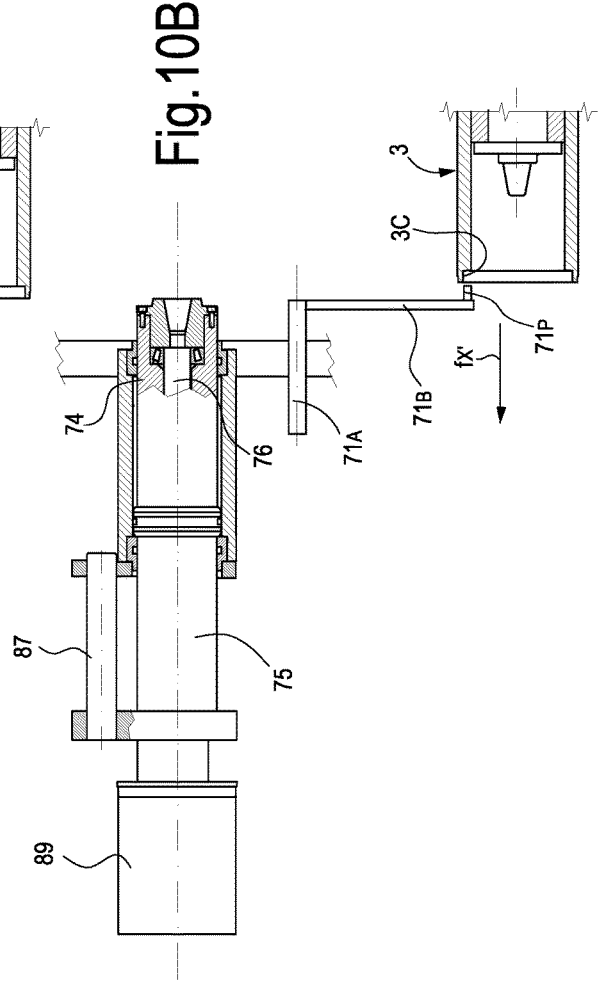
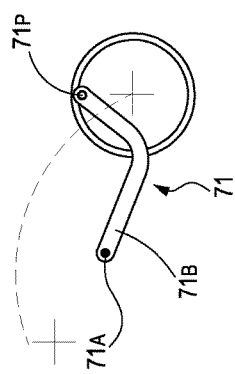

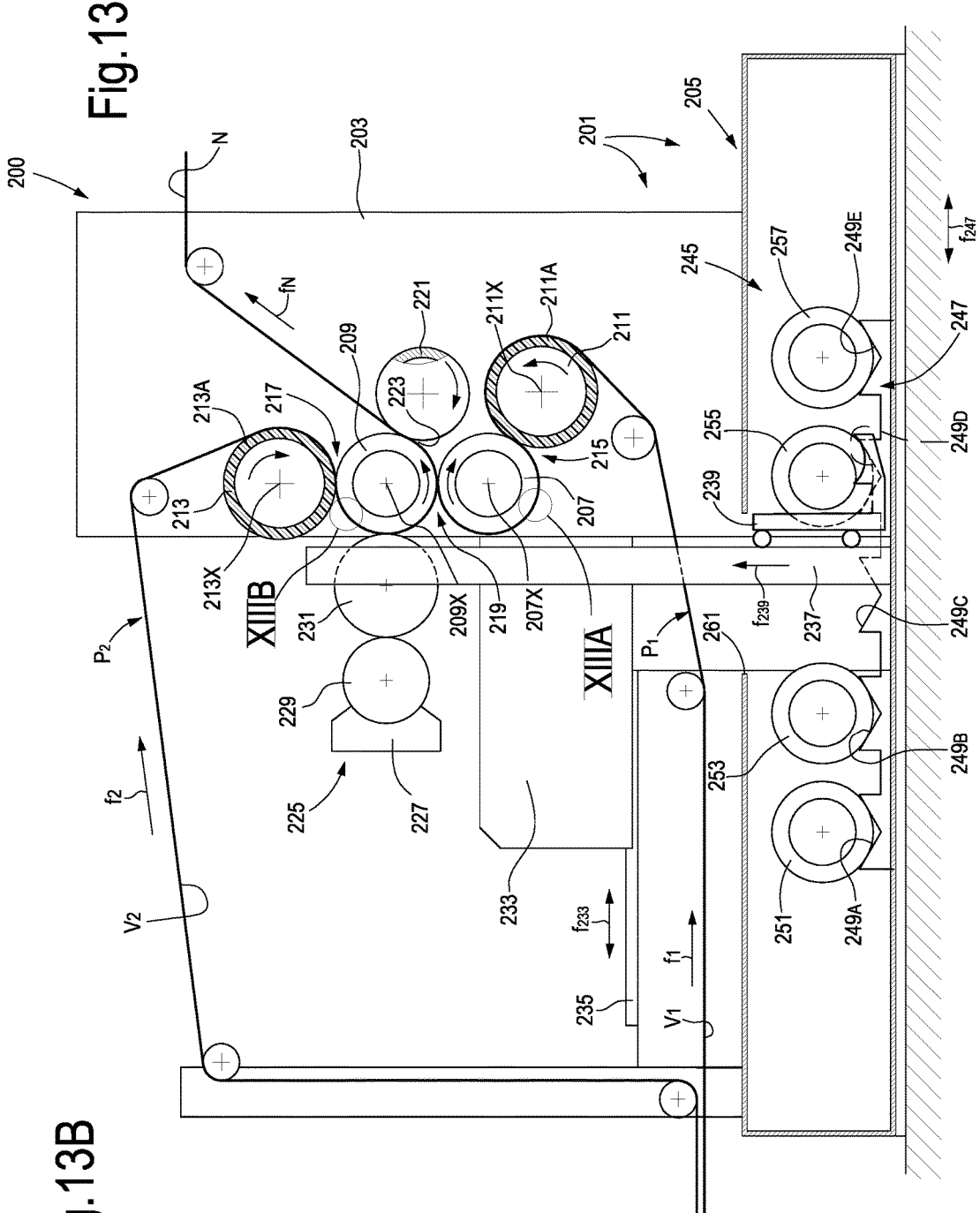
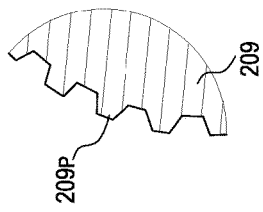
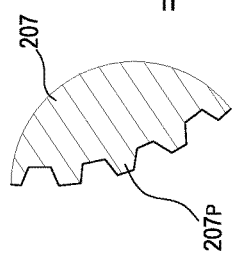

EMBOSSING-LAMINATING DEVICE

TECHNICAL FIELD

The present invention relates to a machine or device for processing multi-layer or multi-ply web material, such as for example, and in particular, a multi-ply cellulose material. More particularly, the invention relates to improvements to embossing-laminating machines or devices, especially for tissue paper.

STATE OF THE ART

In the production of cellulose ply products, such as toilet rolls, kitchen rolls, paper handkerchiefs and napkins, and similar items, it is frequent to process a ply of web material by means of embossing, passing the ply through an embossing nip formed by a pair of steel rollers or by a pair consisting of a roller made of steel or another relatively stiff material, and a roller coated with a yielding material, for example rubber. The steel roller has protuberances that penetrate the elastically yielding coating of the pressure roller. The pressure exerted between the embossing roller and the pressure roller causes permanent deformation of the cellulose material ply, which passes through the embossing nip formed between the embossing roller and the pressure roller. Two or more plies, at least one, some or all of which are embossed, are then brought together to form a multi-ply web material. The web material may be wound to form rolls, or else cut and folded to form handkerchiefs, napkins or similar.

Each ply may in turn consist of one or more layers of cellulose material.

The embossing pattern is for decorative and functional purposes. From a functional point of view, embossing serves to create limited areas to which glue is applied to bond multiple plies that form the web material to one another. Embossing is also used to increase the overall thickness of the web material, increase it softness and absorption capabilities and for other functions known to those experts in the field.

An embossing-laminating device is generally defined as a device that performs an embossing process on at least one ply and bonds two or more plies together by lamination, possibly using glue applied to at least one of said plies, preferably on the protruding surfaces of at least some of the embossing protuberances formed on one or more plies.

To meet the needs of modern tissue paper converting lines, the embossing rollers of the embossing-laminating device need to be changed, both in order to change the patter of the web material, and in order to change its technical-functional characteristics, for example to switch from the production of toilet paper to the production of kitchen paper and vice-versa. Indeed, since embossing in certain cases has functional uses that are more than simply aesthetic, embossing patterns used to produce toilet paper are not always suitable for the production of kitchen paper, and vice-versa. The consistency, thickness, weight and content of cellulose plies for the production of various types of finished articles may also differ, requiring embossing patterns which differ from one type of product to another.

Embossing-laminating devices or units have been designed, which have particular features aimed at simplifying and speeding up the embossing roller changing process. EP1074382 discloses an embossing-laminating device wherein a set of three embossing rollers is mounted on a star rotating unit, which makes it possible to select one or other of the three embossing rollers to make it co-act with a pressure roller, so as to modify the embossing pattern. Depending on the type of pattern required, one or other of the three rollers is brought to the operating position by rotating the star unit. In some embodiments disclosed in EP1074382, the star rotating unit supports three pairs of embossing rollers which can be selectively brought to the operating position, to co-act with two pressure rollers, rotating the star unit.

This known device is particularly complex and requires a heavy support structure for the embossing rollers, which all remain supported by the same star unit that supports the pair of embossing rollers used each. Furthermore, this known device enables two rollers to be replaced at a time, but does not, for example, make it possible to replace only one of the two embossing rollers while retaining the other for subsequent processing. In some cases, on the other hand, it would be useful to modify only the embossing pattern of one ply, while keeping the embossing pattern of the opposing ply fixed. This is particularly true, for example, in the production of double-sided materials where one of the outer plies is micro-embossed, with a pattern that remains always the same, while the other outer ply is embossed with a decorative motif, which can vary according to the processing order. With the device described in EP1074382, it is necessary to have as many micro-embossing rollers as there are decoration embossing rollers, even if all the micro-embossing rollers are the same. This results in the redundancy of rollers, the production of which is very complex, meaning that they are very costly.

EP1836045 discloses an embossing-laminating device with interchangeable embossing rollers that is improved with respect to the device disclosed in EP1074382. In fact, the device disclosed in EP1836045 makes it possible to have a plurality of pairs of embossing rollers in a magazine and to select one or other of said pairs, inserting them in the embossing-laminating device. This means that it is no longer necessary, as is the case with EP1074382, to have in the machine, supported by the same star unit, all the embossing rollers the machine is fitted with. On the one hand, this makes it possible to simplify and lighten the embossing device, and on the other hand to have available a large number of pairs of alternative rollers, in much larger quantities than those permitted by EP 1074382.

SUMMARY OF THE INVENTION

An embossing-laminating device is provided, which fully or partly overcomes one or more of the drawbacks and problems associated with the current state of the art.

According to one aspect, an embossing-laminating device is provided, comprising a bearing structure comprised of at least two side members. A first path, for a first ply of web material, and a second path, for a second ply of web material extend between the two side members. A first pressure roller, co-acting with a first interchangeable embossing roller, is arranged along the first path. The first embossing roller and the first pressure roller form a first embossing nip for the first ply of web material. A second pressure roller, co-acting with a second interchangeable embossing roller, is arranged along the second path. The second embossing roller and the second pressure roller form a second embossing nip for the second ply of web material. The embossing-laminating device also comprises a magazine provided with a plurality of seats for a plurality of interchangeable embossing rollers, each of which can replace the first or second embossing roller. At least a first manipulator is also to provided, to replace embossing rollers. In some embodiments, the manipulator is configured and controlled to replace the first embossing roller and/or the second embossing roller with one or more of the rollers contained in the magazine.

In some embodiments, the seats of the embossing rollers in the magazine are advantageously configured so that the embossing rollers are arranged in the seats with their axes generally parallel with the axes of the first and of the second embossing roller, and with the axes of the first and second pressure roller, which are located along the first and second path of the plies of web material.

In advantageous embodiments, the manipulator has a movement that moves the embossing roller to be replaced away from the respective pressure roller and possibly from the other embossing roller, to then transfer it to the magazine. A reverse movement makes it possible to take from the magazine the embossing roller to be inserted as a replacement for that removed, and to move it toward the respective pressure roller and possibly toward the other embossing roller, until the final position is reached, in which it is axially aligned with tailstocks, or other support and rotation systems, comprising respective reversible constraining members, which support the embossing roller and cause it to rotate during processing of the respective ply of web material and removal in order to be replaced with another embossing roller taken from the magazine.

For example, the manipulator may have a rotary movement around an axis substantially parallel to the axis of the embossing rollers.

In other embodiments, the manipulator may have a translation movement along two axes, for example orthogonal to one another. In some embodiments one of the axes may be horizontal and the other vertical. In general, movement of the manipulator along the two translation axes, or rotary movement around an axis, makes it possible to free the embossing roller which needs to be replaced from the surrounding rollers, in particular the pressure roller(s) and the other embossing roller, so as to allow easy movement of the roller to be removed and of the new roller to be put in its place.

By convention, in the context of the present description and the accompanying claims, the terms "first embossing roller" and "second embossing roller" are used to distinguish the two embossing rollers, which are located in an operating position, that is along the respective first and second path, to form the first and second embossing nip. Each of them may be replaced by one of the embossing rollers in the magazine. Therefore, in general each of the embossing rollers contained in the magazine may be used as a first or second embossing roller in the embossing-laminating device.

According to some embodiments, the first manipulator is arranged between the side members of the load bearing structure, between which the first pressure roller, the second pressure roller, the first embossing roller, the second embossing roller and the embossing roller magazine are also arranged.

To enable easy removal and replacement of the embossing rollers, in advantageous embodiments the first pressure roller and the second pressure roller are supported movable with respect to the load bearing structure, to take up an operating position, wherein the pressure roller is pressed against the respective embossing roller, and an idle position, wherein the pressure roller is spaced from the respective embossing roller. To that end, the pressure rollers may, for example, be supported by arms hinged to the load bearing structure, typically to the side members of the load bearing structure, and between said side members.

In some exemplary embodiments, the first manipulator comprises opposed support members of the respective embossing roller, which engage with respective ends of the embossing roller. To that end, the embossing rollers may have annular tracks or necks protruding axially beyond the embossing surfaces, i.e. beyond the surfaces on which the embossing protuberances are formed, for example by means of engraving.

The first embossing roller and the second embossing roller may be constrained by means of a first pair of tailstocks and a second pair of tailstocks, respectively, carried by the load bearing structure. At least one of the tailstocks in each pair may be motorized.

For easier, more effective manipulation of the embossing rollers, in some embodiments, both tailstocks in each pair are provided with a movement parallel to the axis of the respective embossing roller with respect to the load bearing structure, for coupling with the embossing roller and releasing therefrom.

The tailstocks can be coupled to the embossing rollers by means of torque transmission surfaces. For example, conical or frusto-conical surfaces on the rollers and tailstocks can be provided. A frontal toothing coupling for more effective torque transmission may also be provided between the tailstocks and the embossing rollers.

In advantageous embodiments, the coupling surfaces between the rollers and the tailstocks may be provided inside a wall or cylindrical shell of the embossing rollers, on the outer surface whereof the embossing protuberances are formed. This enables reduced sag due to the flexional warpage caused by the mutual pressure between the embossing roller and the pressure roller.

In other embodiments, other support and rotation systems may be used for each embossing roller instead of tailstocks, as will be described in more detail below. In advantageous embodiments, the pressure rollers may be supported by tailstocks similar to those that engage and support the embossing rollers. In some embodiments, the pressure rollers are free-spinning and are rotated by contact with the embossing rollers. Therefore, the support tailstocks for the pressure rollers may not have any motorization, while at least one of the support tailstocks of the embossing rollers is motorized. In this way it is possible to use worn embossing rollers to create pressure rollers to be used in the same embossing-laminating device or machine. To that end, when the embossing protuberances are excessively worn and the embossing roller can no longer be used, a layer of elastically yielding material, for example rubber, is applied to the outer surface and it is used as a pressure roller. By using tailstocks for the pressure rollers that are substantially the same as those used for the embossing rollers, no adaptation of the internal roller structure is necessary when they switch from being used as embossing rollers to being used as pressure rollers. Before applying the outer layer or coating of elastically yielding material, the worn embossing rollers can be processed to remove any residual embossing protuberances, for example by grinding the cylindrical surface.

In some embodiments the first embossing roller and the second embossing roller can be constrained by means of a respective first pair of tailstocks and a respective second pair of tailstocks, carried by the load bearing structure, at least one tailstock of each pair being motorized to rotate the respective embossing roller, the tailstocks and the support members of each embossing roller being configured and controlled so that: for the removal of an embossing roller the tailstocks are disengaged from the embossing roller after the support members have engaged the embossing roller; and for inserting an embossing roller the support members are disengaged from the embossing roller after the tailstocks have engaged the embossing roller.

Each embossing roller may have at each end a concave conical surface, arranged on the inside of the cylindrical surface of the embossing roller and co-acting with a corresponding convex conical surface on the corresponding tailstock. Each embossing roller may comprise, at both ends, respective torque transmission surfaces, arranged on the inside of the cylindrical surface of the embossing roller and co-acting with corresponding torque transmission surfaces on the respective tailstocks.

In some embodiments, each embossing roller comprises, adjacent to each end, a respective annular channel co-acting with the manipulator. The latter may comprise for example support members in the form of a semi-circular cradle for each end of the rollers to be manipulated. The rollers rest with their respective annular channels on the cradle to be transferred from the operating position to the magazine and vice-versa. The annular channels may be made on studs or necks protruding axially beyond the surface of the embossing roller on which the embossing protuberances are placed.

In particularly advantageous embodiments, the first manipulator is arranged and configured to manipulate and replace both the first embossing roller and the second embossing roller with respective embossing rollers contained in the magazine. In this case, the embossing-laminating device may comprise a single manipulator. There is thereby obtained a simple, compact structure, which can be efficiently controlled with a system of low-cost, reliable drivers or actuators.

In other embodiments a first manipulator to manipulate the first embossing roller and a second manipulator to manipulate the second embossing roller may be provided.

In this case, it may be that the first manipulator co-acts with the first embossing roller placed in the first path to replace it with an embossing roller taken from the magazine, and that the second manipulator co-acts with the second embossing roller placed in the second path to replace it with an embossing roller taken from the magazine. The first manipulator and the second manipulator may each comprise a respective pair of pivoting arms, configured to engage the embossing rollers at the ends thereof.

The seats of the magazine may be carried by a unit rotating around a rotation axis substantially parallel to the axes of the pressure rollers and the embossing rollers, the embossing rollers in the magazine being arranged with their axes parallel to said rotation axis.

In some embodiments, specifically when there is a single manipulator to move and manipulate both the first and the second embossing roller, is it advantageous to envisage that the manipulator comprises an elevator movable between a first height, at which the first or the second embossing roller is located, and a second height, lower than the first height, at which the magazine is located.

Advantageously, the magazine may be located under the first and second embossing rollers and under the first and second pressure rollers. An embossing-laminating device is thereby obtained with reduced footprint.

The magazine may comprise a plurality of seats movable orthogonally to the axes of the first and the second embossing roller and the axes of the rollers contained in the magazine. Movement may be a translation movement, preferably in a generally horizontal direction. The magazine, or rather the seats thereof, in which the replacement rollers are housed, may be located under the first and the second embossing rollers and under the pressure rollers so as to translate in a space beneath the feed paths for the first ply of web material and the second ply of web material.

In advantageous embodiments, the first manipulator is provided with a lifting and lowering movement between a lower height, at which the magazine is located, and one or more higher heights at which the first or second embossing roller is located, and with a movement toward or away from the first embossing roller or the second embossing roller, which is preferably a translational movement, generally transverse with respect to the lifting and lowering movement.

To that end, in some embodiments the manipulator may comprise a slide provided with a lifting and lowering movement, and a carriage provided with a movement transverse with respect to the lifting and lowering movement, to move toward and away from the first and second embossing roller, the magazine being located under the carriage. The slide may be movable on guides carried by the carriage and extending in a direction generally orthogonal to the movement of the carriage. In this way a manipulator is obtained, whose support members for the rollers to be manipulated are provided with a translation movement along two axes substantially orthogonal to one another and preferable defining a vertical plane substantially orthogonal to the axes of the first and the second embossing roller.

A particularly compact and reliable structure is obtained if the carriage carrying the manipulator slide in turn carries a gluing unit, configured to apply glue to one of said first ply and second ply. The movement of the carriage thereby makes it possible to move the roller support members toward or away from the embossing roller to be replaced, and at the same time makes it possible to move the gluing unit toward and away from the pair of embossing rollers to make the latter easier to remove and replace. This leads to a reduction in the number of movable members and respective actuators, with notable simplification of construction and control, and increased reliability of the embossing-laminating device as a whole.

In other embodiments a first and second manipulator are provided for the first and second embossing roller. The two manipulators are preferably both arranged between the two side members of the load bearing structure. In advantageous embodiments, the two manipulators may each comprise a pair of pivoting arms to move the respective first and second embossing roller.

In alternative embodiments, in particular when two manipulators are provided, the magazine can be comprised of a rotating unit, preferably rotating around an axis generally parallel to the axes of the embossing rollers and the respective pressure rollers. The rotating unit carries a plurality of support seats for the respective interchangeable embossing rollers.

In some embodiments the magazine with the rotating unit may have a closing member, movable from an open position to a closed position, and vice-versa, to allow replacement of the embossing rollers, while keeping the embossing rollers not in use protected inside the magazine during operation of the device. In some embodiments the closing member comprises a substantially cylindrical hatch, movable around an axis parallel to the axes of the pressure rollers and the embossing rollers. In further embodiments, the magazine may have a secondary access to allow the removal of the embossing rollers contained in the magazine and their replacement with other embossing rollers outside the device.

The embossing-laminating device may advantageously comprise a laminating roller, which defines a laminating nip with one of the first and second embossing rollers. In particular, when the embossing-laminating device is provided with a gluing unit, the laminating roller co-acts with the same embossing roller that co-acts with the gluing unit.

Further possible features and embodiments are described below, with reference to embodiments of the invention, and in the accompanying claims, which form an integral part of the present description.

BRIEF DESCRIPTION OF DRAWINGS

The invention will be better understood by following the description and accompanying drawing, which shows practical, non-limiting embodiments of the invention. In more detail:

FIGS. 1A and 1B show enlarged details of FIG. 1;

FIG. 4 shows an enlargement of a different embodiment of the support and rotation members of the embossing roller when the roller is engaged with the support members;

FIGS. 4(SX) and 4(DX) show the same enlargement as shown in FIG. 4, with the support and rotation members disengaged from the embossing roller;

FIGS. 5A to 5L show a sequence of embossing roller replacement in a possible embodiment of the embossing-laminating device;

FIGS. 6A to 10B schematically show the movement of the manipulators to move one of the embossing rollers of the embossing-laminating device;

FIGS. 13 to 27 show a schematic side view of a further embodiment of an embossing-laminating device in various phases of the embossing roller replacement cycle;

FIGS. 13A, 13B show two enlargements of the details indicated by XIIIA and XIIIB in FIG. 13;

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
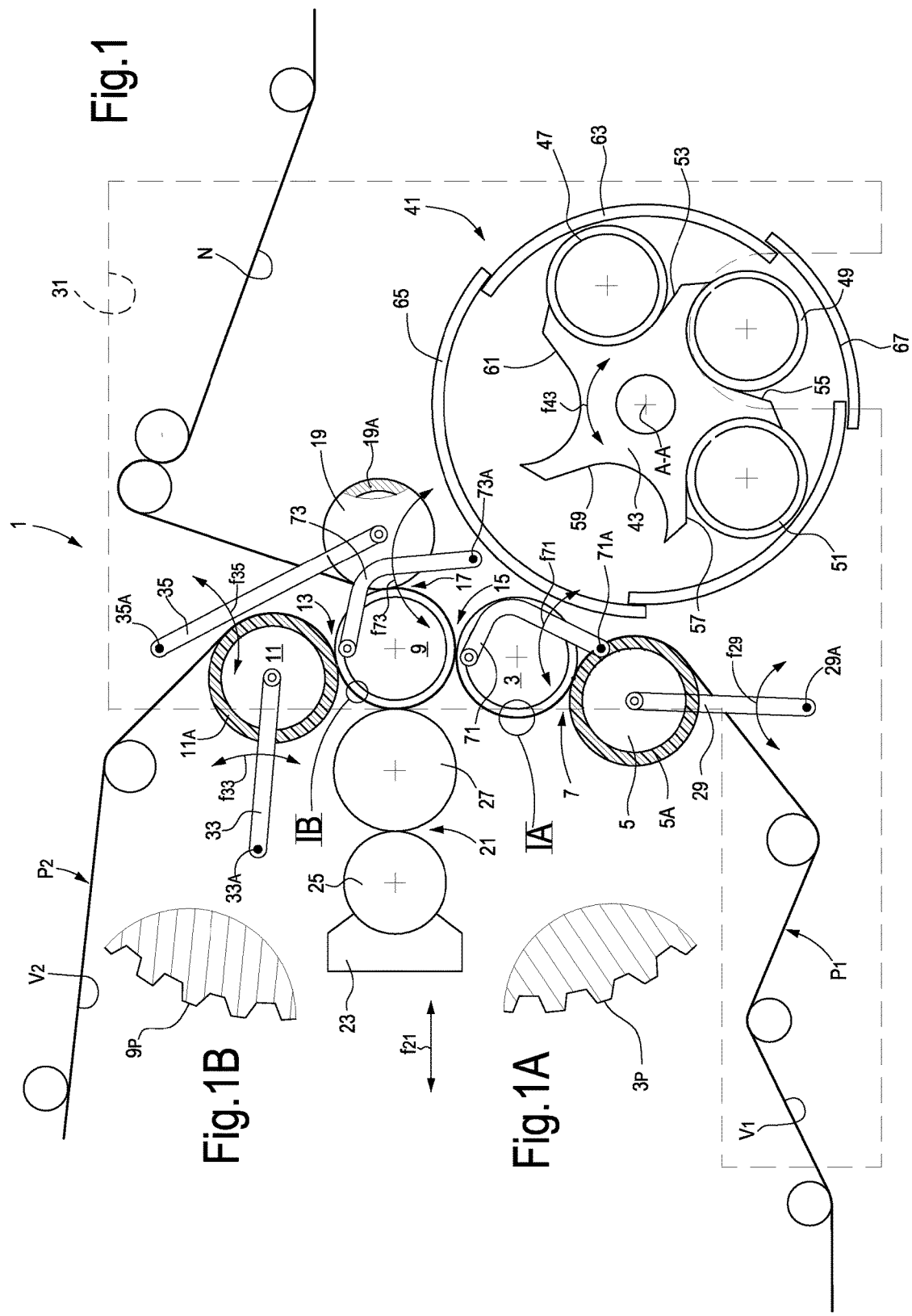
FIG. 1 shows a schematic side view of an embossing-laminating device.

FIG. 1 shows a schematic side view of an embossing-laminating device in a possible embodiment.

The embossing-laminating device as a whole is indicated by the number 1 and has a first feed path for a first ply V1 of web material and a second feed path for a second ply V2. The two plies V1 and V2 may be advantageously plies of cellulose material, typically tissue paper plies. Each of the two plies may in turn be formed from one or more layers, sheets or strips, coupled and bonded or simply overlying one another.

The two plies V1 and V2 are embossed by the embossing-laminating device and bonded together to form a continuous multi-ply or multi-layer web material N, which exits the embossing-laminating device 1 to be fed to downstream stations on a paper processing line.

In FIG. 1, references P1 and P2 schematically indicate the paths of the two plies V1 and V2.

In some embodiments the embossing-laminating device 1 comprises a first embossing roller 3 co-acting with a first pressure roller 5. The embossing roller 3 comprises a cylindrical surface provided with protuberances 3P, as shown schematically in the enlargement shown in FIG. 1A. The protuberances 3P may define an embossing motif with technical-functional functions, or aesthetic-decorative functions, or both technical-functional and aesthetic-decorative functions. The first pressure roller 5 may be coated with a yielding material, preferably elastically yielding, for example rubber or similar, indicated with 5A.

Between the first embossing roller and the first pressure roller 5 a first embossing nip 7 is defined, through which the path P1 for the first ply V1 of material to be embossed passes.

The embossing-laminating device 1 may comprise a second embossing roller 9 provided (see FIG. 1B) with a plurality of protuberances 9P. The second embossing roller 9 co-acts with a second pressure roller 11, which may be coated with a layer of yielding material, preferably elastically yielding, for example rubber or similar, indicated with 11A. Between the second embossing roller 9 and the second pressure roller 11 a second embossing nip 13 is formed, through which the path P2 for the second ply V2 of web material extends.

Between the two embossing rollers 3 and 9 a nip 15 is defined. In the nip 15 the embossing rollers 3 and 9 may be pressed against one another, at the respective protuberances 3P and 9P, so as to laminate together the two plies V1 and V2, after they have been separately embossed in the embossing nips 7 and 13, respectively. The two plies V1 and V2 can be bonded by lamination, for example with a glue applied to one of them in the manner described later.

In some embodiments the embossing-laminating device 1 may comprise a laminating roller 19 co-acting with one of the embossing rollers 3, 9, for example with the embossing roller 9, as shown in the example shown in the accompanying drawings. Between the embossing roller (9 in the example) and the laminating roller 19 a laminating nip is provided, through which the two plies V1 and V2 pass.

The laminating roller 19 may be a roller of stiff material, for example steel, or it may be coated with a layer of elastically yielding material 19A, preferably stiffer than the coating 11A, 5A of the second pressure roller 11 and the first pressure roller 5, respectively.

When the embossing-laminating device 1 is provided with a laminating roller 19 and a laminating nip 17, bonding of the plies V1 and V2 may take place in the laminating nip 17. In this case the embossing rollers 3, 9 may be positioned so as not to press against one another in the nip 15.

The embossing rollers 3, 9 advantageously have parallel axes. The pressure rollers 5, 11 may have axes that are substantially parallel to the corresponding embossing rollers. In some embodiments or fittings of the embossing unit, the pressure rollers, and possibly the laminating roller 19, may be arranged with axes slightly skewed with respect to the axes of the respective embossing rollers. This skewed position for the axes is intended to compensate for the reduction in pressure at the center of the rollers, which may occur because of warpage due to flexion.

In some embodiments the embossing-laminating device 1 may be configured to laminate the plies V1, V2 in the nip 15 or alternatively in the nip 17. To that end, it is possible for example to provide the embossing rollers 3, 9 with movement for adjusting the mutual angular phase and/or movement for adjusting the center distance. In some embodiments, the second embossing roller 9 is associated with a gluing unit 21, which applies glue to the top surfaces of the protuberances formed by embossing on the ply V2 entrained around the second embossing roller 9. In some embodiments the gluing unit 21 may comprise a glue source 23, an anilox roller 25 and a cliché roller 27. The configuration of the gluing unit 21 is shown by way of example, and it should be understood that other configurations are possible that are different from that illustrated.

When the embossing-laminating device 1 laminates the plies V1, V2 in the nip 15 between the embossing rollers 3, 9, the two plies V1, V2 are pressed against one another in an area corresponding to at least some of the protuberances of the embossing rollers, causing mutual adhesion in the areas where the glue has been applied. When the embossing-laminating device 1 laminates the plies V1, V2 in the laminating nip 17, the ply V1 is detached from the embossing roller 3 and laid upon the ply V2 so as to advance therewith around the embossing roller 9 and through the laminating nip 17. Here the plies V1, V2 are pressed against one another in an area corresponding to at least some of the protuberances 9P of the embossing roller 9 by means of the laminating roller 19, thereby obtaining gluing.

The first pressure roller 5 may be supported movable so as to be able to move toward and away from the first embossing roller 3. In some embodiments the first pressure roller 5 is supported by a pair of arms 29 hinged at 29A to the side members 31 of the embossing-laminating device 1, between which the rollers 3, 5, 9, 11, 19 and the gluing unit 21 are arranged.

The arms 29 may be driven by actuators, for example hydraulic, pneumatic or electric actuators (not shown), which control a rotation movement of the arms 29 in the direction shown by the double arrow f29 so as to move the first pressure roller 5 toward and away from the first embossing roller 3 for the purposes described below.

Similarly, the second pressure roller 11 may be supported by a pair of arms 33 hinged at 33A to the side members 31 and movable in the direction of the double arrow f33 so as to move the second pressure roller 11 toward and away from the second embossing roller 9. The reciprocating rotation movement of the arms 33 may be controlled by hydraulic, pneumatic or electric actuators, or the like, not shown.

By means of the movement actuators for the respective arms, the pressure rollers 5, 11 are pressed against the respective embossing rollers 3, 9 so that when the plies V1, V2 pass through the respective embossing nips 7, 13, they are permanently deformed due to the penetration of the protuberances 3P, 9P on the embossing rollers into the yielding coating 5A, 11A on the pressure rollers 5, 11.

The laminating roller 19 may be advantageously supported by arms 35 hinged at 35A to the side members 31 so as to be able to rotate in the direction of the double arrow f35 so as to move the laminating roller 19 toward and away from the second embossing roller 9. Pneumatic, hydraulic, or electric actuators, or the like, may be used to move the laminating roller 19 in the direction of the double arrow f35 and press it against the embossing roller 9 with the pressure required to obtain lamination of the plies V1, V2 in the laminating nip 17.

The gluing unit 21 may be advantageously movable toward and away from the second embossing roller 9. The movement is indicated schematically by the double arrows f21 shown in FIG. 1 and may be controlled by hydraulic, pneumatic or electric actuators, or the like, not shown.

In the illustrated embodiment the embossing-laminating device 1 comprises a magazine 41, wherein one or more interchangeable embossing rollers may be arranged with embossing rollers 3 and 9 mounted on the machine, in the setup illustrated in FIG. 1. Advantageously the magazine 41 may be placed under the exit area of the web material N obtained by bonding the plies V1 and V2.

In advantageous embodiments, the magazine 41 comprises a unit 43 rotating around an axis A-A advantageously substantially parallel to the axes of the rollers 3, 5, 9, 11 and 19. The unit 43 can rotate in a controlled manner in the direction of the arrow f43 around the axis A-A for the purposes described herein. In the setup shown in FIG. 1, three interchangeable embossing rollers, labeled 47, 49 and 51, are located in the magazine 41. Advantageously the embossing rollers 47, 49, 51 are housed in respective seats 53, 55, 57, with which the magazine 41 is provided and which are formed on the rotating unit 43. The latter has further seats, preferably another two seats, indicated with 59 and 61, which in the condition shown in FIG. 1 are empty and can receive the embossing rollers 3 and 9 when they need to be replaced by two of the embossing rollers 43, 49 and 51.

In some embodiments the magazine 41 may be closed by a wall or fixed carter 63 and by a movable hatch 65. The hatch 65 gives access to the inside of the magazine 41, in order to replace the embossing rollers located in the embossing device 1 with other embossing rollers located in the magazine. Advantageously, the hatch 65 is positioned in the part of the magazine 41 closest to the embossing rollers 3, 9 in order to reduce the distance needed to replace the embossing rollers, as will become clear from the following description. The hatch is also used to close the roller magazine in order to protect the rollers from the large quantity of dirt (dust, and in some cases also glue) that is produced during processing.

The fixed carter 63 and the hatch 65 may have a substantially cylindrical shape, but different configurations are not excluded. The cylindrical form of the carter 63 and the hatch 65 reduces the dimensions of the magazine 41 by optimizing use of its internal volume.

In some embodiments the magazine 41 may comprise an auxiliary hatch 67. In advantageous embodiments the auxiliary hatch 67 is placed in a lower zone of the carter 63. The auxiliary hatch 67 closes an opening in the carter 63 which can be used to remove and/or insert embossing rollers in the magazine 41 while the embossing-laminating device 1 is working. To that end, the auxiliary hatch 67 and the respective opening are advantageously placed in a zone far from the embossing rollers 3, 9 which are mounted between the side members 31 of the embossing-laminating device 1.

In other embodiments the auxiliary hatch 67 and the related opening may be omitted. In some embodiments it may be that the hatch 65 has a movement that gives access through the related opening on the side opposite the members 3, 5, 9, 11, in order to insert embossing rollers into the magazine 41 or extract them therefrom while the embossing-laminating device 1 is working, without the need to provide a second lower opening.

The embossing-laminating device 1 may also advantageously comprise a first manipulator 71 to replace the embossing roller 3 and a second manipulator 73 to replace the embossing roller 9. In some embodiments each manipulator 71, 73 comprises a pair of arms pivotable in the direction of the double arrows f71 and f73 respectively. The pivoting arms 71 and 73 may be hinged at 71A and 73A to the fixed structure formed by the side members 31 of the embossing-laminating device, the arms being located on the inside of the side members 31. Movement of the arms is controlled by actuators, not shown. In addition to a pivoting movement, i.e. alternate rotation around the hinges 71A, 73A, the two arms of each manipulator 71, 73 are also provided with limited movement toward and away from the side members 31, for the purposes that will be described below.

In advantageous embodiments each of the embossing rollers 3, 9 may not have necks and may be supported between the side members 31 by means of respective pairs of tailstocks. The support and rotation mechanisms for the embossing rollers 3, 9 may be the same of substantially equivalent. Therefore, with reference to FIGS. 2, 3 and 4, only one of these mechanisms will be described below, and more particularly the mechanism that supports and rotates the embossing roller 3.

Figure 2:
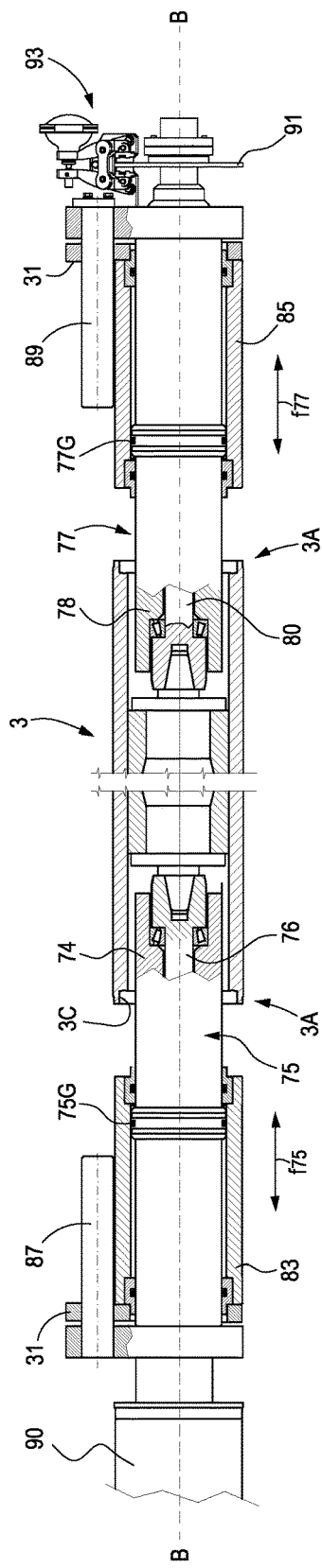
FIG. 2 shows a longitudinal cross-section of one of the embossing rollers of the embossing-laminating device shown in FIG. 1 supported in the operating position.
Figure 3:
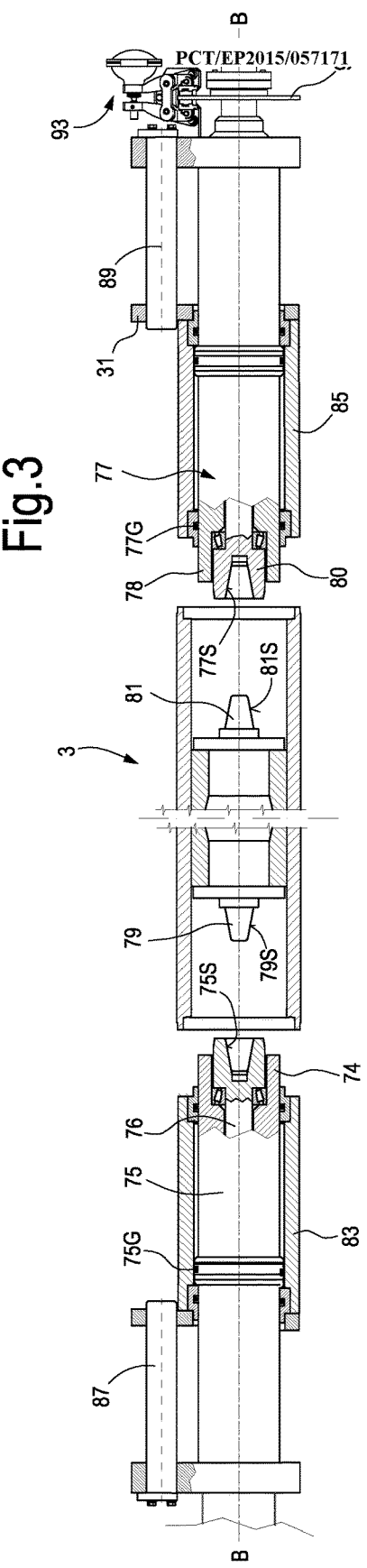
FIG. 3 shows a similar cross-section to that shown in FIG. 2, with the roller disengaged from the support tailstocks.

FIGS. 2 and 3 show a longitudinal cross-section of the embossing roller 3 and of the support and rotation tailstocks, respectively in a condition where the roller 3 is supported and torsionally coupled to the tailstocks (FIG. 2) and in a position where the embossing roller 3 is released from the tailstocks and may be removed from the embossing-laminating device 1 and replaced with another embossing roller taken from the magazine 41.

Advantageously, the embossing roller 3, and similarly the other embossing rollers provided in the embossing-laminating device 1 and in the magazine 41, have end zones indicated with 3A. The tailstocks, schematically indicated with 75 and 77, are configured to be supported by the side members 31 of the embossing-laminating device and to engage and disengage the embossing roller by moving with an axial movement indicated by the double arrows f75 and f77.

The ends 3A of the embossing roller 3 are open and allow the insertion of the tailstocks 75, 77, which engage with conical bodies 79, 81 fixed on the inside of the embossing roller 3, which overall has a hollow cylindrical form. The conical bodies 79, 81 have concave or convex conical surfaces 79S and 81S respectively. The convex conical surfaces 79S, 81S engage with corresponding concave conical surfaces 75S and 77S, which are provided with the tailstocks 75 and 77 respectively.

The movement of the tailstocks 75, 77 alternately engages and disengages the pairs of conical surfaces 75S, 79S and 77S, 81S, as shown in FIGS. 2 and 3.

Movement of the tailstocks 75 and 77 in the direction of the double arrows f75 and f77 may be obtained for example by means of a cylinder-piston actuation system in which the piston may be formed by the tailstocks 75, 77 themselves. For example, as illustrated schematically in FIGS. 2 and 3, the tailstocks 75, 77 are slidingly housed in respective cylinders 83, 85. The cylinders 83, 85 are fixed to the side members 31 of the embossing-laminating device 1. With the tailstocks 75, 77, these form respective cylinder-piston actuators, of which the tailstocks 75, 77 form the pistons, provided with seals 75G and 77G.

By introducing a pressurized fluid, for example oil, alternatively into one or other of the two chambers where the seals 75G and 77G divide the internal volume of the cylinders 83, 85, it is possible to move the tailstocks 75 and 77 in the direction of the arrows f75 and f77 to engage them with and disengage them from the embossing roller 3.

In more detail, each tailstock 75 and 77 comprises an outer body 74, 78, respectively, slidingly inserted into the cylinder 83, 85. On the inside of the outer body 74, 78, which may be cylindrical in shape, a respective rotating shaft 76, 80 is housed. The shafts 76, 80 are coaxial and their axis is indicated with B-B in the figure. Conical surfaces 75S, 77S are formed on the ends of the rotating shafts 76, 80 facing towards the inside of the side members. The rotating shafts 76, 80 are supported by bearings on the inside of the outer bodies 74, 78, so that they can rotate freely inside the outer bodies 74, 78, but be axially constrained and move integrally therewith in the direction of the arrows f75, f77.

In advantageous embodiments, each outer body 74, 78 of the tailstocks 75, 77 may be provided with a respective arm 87, 89 rigidly constrained to the outer body 74, 78 and slidingly engaged in a seat in the respective side 31. This arrangement enables the tailstocks 75, 77 to move in the direction of f75 and f77 but prevents the outer bodies 74, 78 from rotating around the axis B-B.

Advantageously, the tailstocks 75 may be motor-driven, for example by an electric motor 90, which rotates the shaft 76 and consequently the embossing roller 3 and the shaft 80, when the tailstocks 75, 77 are in the position shown in FIG. 2.

In some embodiments, a braking disc 91 may be fitted onto the shaft 80 of the tailstock 77, and co-acts with a brake shoe 93. The braking system 91, 93 is used to brake the shafts 76, 80 of the tailstocks 75, 77 and the embossing roller 3 when the latter needs to be replaced, or for any other reason during operation of the embossing-laminating device.

FIG. 4 shows a different embodiment of the system of tailstocks 77, 75. The same reference numbers indicate parts that are equal or equivalent to those illustrated in FIGS. 2 and 3. In the embodiment shown in FIG. 4 the tailstocks 75 and 77 have convex conical surfaces 75S and 77S respectively, which co-act with concave conical surfaces 79S and 81S provided on the blocks 79, 81 housed inside the embossing roller 3.

In advantageous embodiments, the torsional coupling between the tailstocks 75, 77 (or more precisely the shafts 76, 80) and the embossing roller 3 may be made more reliable by means of front-engaging teeth 79D and 81D, provided on the blocks 79 and 81 of the embossing roller 3 and co-acting with corresponding front-engagement teeth 75D and 77D formed on the tailstocks 75 and 77, respectively. Front-engagement teeth may also be provided alternatively in the configuration shown in FIGS. 2 and 3.

Front-engagement teeth also have the advantage, when engaging, of providing the angular phase between the motor and the engraved embossing pattern and maintaining it error-free during operation. This makes it easier to find the angular phase in the event of a change of roller and consequent change of the engraved embossing pattern.

The embossing-laminating device described so far can operate in various modes based on the number of embossing rollers that need to be replaced. The sequence shown in FIGS. 5A to 5L illustrates an operating mode wherein both embossing rollers 3, 9 are changed with two of the three embossing rollers 47, 49 and 51 housed in the magazine 41. Experts in the field will understand that the operating mode described below with reference to the sequence shown in FIGS. 5A-5L is only one of the possible operating modes of the embossing-laminating device 1, which can operate in different modes depending for example on how many rollers need to be replaced (one or two) and/or depending on how many rollers are available in the magazine 41.

In the operating sequence shown in FIGS. 5A-5L, there are only two replacement embossing rollers in the magazine 41, indicated with 47 and 49. They replace at the same time the two rollers 3 and 9 located in the machine.

Figure 5A:
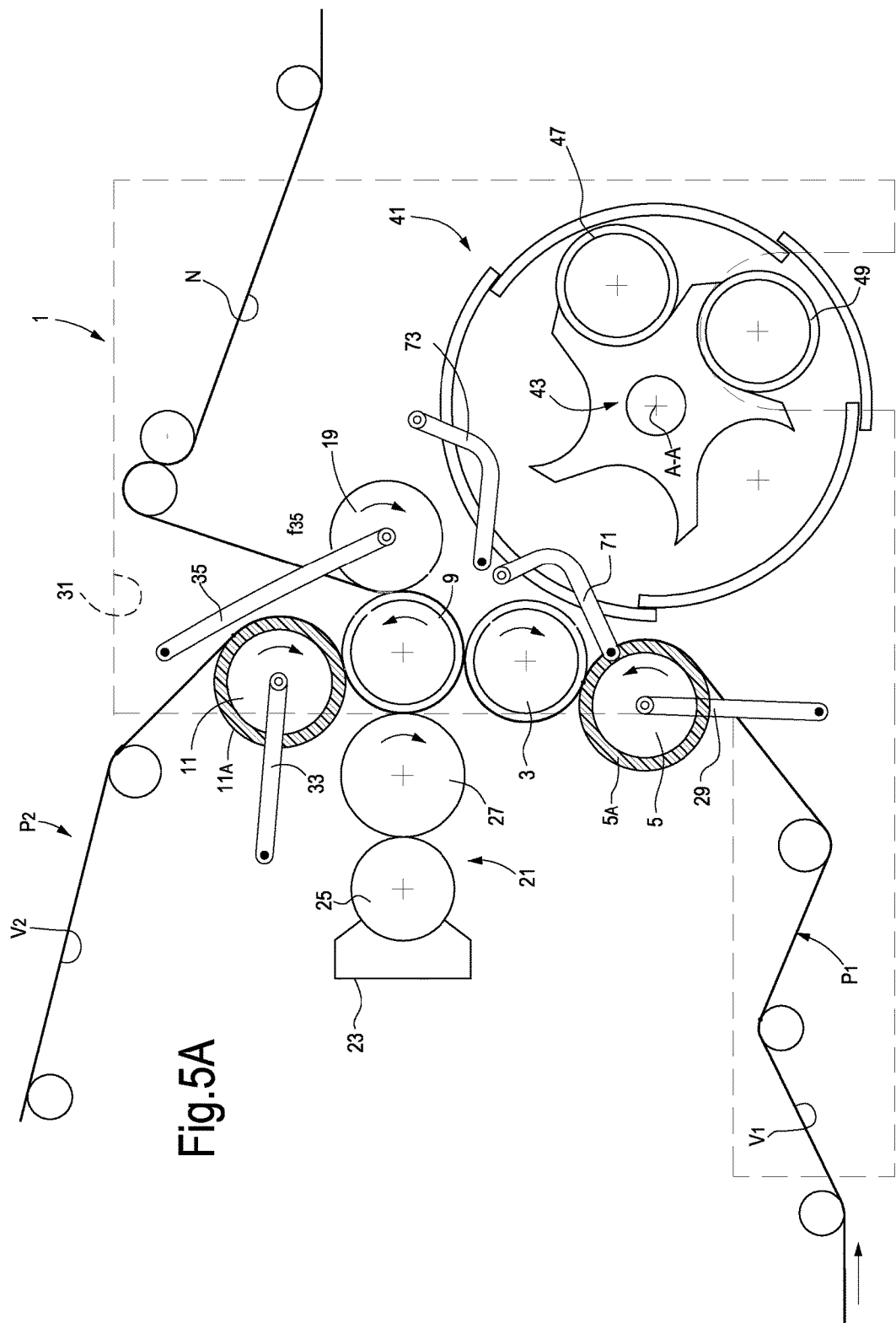

The operating sequence shown in FIGS. 5A to 5L is as follows. In FIG. 5A the embossing-laminating device 1 is in operation, with the two plies V1 and V2 being fed along the paths P1 and P2 to be embossed in the two embossing nips 7 and 13 and laminated and glued in the laminating nip 17. The manipulators 71 and 73 are in the rest position. The magazine 41 is closed.

FIG. 5B shows a subsequent phase in which, after the embossing-laminating device 1 has stopped, the two pressure rollers 5 and 11 have been moved away from the respective embossing rollers 3 and 9, and the laminating roller 19 has been moved away from the embossing roller 9. The gluing unit 21 has been moved away from the embossing roller 9.

Figure 5C:
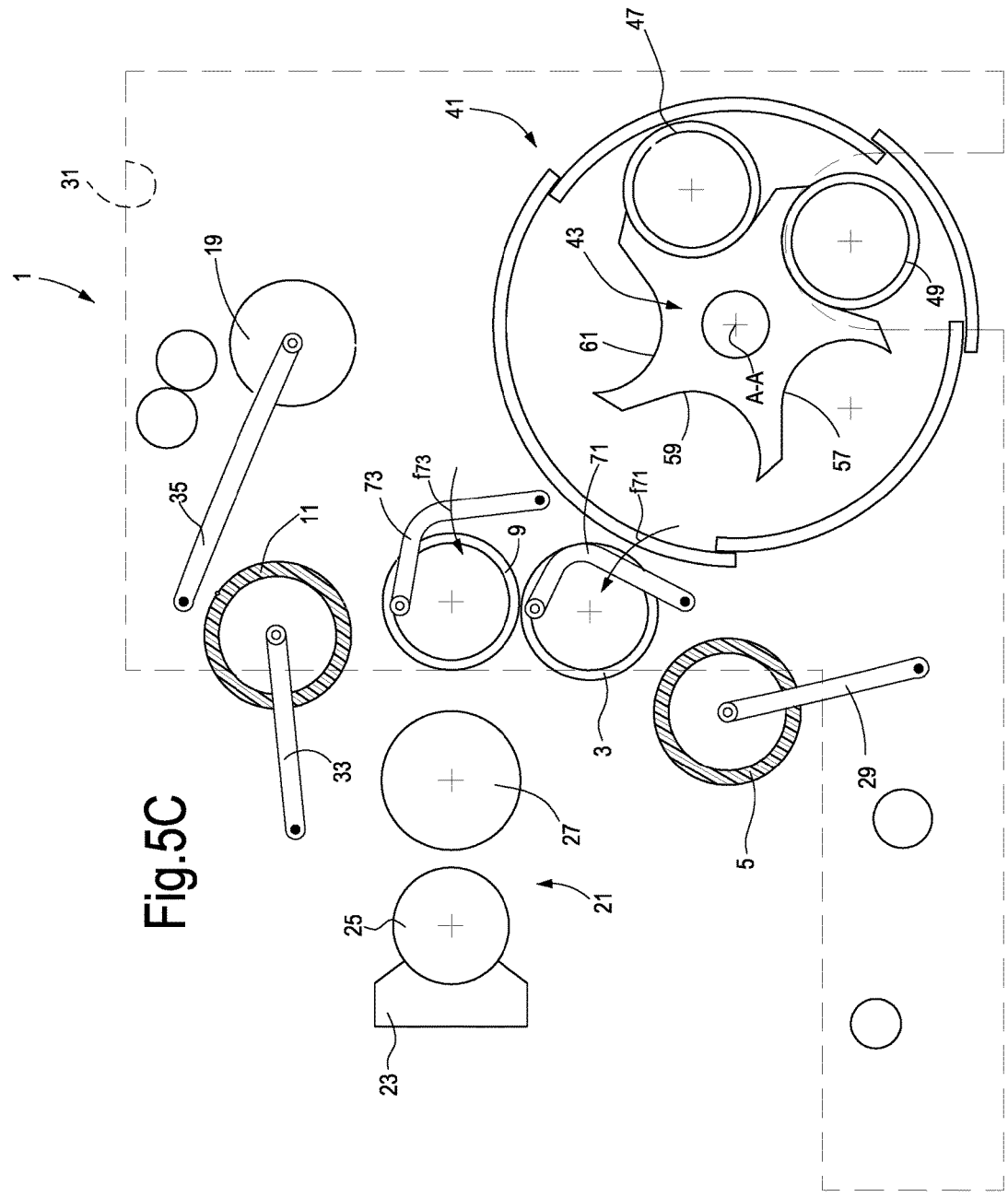

The next FIG. 5C shows the phase in which the manipulators 71 and 73 move into position to engage the embossing rollers 3 and 9. The conformation of the manipulators 71, 73 will be described in more detail with reference to FIGS. 6A-10B. It is sufficient for the moment to note that these manipulators engage the ends of the embossing rollers 3 and 9, before the embossing rollers are released by the tailstocks 75 and 77, which take the position shown in FIG. 3.

FIG. 5D shows the transfer phase of the embossing rollers 3 and 9 from their position in the embossing-laminating device 1 into the magazine 41. To enable the transfer, the magazine 41 has been opened, for example by rotating the hatch 65 around the axis A-A of the rotating part 43 of the magazine 41. The two free seats 59 and 61 of the magazine 41 are located in the area of the opening made accessible by the hatch 65. The embossing rollers 3 and 9 taken by the manipulators 71 and 73 from their position in the embossing-laminating device 1 are placed in these seats.

Figure 5F:
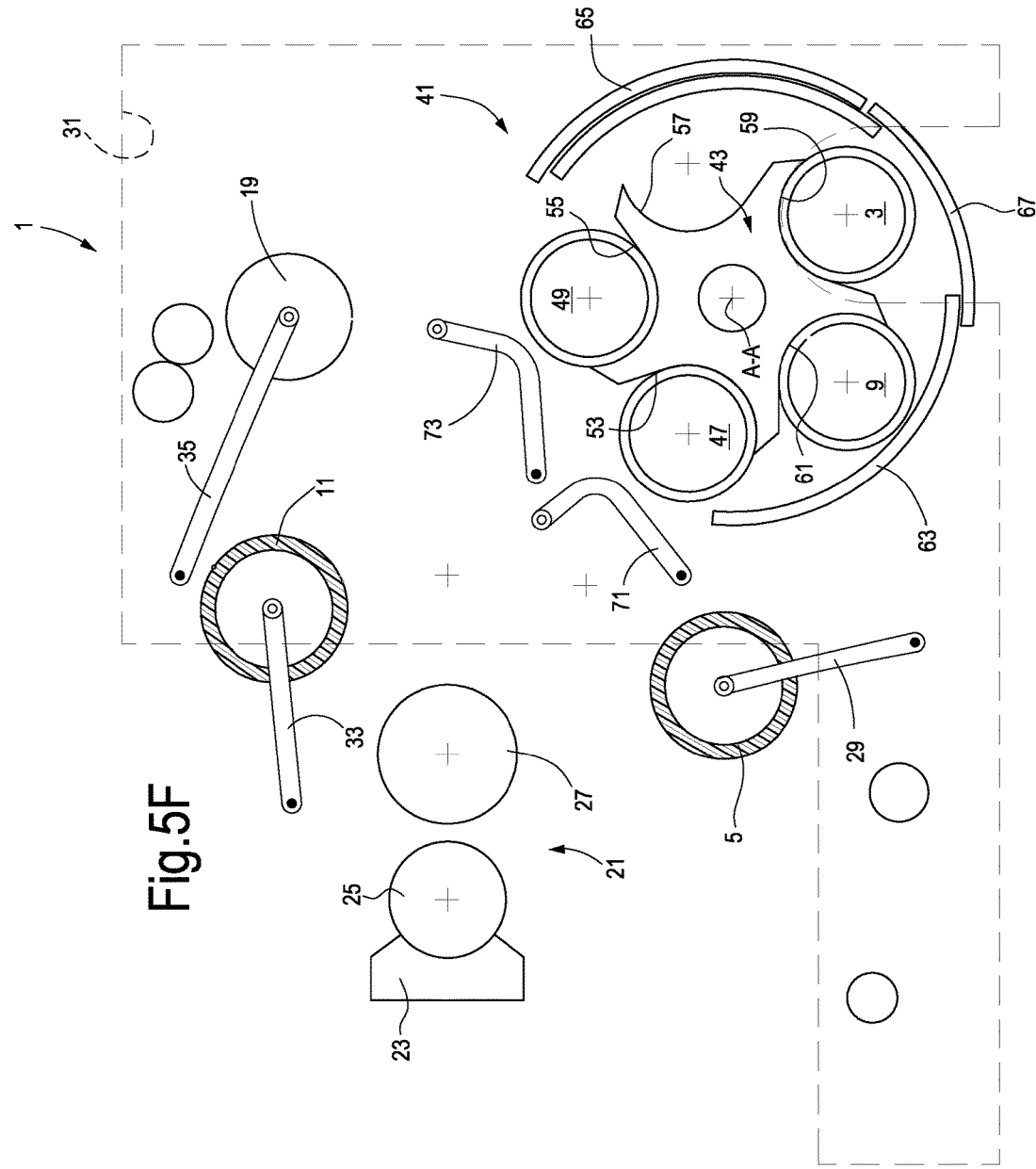

FIG. 5E shows the next phase, in which the embossing rollers 3 and 9 have been released in the seats 59 and 61 and the manipulators 71 and 73 have moved away, disengaging from the embossing rollers 3 and 9 to allow the rotation of the rotating unit 43 of the magazine 41. FIG. 5F shows the position in which the rotating unit 43 is positioned after the rotation (arrow f43, FIG. 5E). The two seats 61 and 59 into which the previously-working embossing rollers 3 and 9 have been inserted are located in the lower part of the magazine 41, while the seats 53 and 55, in which the embossing rollers 47 and 49 are located, are positioned in the area of the opening of the magazine 41. The empty seat 57 is not used in this operating mode.

Figure 5G:
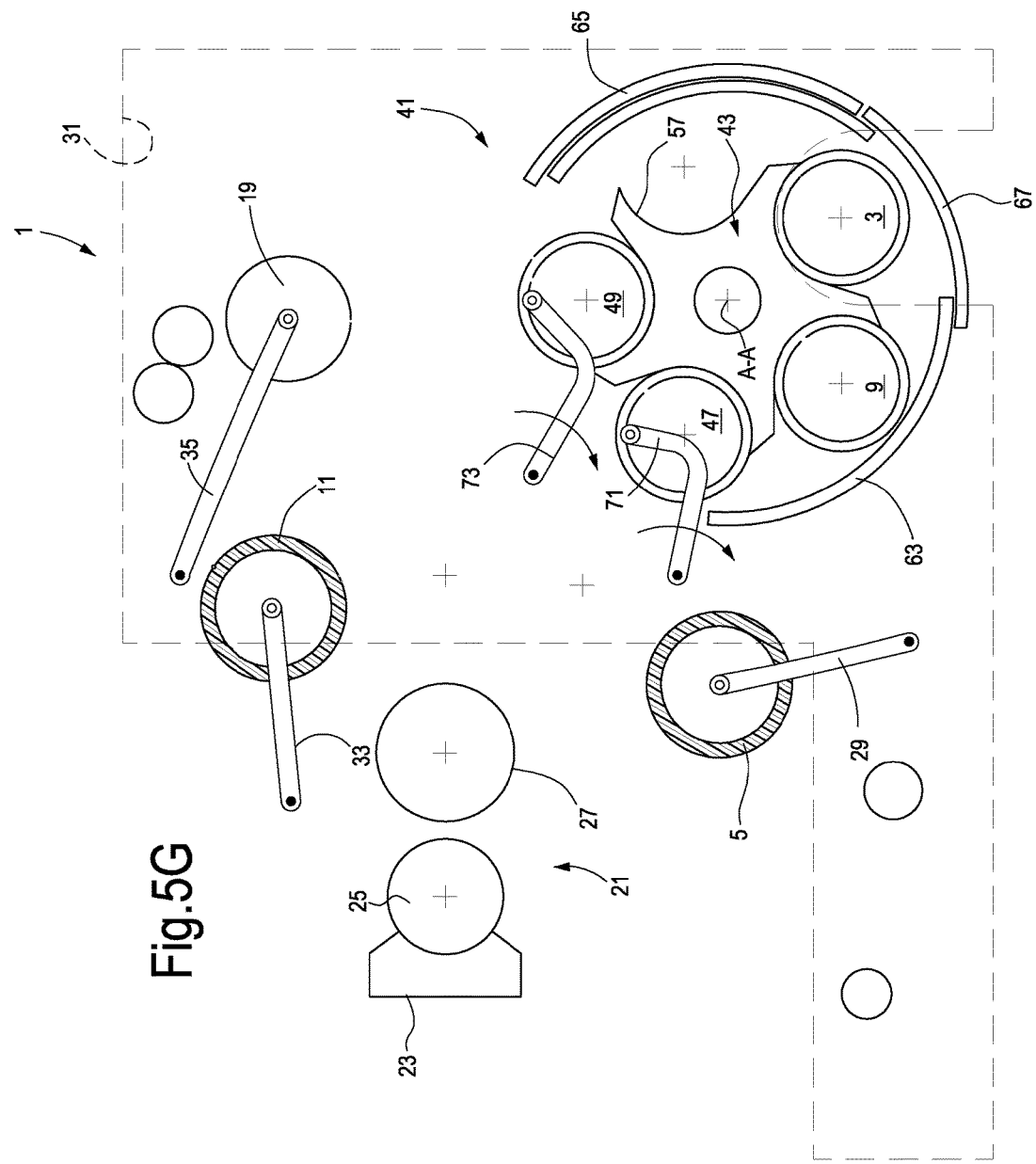

Once the position shown in FIG. 5F has been reached, the rotating unit 43 remains stationary and the manipulators 71 and 73 move to pick up the embossing rollers 47 and 49, as shown in FIG. 5G.

Figure 5H:
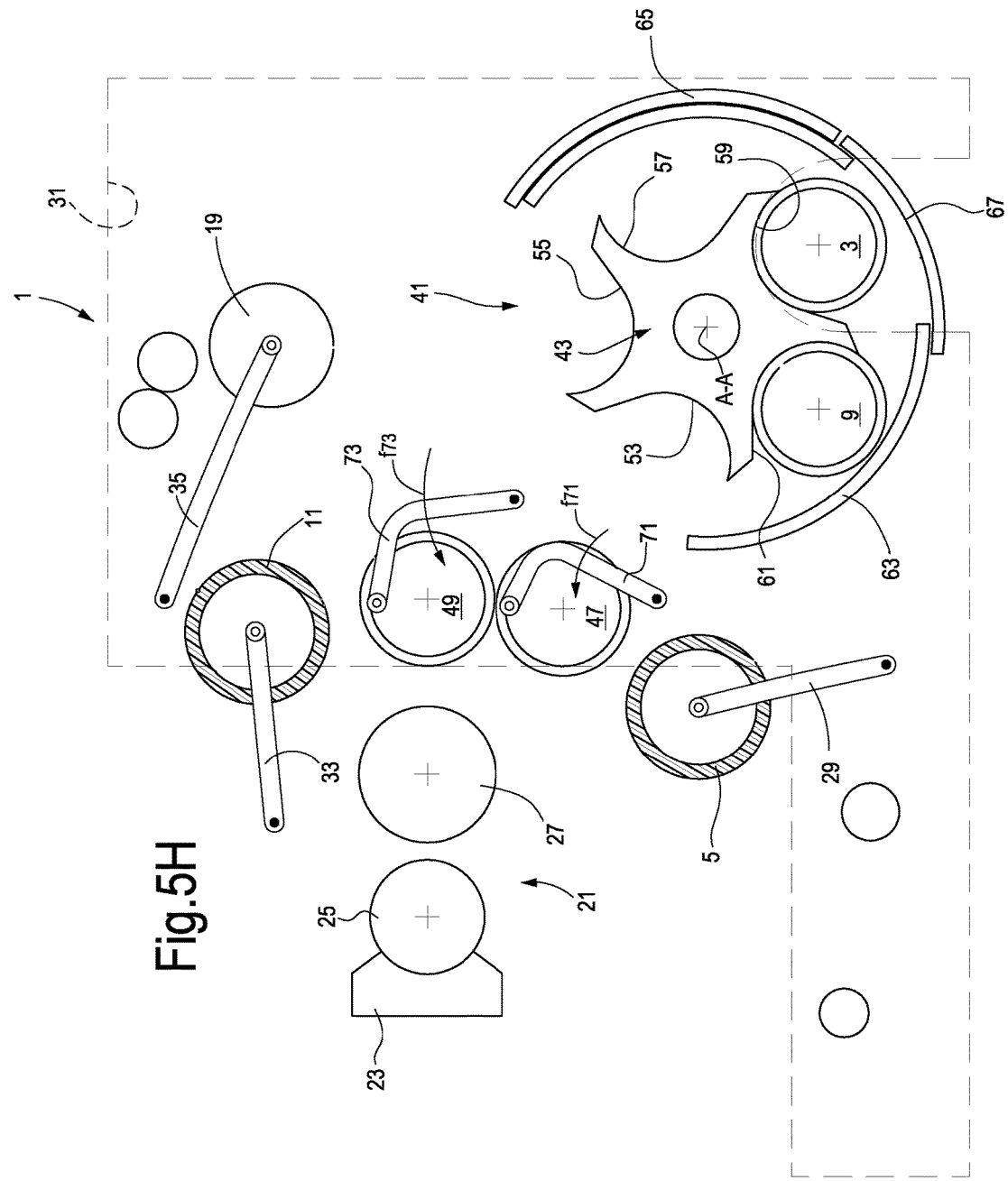
Figure 5I:
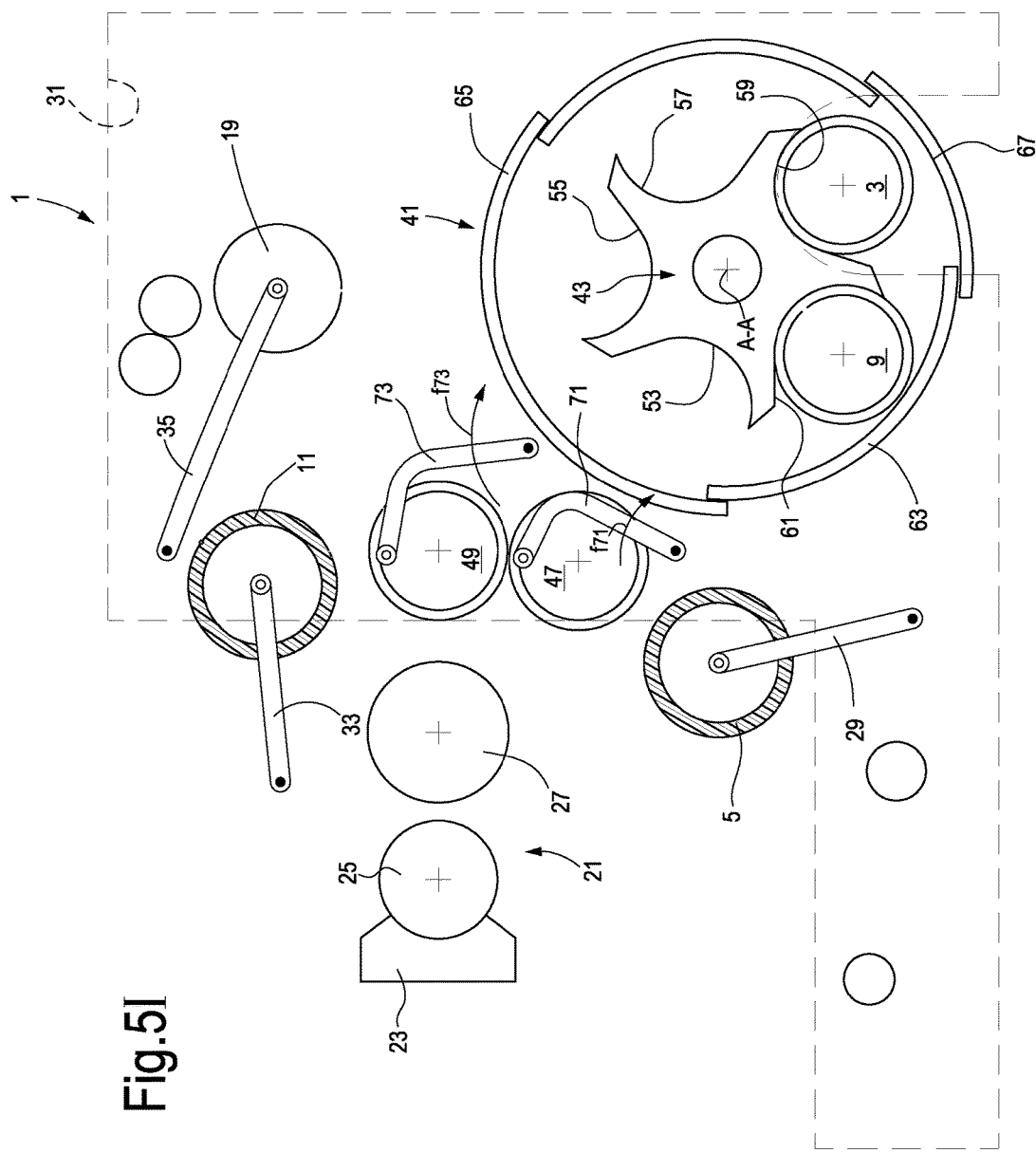

Once the manipulators 71 and 73 have engaged the ends of the embossing rollers 47, 49, they transfer them into the operating position between the side members 31 of the embossing-laminating device 1, as shown in FIG. 5H. Once this position has been reached, in which the embossing rollers 47 and 49 are axially aligned with the tailstocks 75 and 77, the tailstocks move toward one another to torsionally engage and support the embossing rollers 47 and 49. The manipulators 71 and 73 can then disengage from the embossing rollers 47 and 49 and return to the rest position, as shown in FIG. 5I. The magazine 41 can be closed again by rotating the hatch 65.

FIG. 5J shows the next phase, in which the pressure rollers 5 and 11 together with the laminating roller 19 are brought back towards the respective embossing rollers 47, 49 (which replace rollers 3, 9) to press against them. The gluing unit 21 is brought next to the embossing roller 49.

Figure 5K:
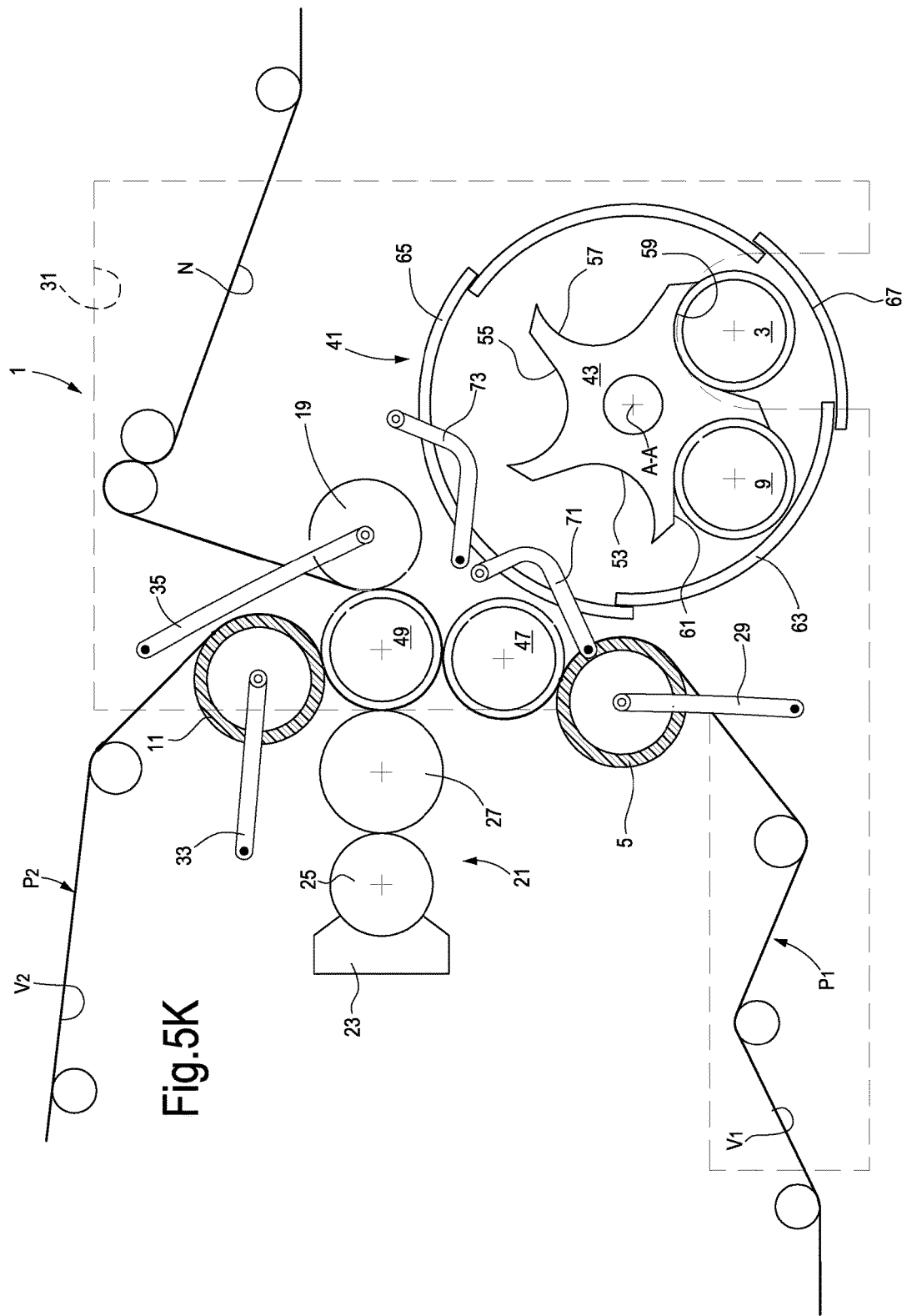

In FIG. 5K the embossing-laminating device 1 has resumed production, with the plies V1 and V2 fed along the feed paths P1 and P2 to form the multi-ply web material N at the exit to the embossing-laminating device.

The next FIG. 5L shows a further possible phase of replacing the embossing rollers 3 and 9, discharged into the magazine 41, with other embossing rollers that may be taken from a storage zone, when in the next operating cycle the embossing rollers 47 and 49 need to be replaced by rollers other than the embossing rollers 3 and 9.

To that end, a lower opening of the magazine 41 closed by the auxiliary hatch 67 may be provided. This lower opening may be placed in the area of a guide 101 along which a shuttle 103 can move, which can be placed under the lower opening of the magazine 41 to receive the embossing rollers contained in the magazine 41 and which need to be replaced with different rollers.

FIG. 5L shows the phase in which the embossing roller 9 is placed on the shuttle 103 to be removed from the magazine 41. The shuttle 103 may be moved parallel or orthogonal to the axis of rotation A-A of the rotating part 43 to be introduced under the magazine 41. In the example shown, the movement is parallel to the axis A-A and is achieved on special guides.

In other embodiments it may be that the rollers to be replaced in the magazine 41 are inserted from above, for example by extending the opening closed by the hatch 65. To that end, suspended transfer devices may be used, such as an overhead crane, for example.

FIGS. 6A to 10B illustrate in more detail the configuration and movements of the manipulators 71, 73 in one possible embodiment. The two manipulators 71, 73 differ substantially only for the length of the rotating arms that form part of them. Therefore, FIGS. 6A-10B show only one manipulator, and more precisely the device 71, since it is understood that the manipulator 73 is configured in the same manner.

FIGS. 6A-10B show a sequence of taking, transferring and releasing an embossing roller into the magazine 41. FIGS. 6A, 7A, 8A, 9A and 10A show a schematic side view, in which the rotation movement of the manipulator 71 is illustrated. The corresponding FIGS. 6B, 7B, 8B, 9B and 10B illustrate, in a schematic cross-section along the axis of the embossing roller and the tailstocks, the relative movement of the pivoting arms of the manipulator 71, and the movement of the tailstocks and the embossing roller.

The pivoting arms forming part of the manipulators 71, 73 may be curved as shown schematically in FIGS. 1 and 6A, 7A, 8A, 9A and 10A, to avoid collision against the tailstocks 75, 77.

With initial reference to FIGS. 6A and 6B, the manipulator 71 is arranged with the pivoting arms thereof in a position to engage the embossing roller 3. The pivoting arms, indicated in the figures with 71B, each have an end pin 71P which extends roughly parallel to the pivoting axis or fulcrum 71A and is located at the distal end, i.e. at the end of the arm 71B opposite to the end pivoted around the axis 71A.

The arms 71B are provided with a movement schematically shown by the arrow fx (FIG. 6B) for moving toward and away from the embossing roller, which must be engaged and transferred from the embossing-laminating device 1 to the magazine 41 or vice-versa.

FIG. 6B shows the position in which the arms 71B are at a sufficient distance from the embossing roller 3 so as not to interfere with it. The pin 71P of the arms 71B is located in front of the roller 3 on the outside thereof in the upper zone.

FIGS. 7A and 7B show the next position taken by the arms 71B, which have moved towards one another in the direction indicated by the arrow fx. In this manner, the pins 71P of the arms 71 have been inserted in an annular channel 3C provided around the edge of the respective end 3A of the embossing roller 3. The position of the pins 71P and of the channels 3C may be such that in the position shown in the FIGS. 7A, 7B there is no mutual contact between the pin 71P and channel 3C, but rather a small mutual distance of 1-2 mm, for example.

In the next phase, illustrated in FIGS. 8A, 8B, the tailstocks 75 and 77 move away from the embossing roller 3 causing the roller to rest with the channels 3C thereof on the pins 71P of the arms 71B of the manipulator 71.

Once the tailstocks 75, 77 have refracted towards the respective side members 31 so as not to interfere with the movement of the arms 71B of the manipulator 71, the latter may be activated to transfer the embossing roller 3 towards the magazine 41, by rotating around the axis 71A.

FIGS. 9A and 9B schematically show the phase in which the arms 71B of the manipulator 71 are rotated so as to reach the position for inserting the embossing roller 3 into the magazine 41, a position corresponding to that illustrated in FIG. 5D.

Once the position shown in FIG. 9B has been reached, the embossing roller 3 may be released by the manipulator 71. This is achieved by moving the two arms 71B in the direction indicated by the arrow fx' (FIG. 10B), moving them away from one another and disengaging the pins 71P from the respective channels 3C of the embossing roller 3.

In this manner the embossing roller 3 is released into the respective seat in the rotating unit 43 of the magazine 41 and the manipulator 71 can rotate around the axis 71A to move out of the way of the rotating unit 43 and allow the latter to rotate one or two steps to perform the successive phases of taking the new embossing roller from one of the magazine seats. The movement performed by the manipulator 71 to take the new embossing roller is substantially the opposite with respect to that described above with reference to FIGS. 6A-10B.

During the embossing roller transfer movement described above, the pin 71P can roll inside the annular channel 3C. This thereby obtains the degree of freedom required to allow movement between the embossing roller 3 and pin during the transfer of the embossing roller 3 towards the magazine.

Figure 11:
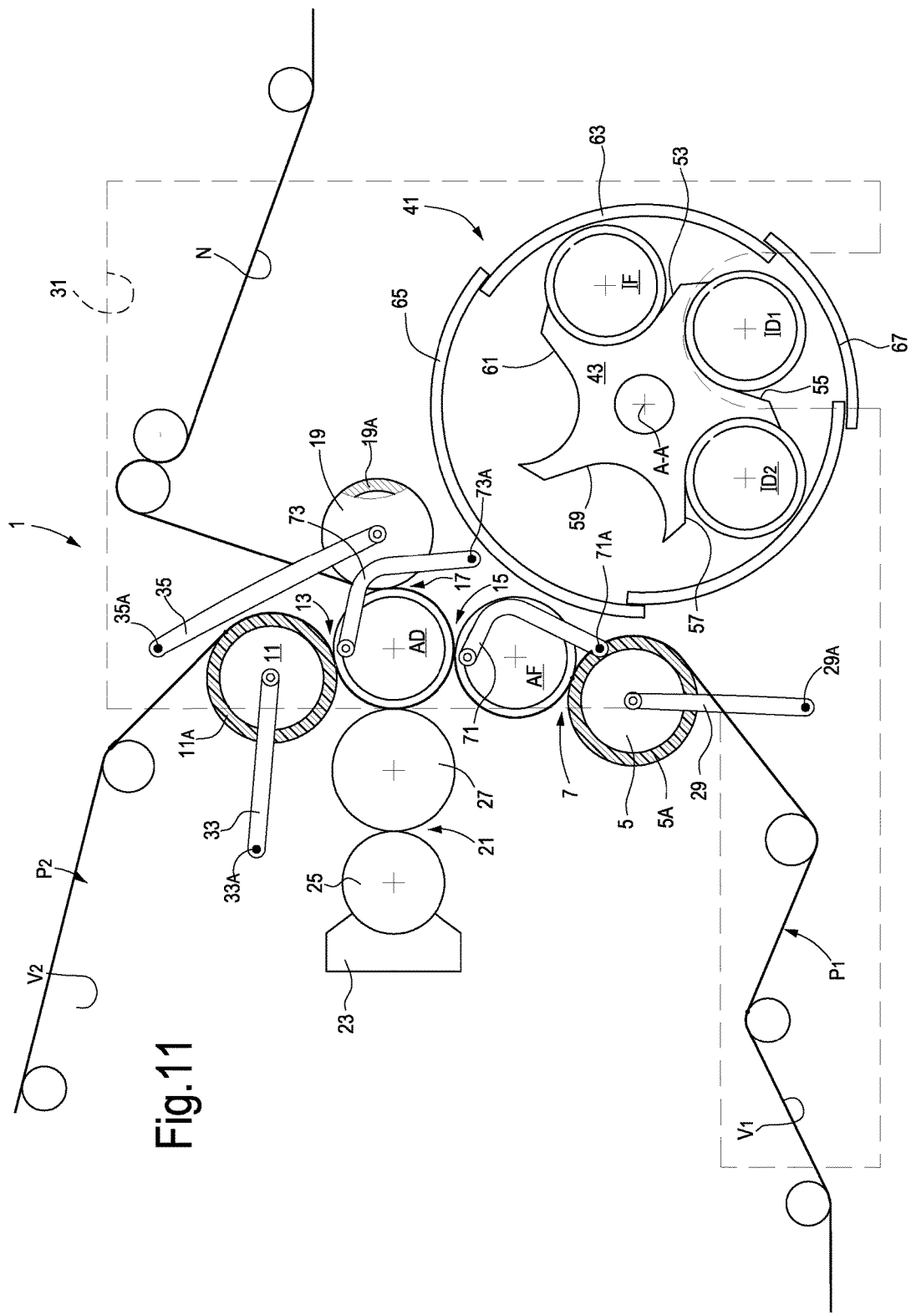
FIGS. 11 and 12 show a schematic side view of two different possible fittings of the embossing-laminating device.

The embossing-laminating device described above can operate in different modes in addition to that illustrated previously with reference to the sequence of FIGS. 5A-5L. For example, FIG. 11 illustrates a version in which three interchangeable embossing rollers are arranged in the magazine 41 and can replace the two embossing rollers 3, 9 that are temporarily located in the embossing-laminating device 1. In this figure the embossing rollers are indicated as follows:

embossing roller AF in the lower part of the embossing-laminating device 1 (corresponding to the embossing roller indicated with 3 in FIG. 1);

embossing roller AD in the upper part of the embossing-laminating device 1 (corresponding to the embossing roller indicated with 9 in FIG. 1);

IF, ID1, ID2 three embossing rollers arranged in the magazine 41.

For example, the rollers designated with the letter A may be configured to emboss a web material N intended for the production of kitchen rolls. More particularly, the roller AD can be provided with a decorative pattern with which the ply V2 is processed, while the embossing roller AF can be provided with a background pattern, with which the ply V1 is embossed. The background pattern may, for example, be formed of a plurality of protuberances with a simple geometric shape (frusto-conical or frusto-pyramidal) having small dimensions for the formation of a micro-embossing, which has a mainly technical function.

The embossing rollers IF, ID1 and ID2, on the other hand, may be provided with protuberances intended for the production of toilet paper. More particularly, the roller IF may have protuberances intended to generate a background embossing, for example a micro-embossing, on the ply V1. The embossing rollers ID1 and ID2 may be engraved with two different decorations for processing the upper or outer ply V2 of the hygiene product.

The machine set up as shown in FIG. 11 is arranged to produce a web material N intended for the production of kitchen rolls in which the ply V1 is embossed with a background embossing by means of the embossing roller AF, and the ply V2, which during winding is on the outside of the roll, is given a decorative embossing by means of the roller AD.

To switch from this basic configuration to the production of a second product, for example toilet paper, the procedure involves stopping the machine and replacing for example with a simultaneous movement both the rollers AD, AF with the rollers ID1 and IF, respectively.

If it is required to produce a hygiene material with the same background embossing design provided by the roller IF on the ply V1 and a different pattern on the ply V2, it is sufficient to replace the embossing roller ID1 with the embossing roller ID2 by means of a procedure similar to that described above, with which a single embossing roller is replaced instead of two.

Figure 12:
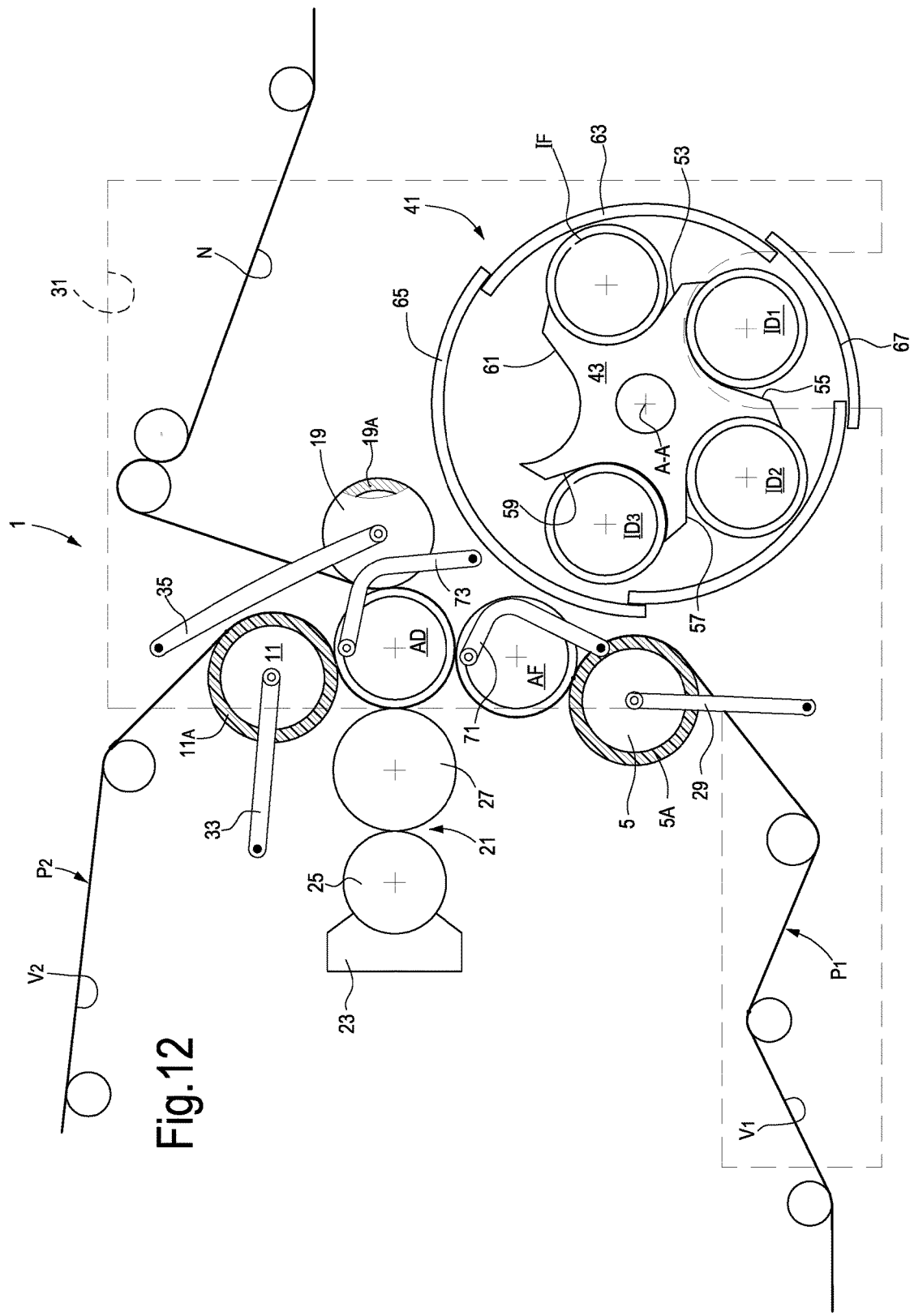

By adding a third engraved roller to the magazine 41 it is possible to have greater flexibility in the setup of the embossing-laminating device 1. FIG. 12 shows a configuration in which the magazine 41 contains four interchangeable embossing rollers IF, ID1, ID2 and ID3. With this setup, the machine can produce a product, for example kitchen rolls, with the rollers AD and AF that in the configuration shown in FIG. 12 are in the operating position in the embossing-laminating device 1. With appropriate replacement of the embossing rollers, the embossing-laminating device can produce three different types of hygiene product, by replacing the embossing roller AF with the embossing roller IF and the embossing roller AD with one or other of the three embossing rollers ID1, ID2 and ID3. The latter have a decorative engraving with three alternative patterns.

In other embodiments it may be that one or two rollers of the magazine 41 are intended to process one ply for the production of kitchen rolls, in which case they will replace the roller AD, which is in the embossing-laminating device 1, while the roller AF is not changed.

Note that in the case of the arrangement shown in FIG. 12, replacement of the rollers AD and AF takes place in two phases, since only one free seat is available in the magazine 41 for replacing the embossing rollers. Therefore, first the embossing roller AD will be replaced with one of the embossing rollers ID1, ID2 or ID3 by means of the manipulator 73, and then the embossing roller AF will be replaced with the embossing roller IF by means of the manipulator 71, or vice-versa.

By increasing the number of seats in the magazine 41 it is possible to increase the number of products that can be obtained by replacing the embossing rollers. Since in some embodiments it is possible to replace the embossing rollers from the magazine 41 with others coming from outside, for example by means of the slide 103 (FIG. 5L), the versatility of the embossing-laminating device is further increased.

The rotation movement of the arms of the manipulators 71, 73 makes it possible to move each embossing roller away from the operating position and insert it in the magazine, and to extract the rollers from the magazine and move them to the operating position, without colliding with the surrounding rollers, in particular the pressure rollers and/or laminating rollers and/or the other embossing roller, in the case of moving one embossing roller at a time.

FIGS. 13 to 28 show another embodiment of an embossing-laminating device. FIGS. 13 to 27 show a schematic side view of the embossing-laminating device in various phases of a process to replace the upper embossing roller.

FIG. 13 shows an embossing-laminating device 200 in a phase of producing a web material N. The web material N may be obtained by bonding two continuous plies V1, V2. In FIG. 13 the two paths of the plies V1 and V2 are indicated as a whole with P1 and P2. In other embodiments the number of plies constituting the web material N may be more than two and there may be more than two ply feed paths.

Each ply V1, V2 may be in turn formed of one or more layers, sheets or components that are overlapping and possibly bonded, for example by means of a ply-bonding unit or an embossing unit upstream of the embossing-laminating device 200.

In the embodiment illustrated, the embossing-laminating device 200 has a load bearing structure indicated as a whole with 201. The load bearing structure may comprise two side members 203 and a base structure 205.

In some embodiments, between the two side members 203 of the load bearing structure 201 a first embossing roller 207 and a second embossing roller 209 may be arranged. The first embossing roller 207 may be provided with embossing protuberances 207P, as shown in enlarged detail in FIG. 13A, while the second embossing roller 209 may be provided with embossing protuberances 209P, as shown in the enlargement illustrated in FIG. 13B.

The first embossing roller 207 may co-act with a first pressure roller 211. In some embodiments the pressure roller 211 may be coated with an outer layer 211A of yielding material, preferably elastically yielding, for example rubber. The second embossing roller 209 may co-act with a second pressure roller 213. In some embodiments the pressure roller 213 may also be coated with an outer layer 213A of yielding material, in particular elastically yielding material.

The references 207X, 209X, 211X and 213X indicate the axes of rotation of the two embossing rollers 207, 209 and of the two pressure rollers 211, 213, respectively. These axes are substantially parallel to one another.

The first embossing roller 207 and the first pressure roller 211 form between them a first embossing nip 215, through which the first ply V1 passes to be embossed by the protuberances 207P of the first embossing roller 207. When the pressure roller 211 is provided with a yielding outer coating 211A, the protuberances 207P are pressed against the first pressure roller 211 and penetrate the yielding coating 211A thereby permanently deforming the ply V1.

The second embossing roller 209 and the second pressure roller 213 form a second embossing nip 217, through which the second ply V2 passes. The second ply V2 is embossed in a manner similar to the first ply V1, due to the effect of the protuberances 209P of the second embossing roller 209, which are pressed against the second embossing roller 213. If this roller is provided with an elastically yielding coating 213A, the embossing protuberances 209P penetrate the yielding coating and cause the permanent deformation of the ply V2.

The two pressure rollers 211, 213 may be supported da arms or other members that allow a movement toward and away from the respective embossing rollers 207, 209 for the purposes that will be explained below. Actuators (not shown), for example cylinder-piston actuators, may be used to press the pressure roller 211 against the first embossing roller 207 and the second pressure roller 213 against the second embossing roller 209.

In some embodiments the two embossing rollers 207, 209 may be configured to work tip-to-tip, i.e. with their protuberances 207P, 209P pressed against one another in a nip 219 formed between the two embossing rollers 207, 209.

In other embodiments the embossing-laminating device 200 may comprise a laminating roller 221 pressed against the embossing roller 209 and forming therewith a laminating nip 223. In this manner the two plies V1 and V2 can be laminated between the second embossing roller 209 and the laminating roller 221. In the nip 219 the embossing rollers 207, 209 are slightly apart from one another, so that the two plies V1, V2 do not touch. In this case the embossing unit can create an embossed material using the so-called 'nested' technique, with the embossing protuberances of the ply V2 nesting between the embossing protuberances of the ply V1 and vice-versa.

In some embodiments the embossing-laminating device 200 may be configured to work alternatively using the tip-to-tip technique or using the nested technique. To that end, it is possible for example that the embossing rollers are movable parallel or orthogonal to their axes and that the laminating roller is movable alternatively in an active position and in an inactive position.

The embossing-laminating device 200 may comprise a glue delivery unit 225. The glue delivery unit 225 may comprise a glue source 227, a first patterned roller or anilox roller 229, which takes glue from the glue source 227, and a second applicator cliché roller 231, which receives the glue from the patterned roller 229 and distributes it to portions of the embossed ply V2 adhering to the second embossing roller 209. In general glue is applied in the area of some at least of the heads of the embossing protuberances 209P with which the embossing roller 209 is provided, on the portions of ply embossed by the embossing protuberances 209P.

In some embodiments, the glue delivery unit 225 is mounted on a slide or carriage 233 which can move in the direction of the double arrow f233, for example along guides 235 carried by an element of the fixed structure 201. The movement in the direction of the double arrow f233 may be controlled by a specific actuator, for example a cylinder-piston actuator, an electric motor, or by means of any other type of suitable actuator, not shown.

In some embodiments the carriage 233 is associated with one or more substantially vertical uprights 237 on which guides can be arranged for the movement of a slide 239 movable in the direction of the double arrow f239 along the upright(s) 237. In some embodiments two uprights 237 placed next to the side members 203 may be provided. A respective slide 239 may be arranged on each upright. In the drawing, only one upright and one slide are visible, it being understood that the second upright and the second slide are located behind the upright and the slide visible in the drawing.

A suitable actuator (not shown) may be provided to control the lifting and lowering movement of the slide 239 or of each slide 239 in the direction of the double arrow f239. To that end, for example, there may be a threaded bar driven by a motor, for example an electric motor or a hydraulic motor. The threaded bar may be engaged with a female nut carried by the slide. In other embodiments, a mechanism can be provided, comprising a toothed belt or other continuous flexible member, entrained around pulleys, at least one of which is motorized. The slide 239 may be connected to one portion of the continuous flexible member, so that movement of the belt causes movement of the slide in a vertical direction. In yet further embodiments the vertical movement of the slide 239 or of each slide 239 may be obtained by means of a rack and pinion system, for example by having a rack fixed to the upright 237 and a motorized pinion on the slide. When two uprights and two slides are provided, dual lifting and lowering mechanisms for the two slides can be used, suitably electronically coordinated and synchronized, so as to obtain a simultaneous lifting and lowering movement of the two slides 239.

In advantageous embodiments, each slide 239 carries a respective manipulator 241 which is used to move the embossing rollers for replacement of the embossing rollers 207 and/or 209 mounted in the embossing-laminating device 200 with other embossing rollers housed in a magazine described below. If two or more slides 239 are provided, the set of manipulators 241 constitutes a manipulator for movement of the embossing rollers.

As will become clear from the following description of an embossing roller replacement cycle, the manipulator 241 is provided with a compound movement, advantageously for example in a horizontal direction and in a vertical direction. This makes it possible to move the embossing roller away from the respective pressure roller and/or from the other embossing roller, to a position from which the embossing roller may be transferred to the magazine with a downward translation movement.

Figure 14:
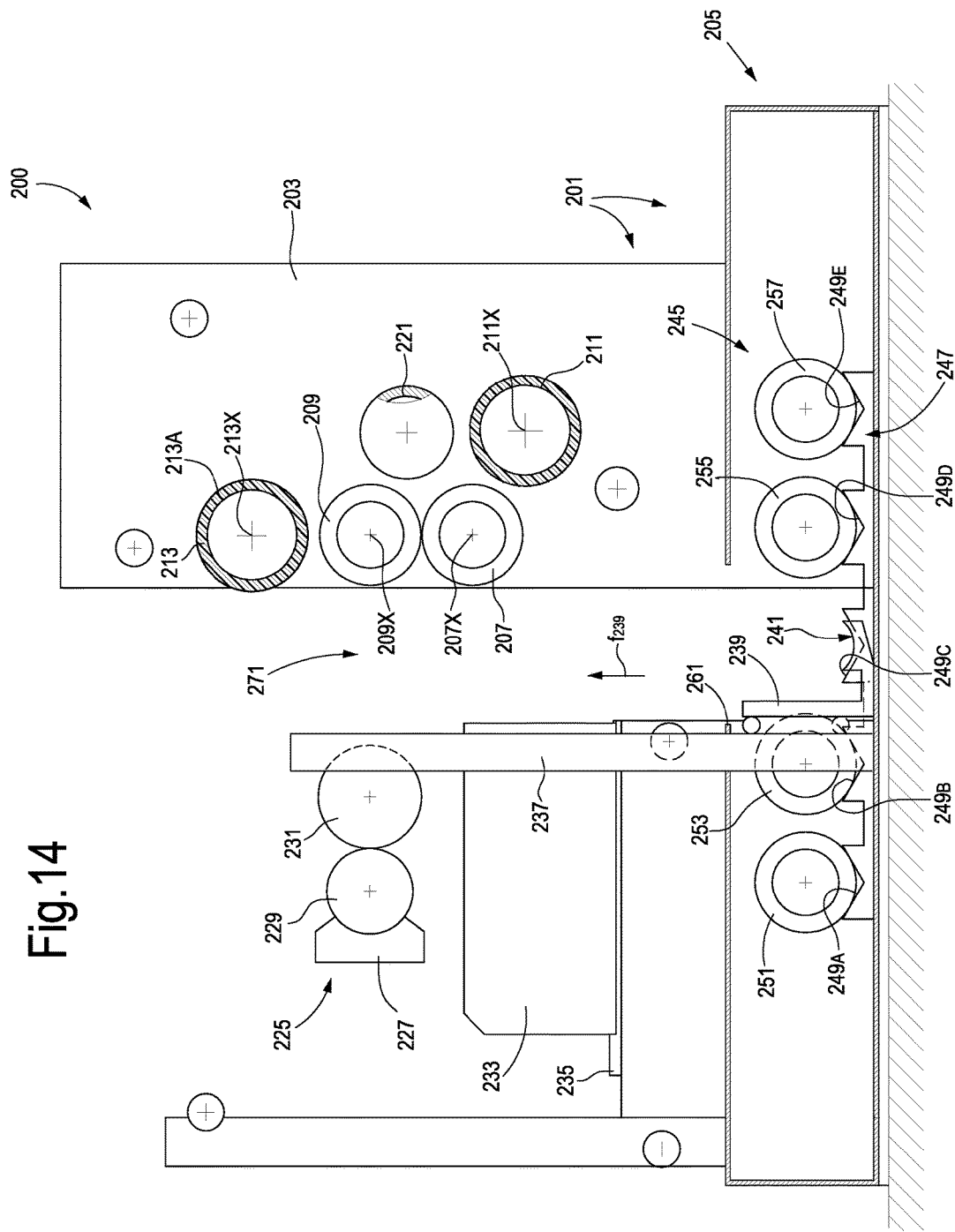

The movement of the carriage 233 in the direction of the double arrow f233 causes the horizontal movement also of the upright(s) 237, as can be seen by comparing FIGS. 13 and 14, which show two possible positions of the carriage 233. Consequently, even the slide or slides 239 and the manipulator 241 may translate horizontally together with the carriage 233.

Figure 17:
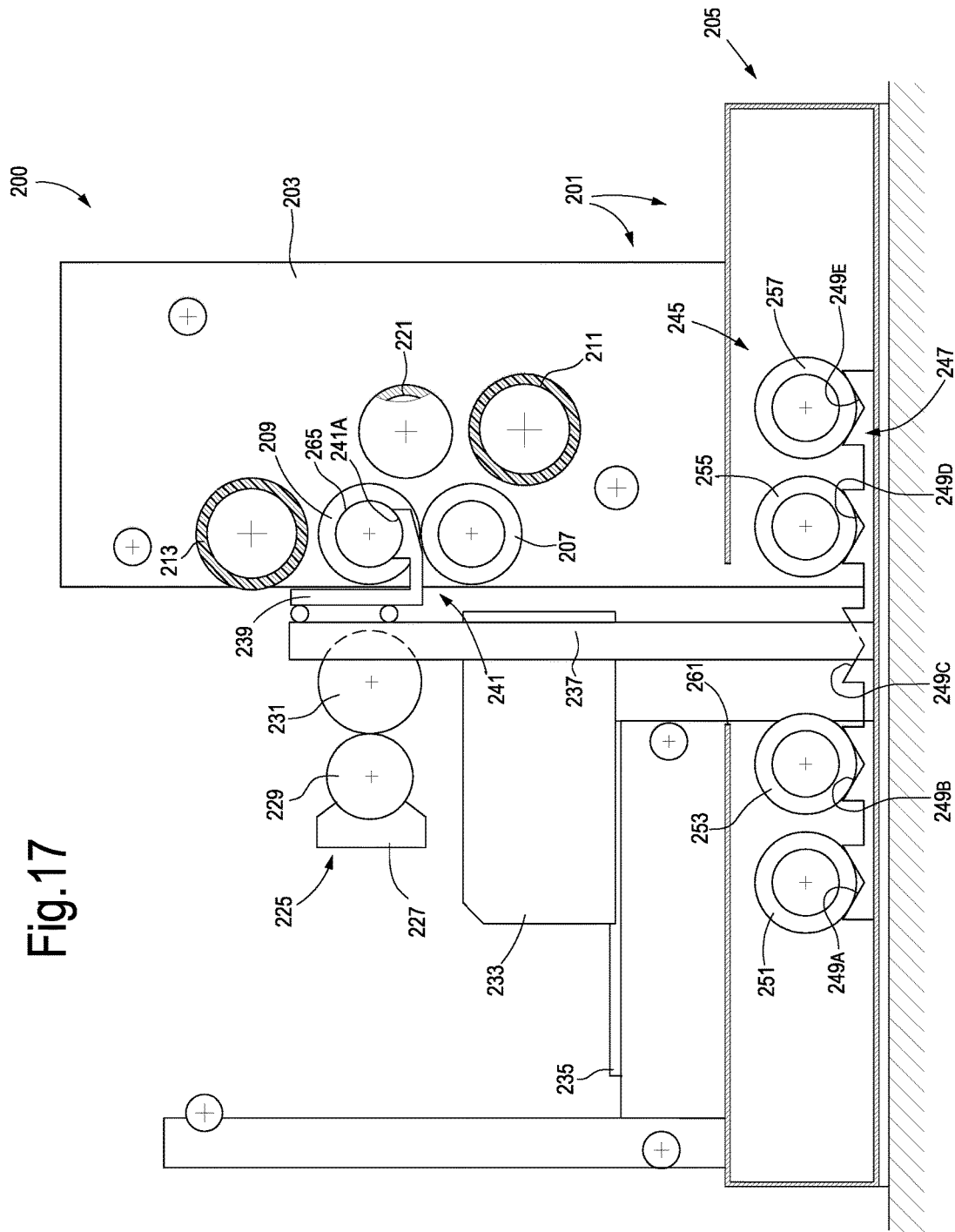
Figure 18:
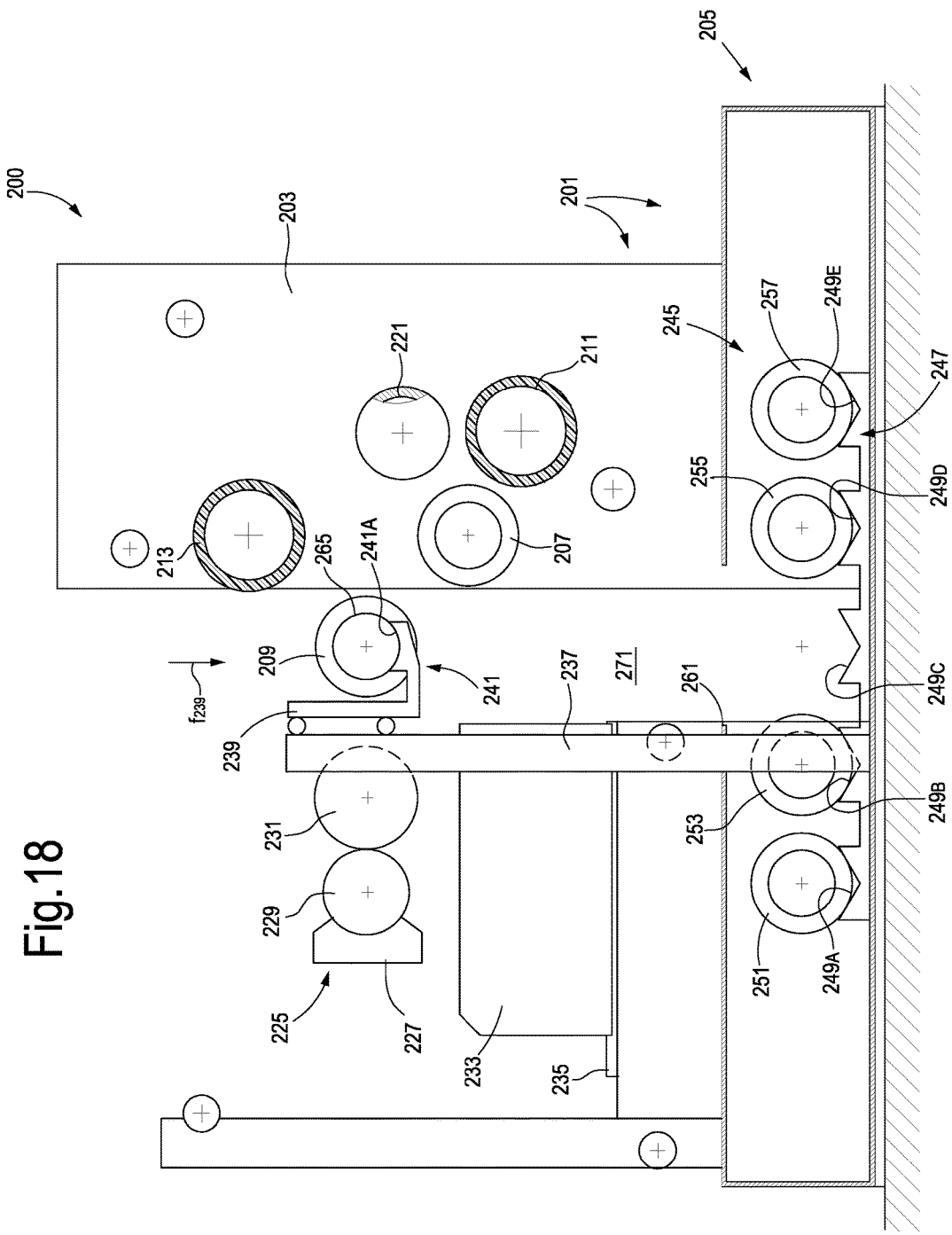
Figure 19:
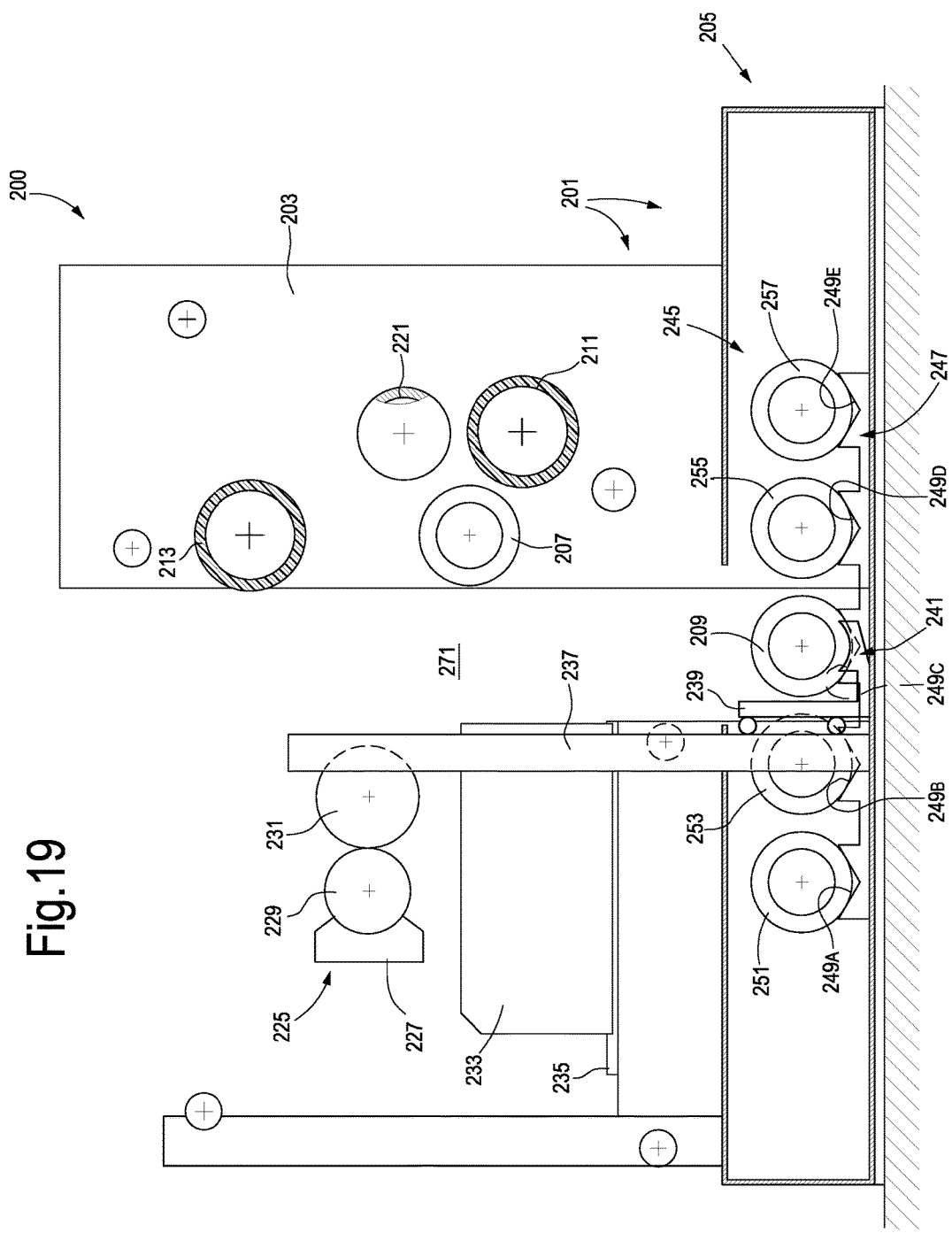
Figure 20:
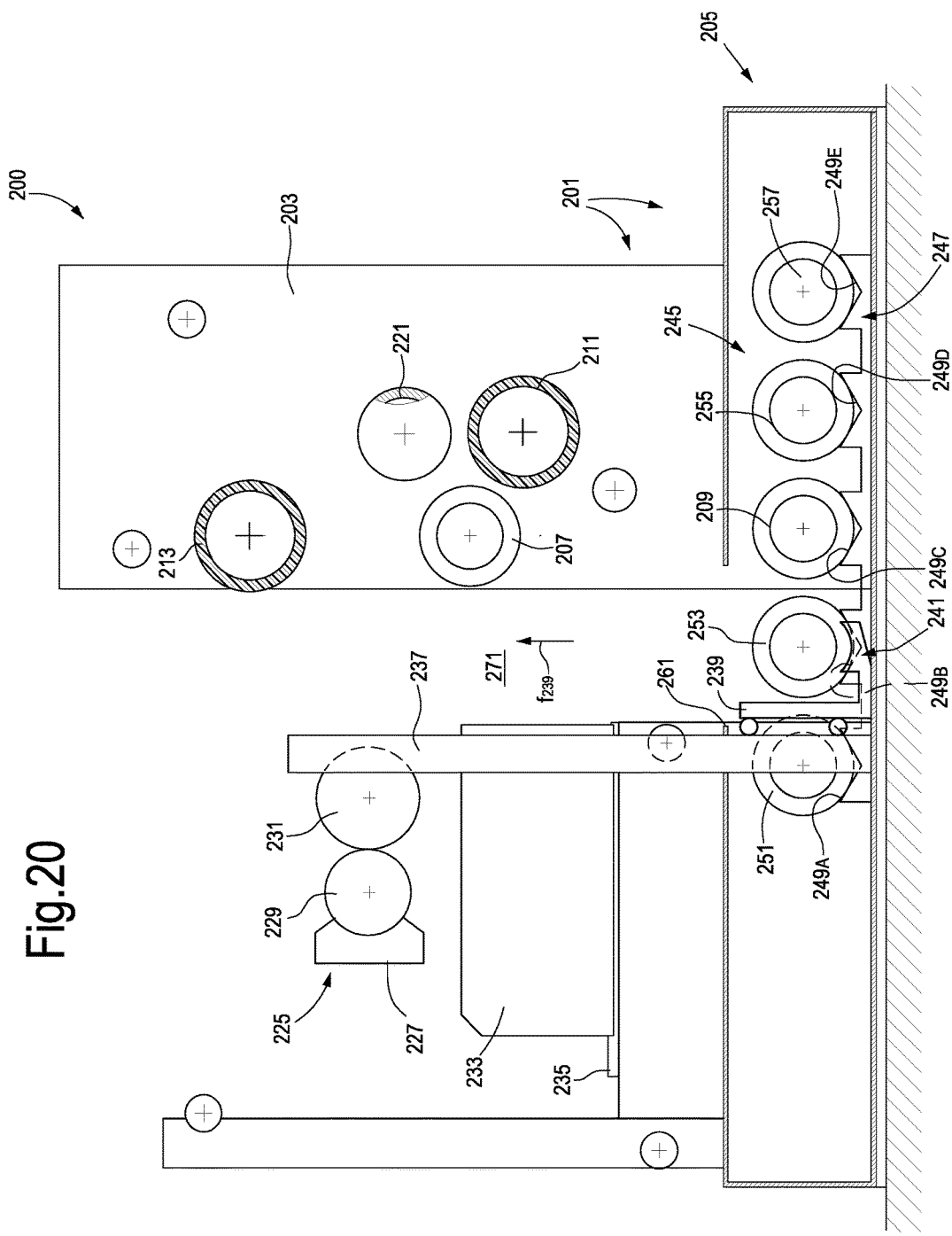

Furthermore, as described above, the slide(s) 239 may be movable for example between a lower position (FIGS. 13 and 14) and a higher position (FIGS. 17 and 18).

Overall, therefore, the slide(s) 239 and consequently the manipulator 241 are provided with a movement in the direction of two translation axes orthogonal to one another, respectively a horizontal one and a vertical one, so as to move the embossing rollers to be able to replace them, following a cycle described below.

The base structure 205 may be associated with a magazine 245 for a plurality of interchangeable embossing rollers, each of which may replace one or other of the two embossing rollers 207, 209 that in the arrangement illustrated in FIG. 13 are mounted between the side members 203 of the load bearing structure 201.

In the embodiment illustrated, the magazine 245 is housed inside the base structure 205. In some embodiments the magazine 245 may comprise a unit 247 provided with a translation movement in the direction of the double arrow f247 to allow the selection of one or other of the spare interchangeable embossing rollers contained in the magazine 245.

In the embodiment illustrated, the magazine 245 comprises five seats 249A, 249B, 249C, 249D and 249E, each adapted to house a respective embossing roller. In the configuration illustrated in FIG. 13 the magazine 245 contains four embossing rollers 251, 253, 255 and 257 housed in the seats 249A, 249B, 249D and 249E, respectively. In the condition illustrated in FIG. 13, the intermediate seat 249C is empty and is located in a roughly central position under the gluing roller 231.

As can be seen in FIG. 13, in this embodiment the base structure 205 has a dimension in the direction of movement f247 that is greater than the length of the unit 247, so that the latter can move inside the base structure 205 to bring one or other of the seats 249A-249E to an area corresponding to a passage 261 which may be formed in the upper part of the base structure 205 when the carriage 233 moves away from the embossing rollers 207, 209. The embossing rollers are transferred away from and toward the magazine 245 through the passage 261, as described below.

The embossing rollers 207, 209 that are in the machine, in a working position, may be entirely housed between the side members 203. Advantageously, the embossing rollers 207, 209 may be held and rotated by means of tailstocks 75, 77 mounted on the side members 203. The tailstocks 75, 77 (not shown in FIGS. 13 to 28) may be configured as described previously with reference to FIGS. 2, 3, 4, 4(SX) and 4(DX).

The embossing rollers 207, 209 may be disengaged from the tailstocks 75, 77 by means of an axial movement of the tailstocks 75, 77. As described above, both tailstocks 75, 77 may be provided with a movement parallel to the axes of rotation 207X, 209X of the embossing rollers 207, 209 to release the respective embossing roller on the manipulator 241 or to remove it therefrom.

Figure 28:
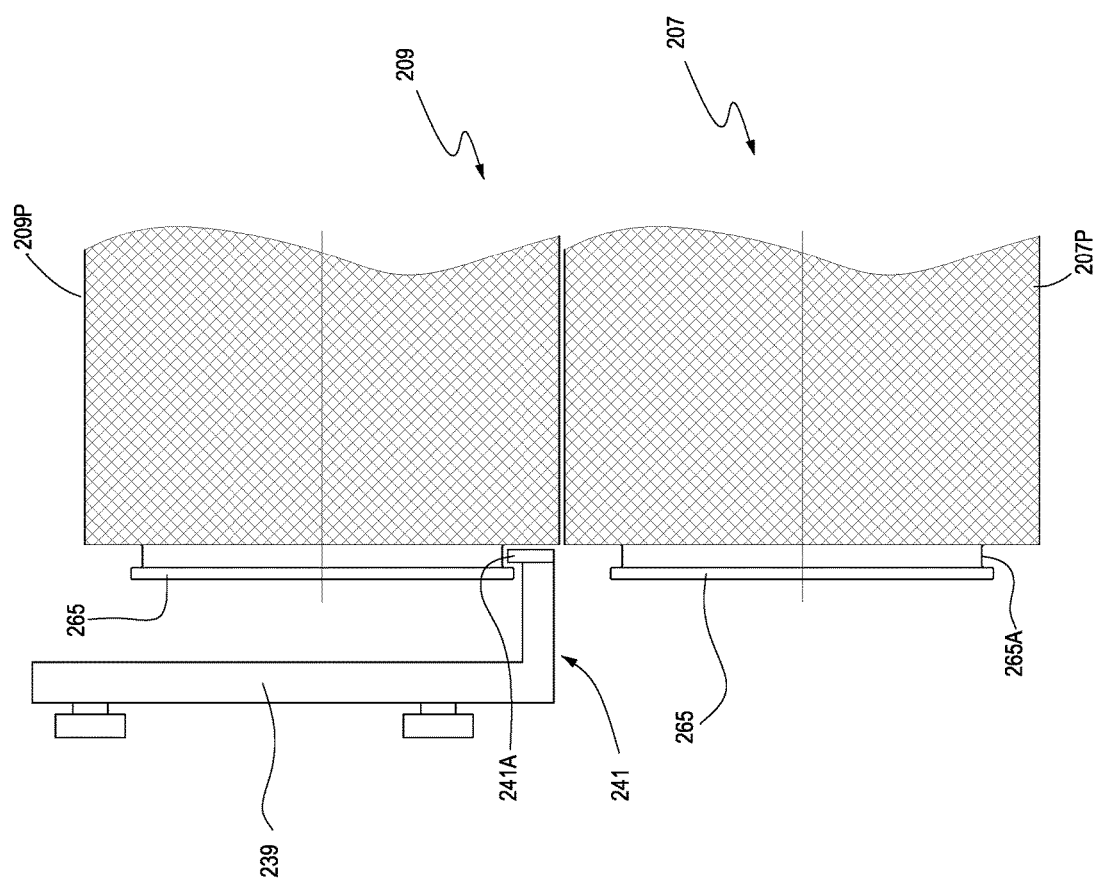
FIG. 28 shows a schematic front view along the line XXVIII-XXVIII of FIG. 22.
Figure 29:
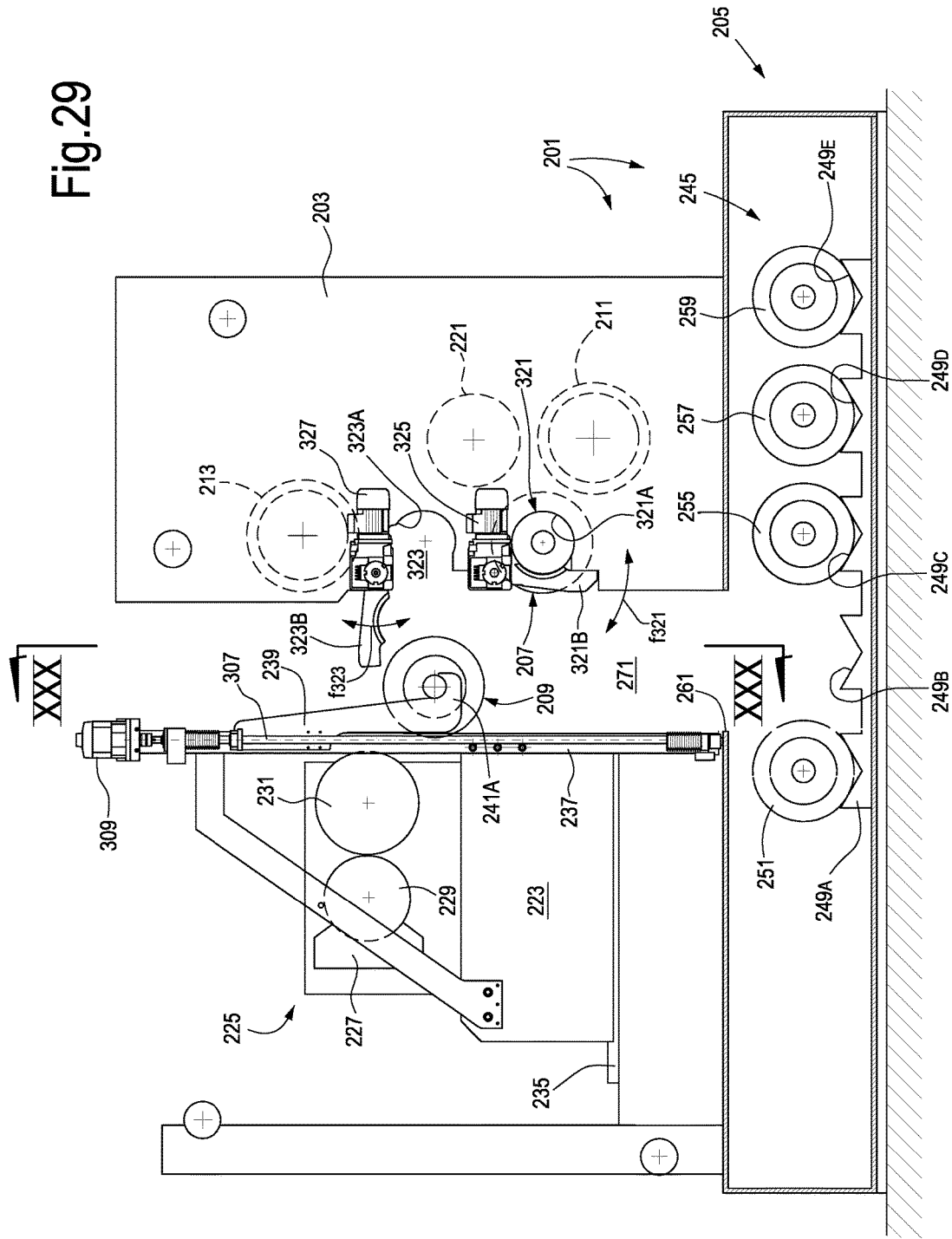
FIG. 29 shows a side view of another embodiment of an embossing-laminating device.
Figure 30:
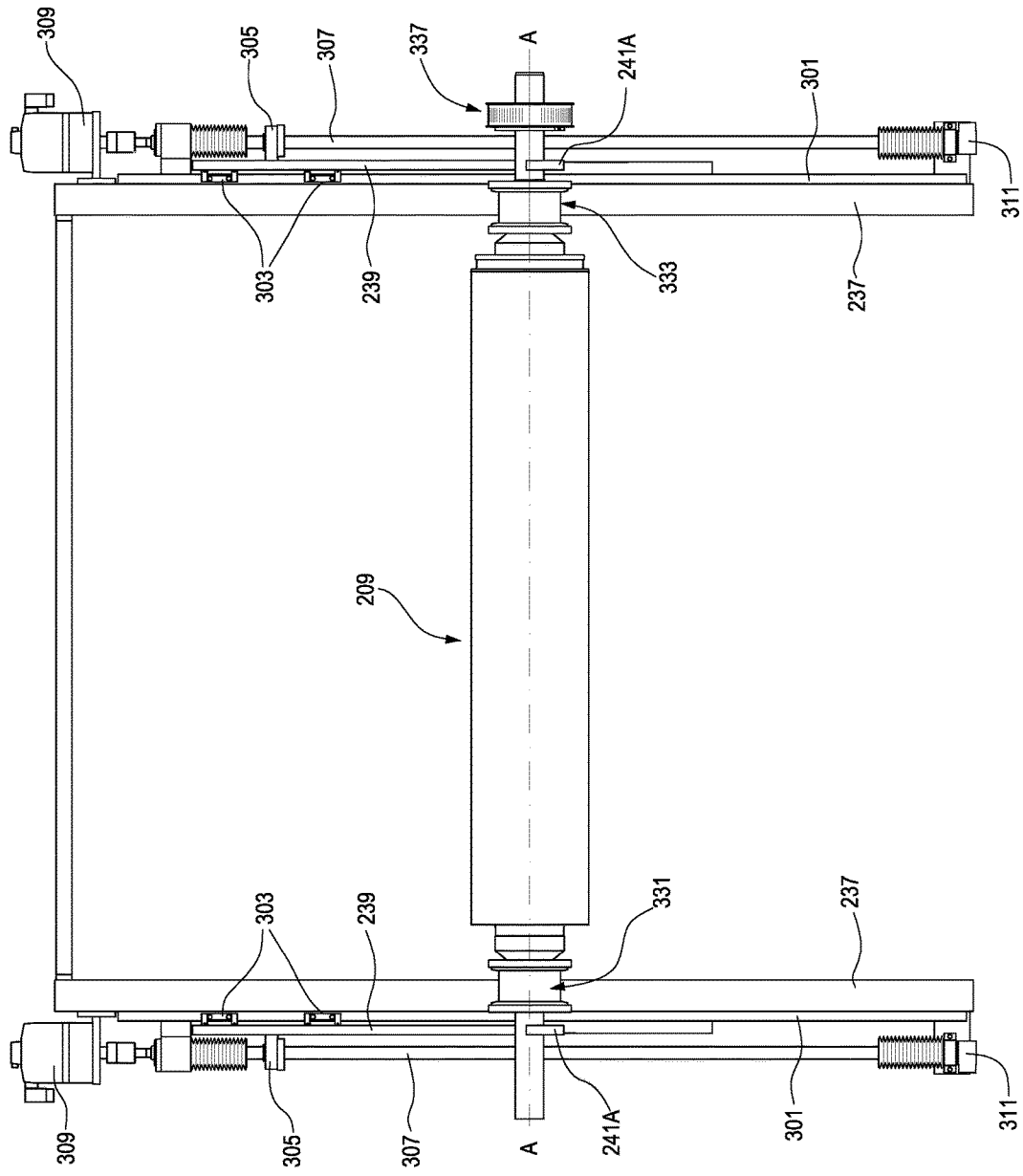
FIG. 30 shows a view along XXX-XXX in FIG. 29.

To enable the pick-up and transfer of each embossing roller from the operating position (embossing rollers 207, 209 in FIG. 13) to the rest position in one or other of the seats 249A-249E of the magazine 245 and vice-versa, in some embodiments each embossing roller may be provided with a collar or annular ridge 265, shown in particular for the two embossing rollers 207 and 209 in FIG. 28. The spare embossing rollers 251, 253, 255, 257, 259 in the magazine 245 are also provided with similar annular ridges 265.

The annular ridges 265 may define an annular channel 265A, each of which engages with a respective half-moon support element 241A of the manipulator 241. The manipulator 241, as indicated above, may be double and may comprise two half-moon support elements 241A, carried by two slides 239 movable in synchrony. Alternatively, there may be only one slide 239 carrying two half-moon support elements 241A.

Whatever the chosen arrangement, in general the manipulator 241 is configured to engage one or other of the various embossing rollers 207 or 209, 251-257 and move them in the manner described below, for replacing one, the other or both the embossing rollers 207, 209 that are in the machine with one or other of the embossing rollers 251-257 that are in the magazine 245.

Advantageously, the annular ridge or collar 265 is located outside the engraved area of the cylindrical surface of the respective roller 207, 209, where the embossing protuberances 209P, 207P are formed, as shown in FIG. 28. In this way, contact between the manipulator 241 and the embossing roller 207, 209 (and similarly with the other embossing rollers 251-257) does not damage the engraving on the outer surface of the embossing roller.

FIGS. 13 to 27 illustrate a sequence of operations for replacing the second embossing roller or upper embossing roller 209. The sequence will be described below in greater detail. It must be understood that the first lower embossing roller 207 may be replaced using a substantially similar sequence of operations.

In FIG. 13 the embossing-laminating device 200 is in an operating condition, with the first ply V1 and the second ply V2 advancing in the direction indicated by the arrows f1 and f2 towards the embossing rollers, to be separately embossed between the pairs of rollers 207, 211 and 209, 213. The embossed plies are glued and laminated between the embossing roller 209 and the laminating roller 221 and consequently form a multi-ply web material N that advances in the direction of the double arrow fN towards a downstream station, for example a rewinder, not shown. The pressure roller 213 is pressed against the embossing roller 209, while the pressure roller 211 is pressed against the embossing roller 207 and the laminating roller 221 is pressed against the embossing roller 209 to couple the plies V1, V2.

When one or both the embossing rollers 207, 209 need to be replaced with other embossing rollers located in the magazine 245, first of all the feed of the plies V1, V2 is stopped and the movement of the various rollers of the embossing-laminating device 200 is stopped. The carriage 233 may be moved away from the embossing rollers 207, 209 and from the pressure rollers 211, 213. FIG. 14 shows the step in which the carriage 233 has been moved away from the pair of side members 203 and from the embossing rollers 207, 209 leaving an opening 271 above the empty seat 249C in the magazine 245.

Figure 15:
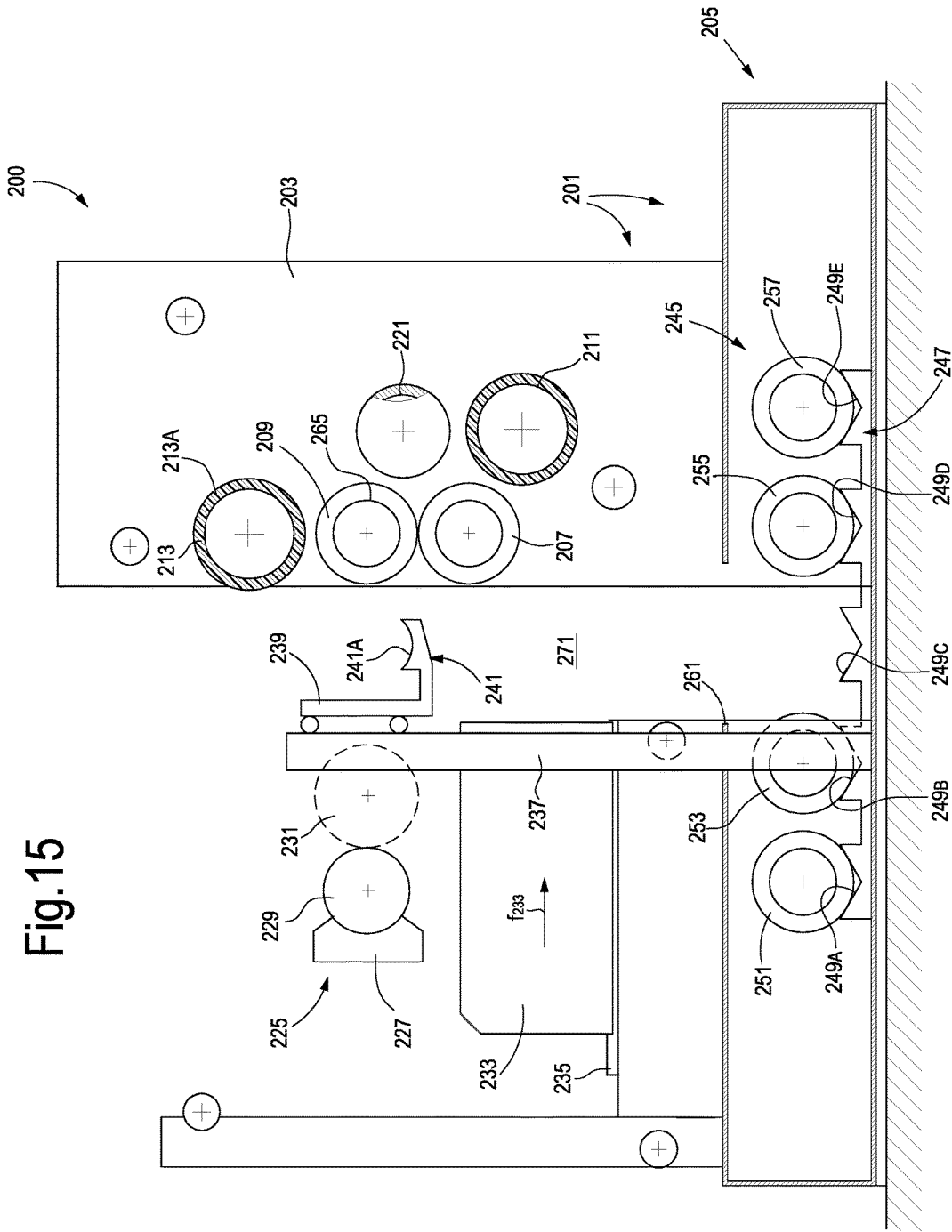
Figure 16:
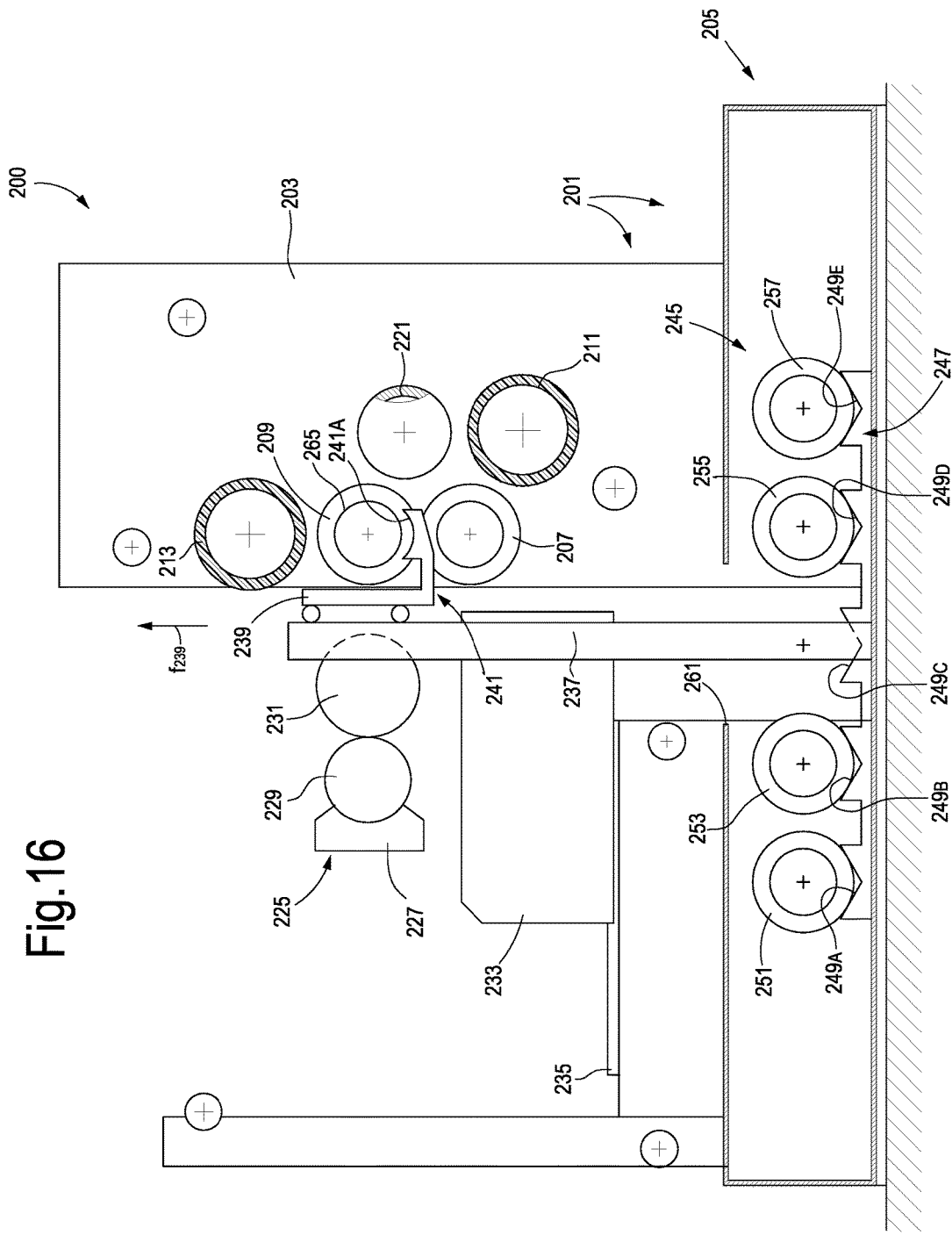

In the next step, the manipulator 241 may be lifted from the lower position, inside or in the area of the base structure 205, where it remains during normal operation of the embossing-laminating device 200. The manipulator 241 is lifted to a position in which the support elements 241A are located roughly at the height of the collars or annular ridges 265 of the upper embossing roller 209, as shown in FIG. 15.

During these embossing roller replacement operations, at an appropriate moment before removing the embossing roller from the position thereof between the tailstocks that are supporting it, at least the pressure roller co-acting with the embossing roller to be replaced is moved away from the respective embossing roller, to allow the removal of the respective embossing roller. In advantageous embodiments, it may be that all the pressure rollers and laminator roller are moved away from the embossing rollers before initiating the replacement operations. In this manner it is possible, for example, to remove the web material N and the plies V1, V2, thereby freeing the rollers.

In the next step (FIG. 16) the carriage 233 may be once again moved toward the side members 203 to bring the support elements 241A of the manipulator 241 under the collars 265.

The subsequent slight lifting of the slide 239 or pair of slides 239 carrying the support elements 241A causes the latter to come into contact with the collars or annular ridges 265 of the embossing roller 209, as shown in FIG. 17.

During these phases, the embossing roller 209 (and the other embossing roller 207) is supported by the tailstocks 75, 77 (FIGS. 2-4). Once the support elements 241A have come into contact with the annular ridges 265, the tailstocks 75, 77 can be moved away from the embossing roller 209 with an axial movement and the embossing roller 209 can be released and is then supported by the support elements 241A.

In the next operating step, the carriage 233 may be once again moved away from the pair of side members 203 and from the lower embossing roller 207. In this movement (FIG. 18), the manipulator 241 extracts the second embossing roller 209 from the side members 203 or in any case moves it away from the tailstocks (not visible in FIG. 18) that have supported the embossing roller 209 up until the previous step.

In the next step, the manipulator 241 can be lowered to bring the support elements 241A to the height of the seat 249C of the magazine 245. The seat 249C (like the other seats 249A, 249B, 249D, 249E) may be configured to support the embossing roller in the area of greatest diameter, where the engraving, which defines the embossing protuberances 207P, 209P, is provided. In this manner, the embossing roller 209 is in substance resting on the support surfaces defining the seat 249C while the support elements 241A are lowered to the lower height. In advantageous embodiments, the support surfaces of the seats 249A-249E are preferably made of yielding and/or softer material than the embossing protuberances formed on the cylindrical surface of the embossing rollers. In his manner, damage to the engraving on the embossing rollers is avoided when they are stored in the magazine 245.

If the embossing roller 209 just taken from the embossing-laminating device 200 needs to be replaced with the embossing roller 253, for example, the next step in the embossing roller replacement process consists of a one-step translation from left to right (in the drawing) of the moving unit 247. In this manner (see FIG. 20) the embossing roller 253 will be moved in the area of the opening 271, and is positioned above the support elements 241A of the manipulator 241, which are still in their lower position.

Figure 21:
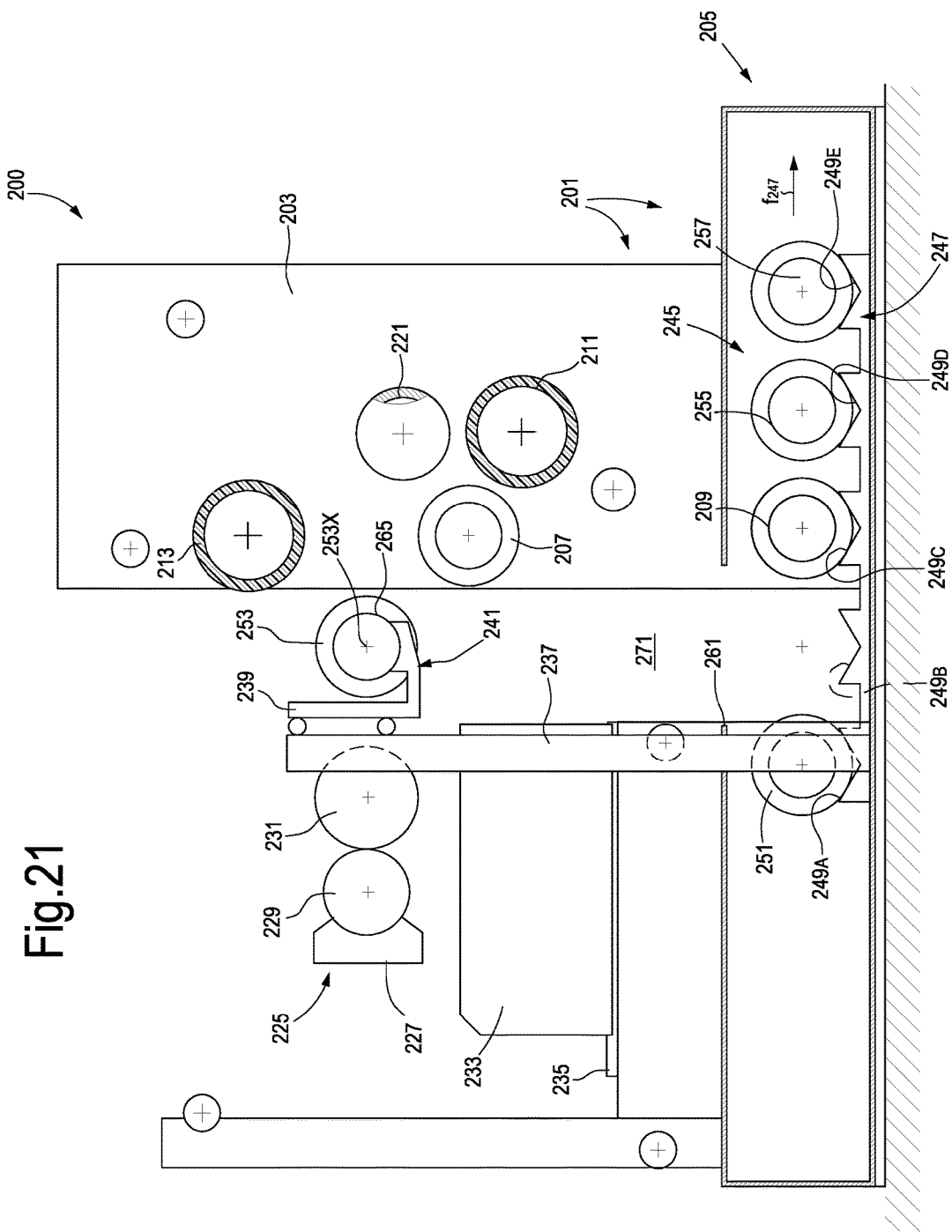
Figure 22:
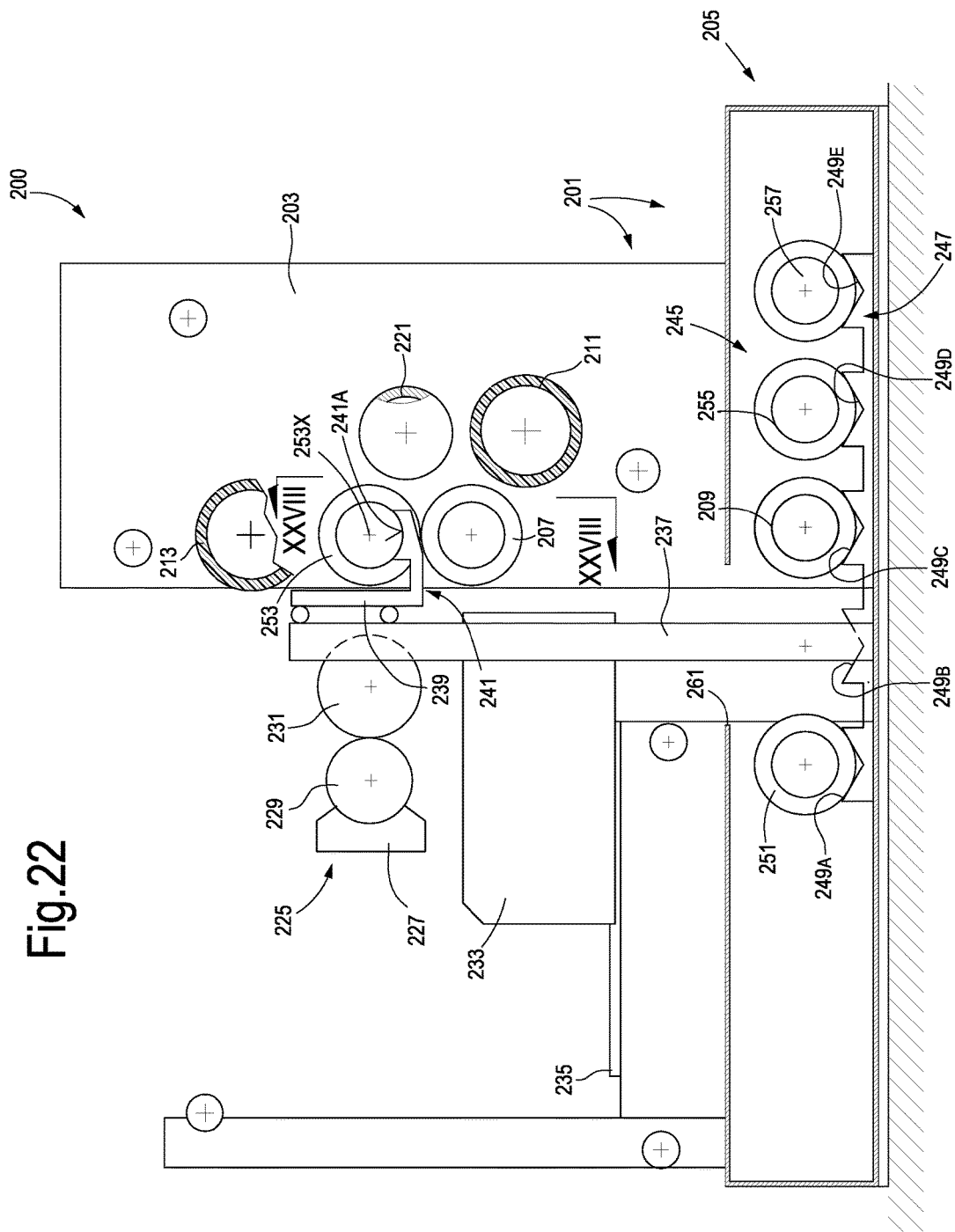
Figure 23:
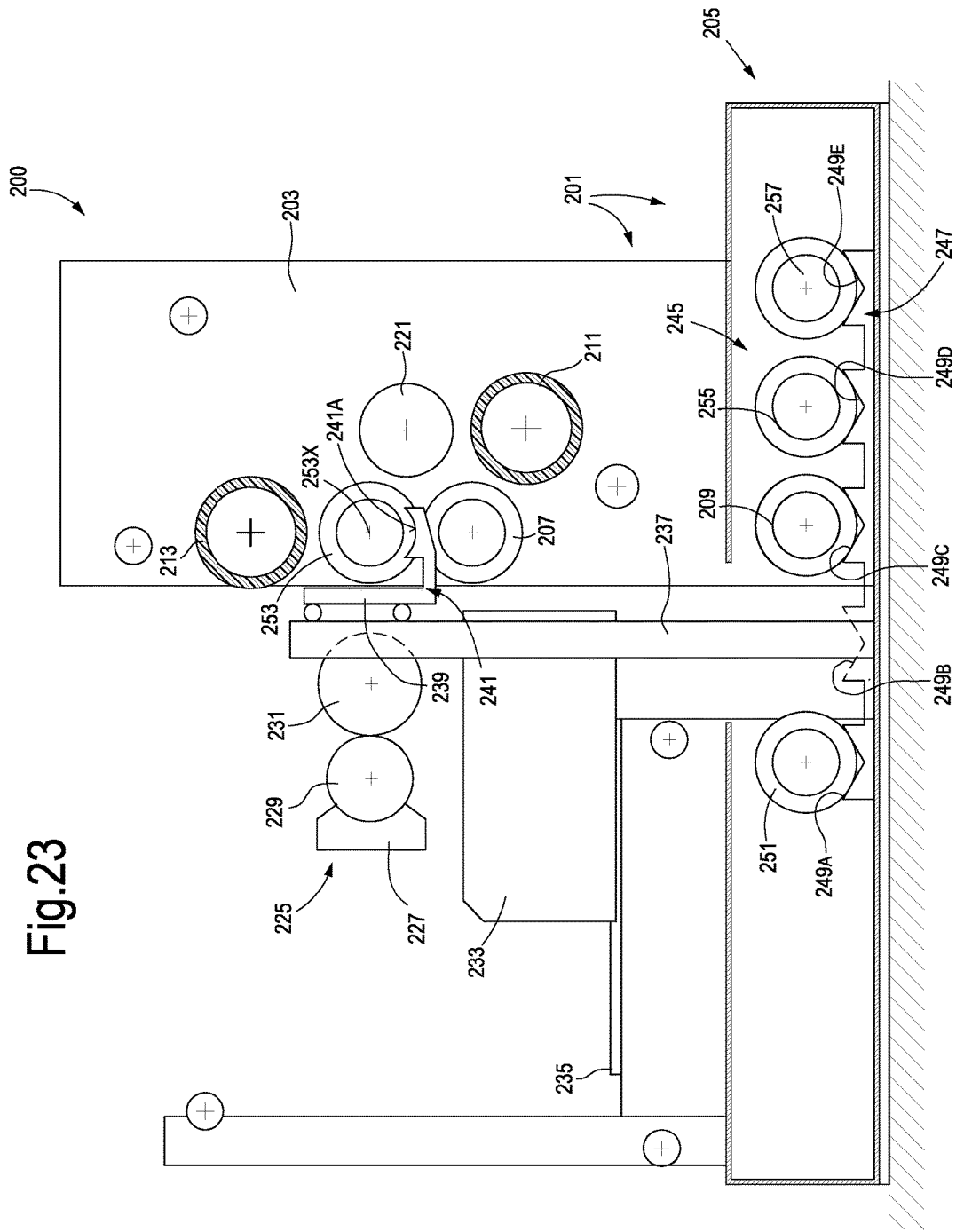

Subsequently, the embossing roller 253 may be lifted by the manipulator 241 as shown in FIG. 21, to bring the axis 253X of the embossing roller 253 to the height of the tailstocks (not shown) carried by the side members 203. FIG. 22 shows the next step, in which the carriage 233 has been translated to move once again next to the side members 203 and carry the embossing roller 253 with its axis 253X into alignment with the axes of the two tailstocks.

Once the position shown in FIG. 22 has been reached, the tailstocks can once again move toward the roller 253 and engage it at the respective ends, so as to allow the manipulator 241 to move away from the embossing roller 253. The movement away may be in the first place a lowering movement from the position shown in FIG. 22 to the position shown in FIG. 23, by which the support elements 241A disengage from the collars or annular ridges 265 of the embossing roller 253.

Figure 24:
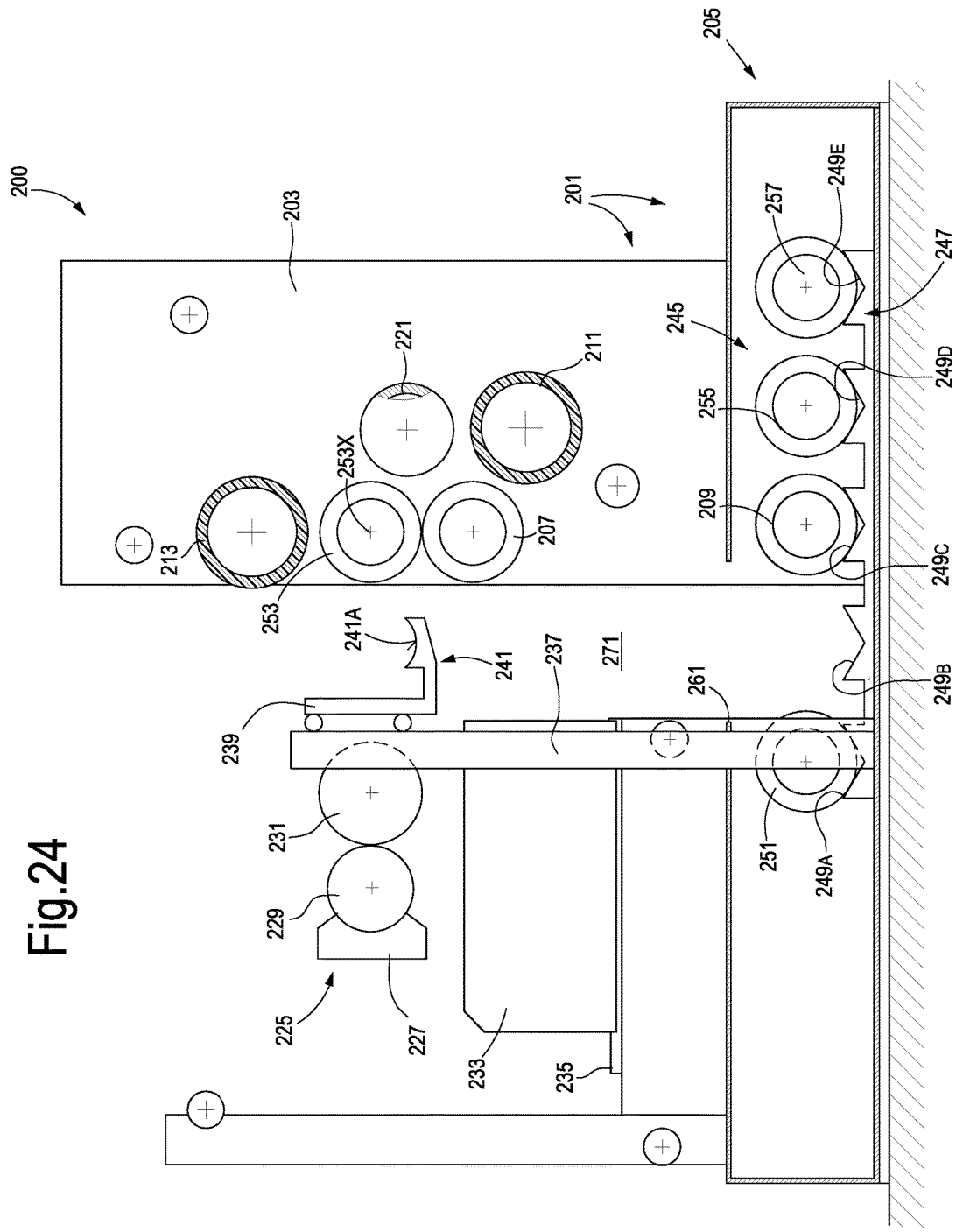

Next, the carriage 233 can once again move away from the embossing rollers 253, 207, as shown in FIG. 24, to re-open the opening 271 and allow the manipulator 241 to be lowered towards the base structure 205, on the inside of which the manipulator 241 can remain housed when the embossing-laminating device 200 resumes operation.

Figure 25:
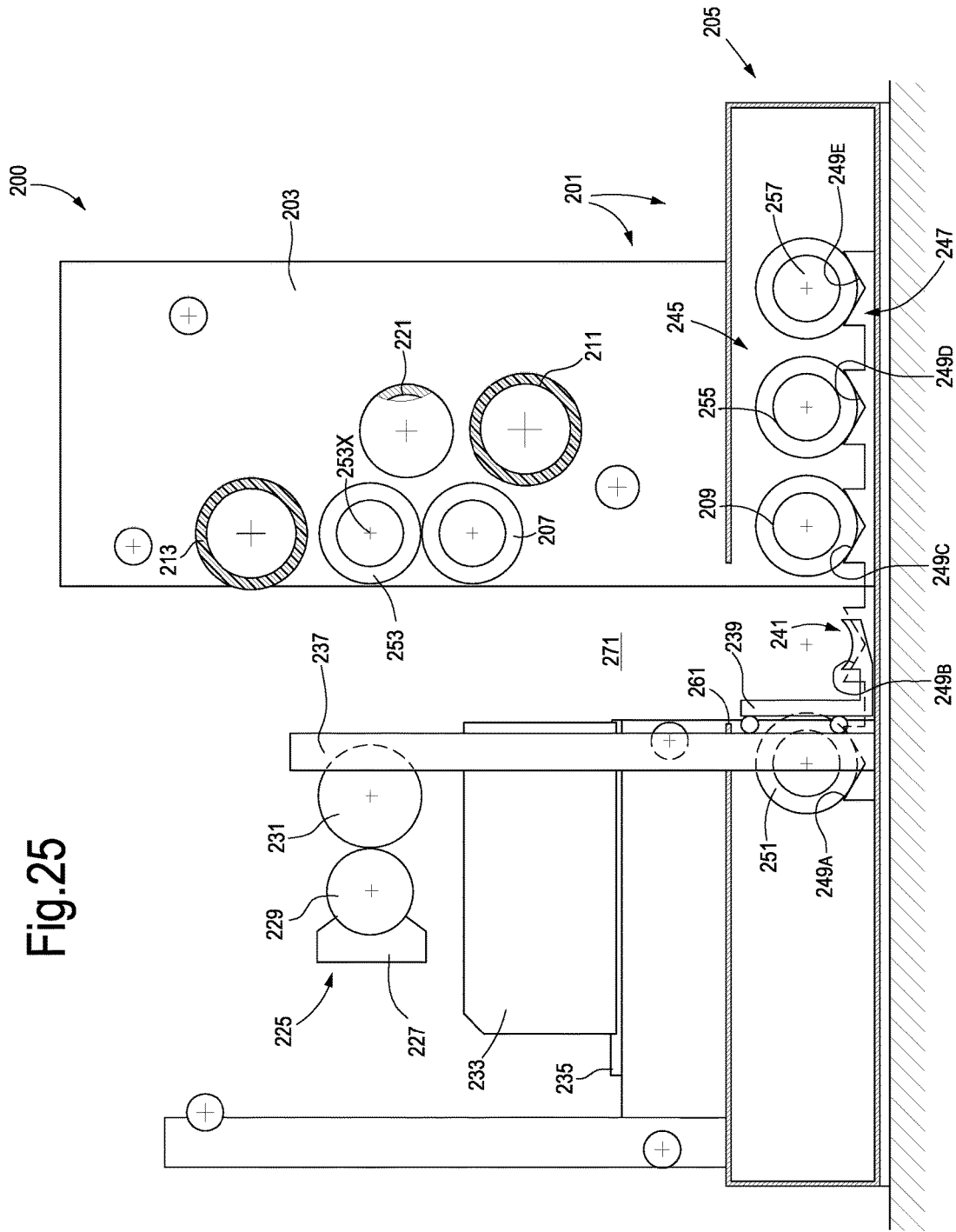
Figure 26:
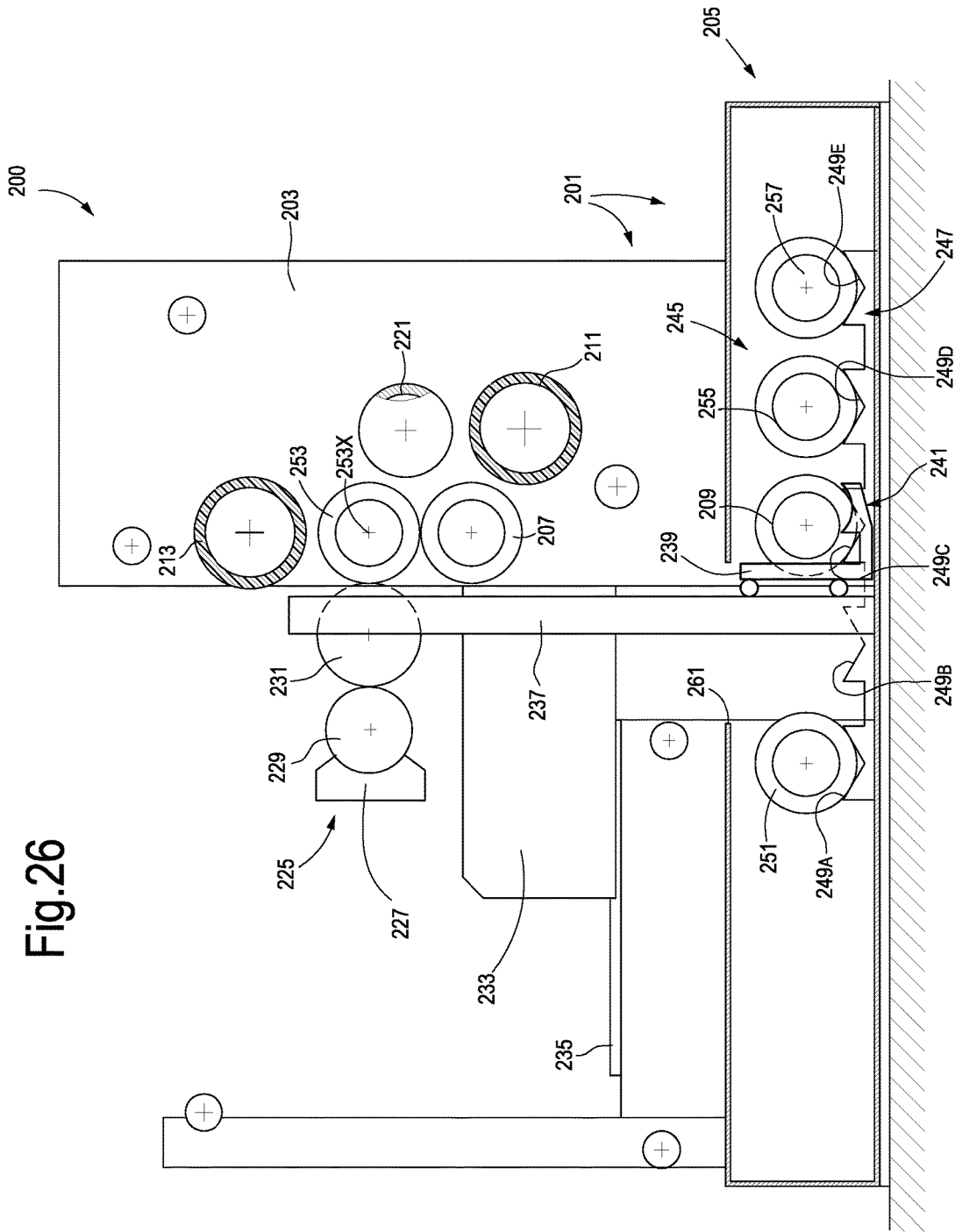

In FIG. 25 the manipulator 241 has been returned to its lower position and, if the first lower embossing roller 207 does not need to be replaced, the manipulator 241 remains in this position while the carriage 233 is once again brought next to the side members 203, until it reaches the position shown in FIG. 26. In the opposite case, if for example the embossing roller 207 also needs to be replaced, the cycle described above may be repeated by picking up the embossing roller 207 by means of the manipulator 241 and positioning it in the seat 249B left free by the embossing roller 253 that has just been positioned in the machine in place of the roller 209. The roller 207 may at this point be replaced with one or other of the remaining embossing rollers 251, 257, 259 that are in the magazine 245.

In the operating cycle illustrated, the first lower embossing roller 207 is not replaced and therefore the embossing-laminating device 200 returns to the position shown in FIG. 26, to allow the introduction of the plies V1, V2 into the respective paths P1, P2 around the embossing rollers 207 and 253. The pressure rollers 211, 213 may be brought to the operating position, i.e. pressed against the respective embossing rollers 207, 253, and the laminating roller 221 is brought to the operating position, pressed against the embossing roller 253.

Figure 27:
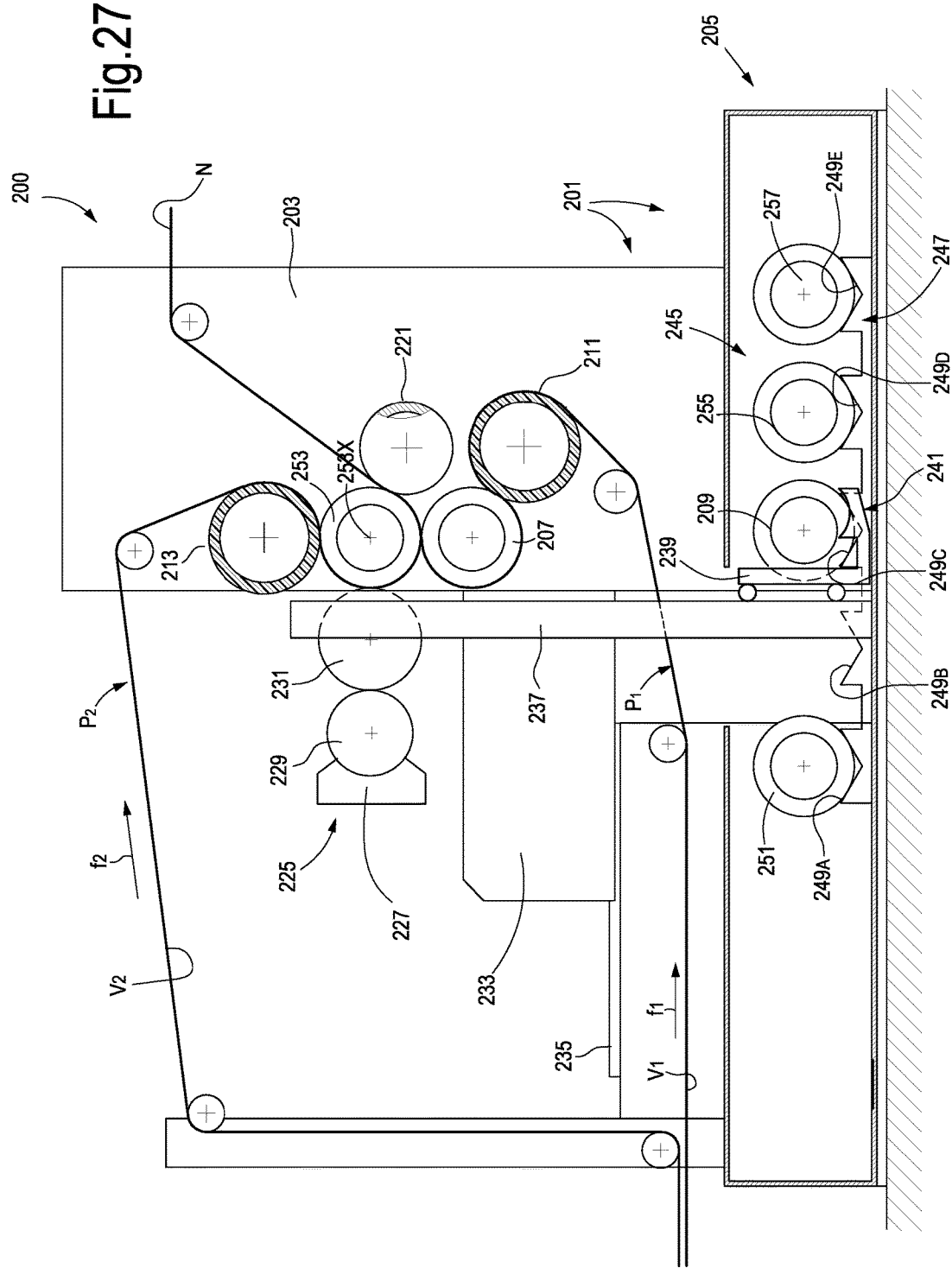

At this point, the embossing-laminating device 200 is once again operational and can resume production of the multi-ply web material N as shown in FIG. 27.

In some embodiments, the unit 247 of the magazine 245 may be provided with a transversal movement, i.e. parallel to the axis of the embossing rollers, so as to be extracted from the housing 205A formed by the base structure 205, for example to replace one or more of the embossing rollers in the magazine 245 with others coming from a storage zone. In some embodiments more movable units 247 acting as shuttles, can be provided, for example having systems allowing them to move in two mutually orthogonal directions, i.e. in the direction of the arrow f247 and in the horizontal direction orthogonal to the direction f247, so as to transfer the part 247 from a storage zone to the embossing-laminating device 200 and vice-versa.

In other embodiments the embossing rollers can be loaded onto the movable unit 247 and unloaded therefrom for example by means of a fork-lift or overhead crane, or by means of any other manipulation system, should the number of embossing rollers housed in the magazine 245 be insufficient to meet all the production needs of the embossing-laminating device 200.

During operation of the embossing device, the magazine 245 is preferably closed to prevent dirt (glue, cellulose fibers, etc.) getting into the magazine.

FIGS. 29 to 32 show a modified embodiment of an embossing-laminating device 200 having a structure similar to that illustrated in FIGS. 13-28. The same reference numbers indicate parts equal or equivalent to those shown in the above-mentioned figures. The main differences between this embodiment and that shown in FIGS. 13-28 will be described below. Operation of the embossing-laminating device in this modified embodiment is substantially the same as that already described with reference to the previous figures.

In the embodiment shown in FIGS. 29-32, respective guides 301 are applied to the two uprights 237, one for each side of the structure. Blocks 303 solidly engage with respective slides 239 on the guides 301, having a similar function to the slide 239 shown in FIGS. 13-28. In the embodiment illustrated in FIGS. 29 to 32, each slide 239 is solidly connected to a female nut 305, which engages with a threaded bar 307 on the respective upright 237, rotatingly supported on the upright. Each threaded bar 307 is rotated by means of a motor 309, for example an electric, hydraulic or other motor. Each threaded bar 307 may be associated with an angular encoder 311, which may be placed at the end of the respective threaded bar 307 opposite to the motor 309. The encoders 311 allows keeping in phase the rotation movement of the threaded bars 307 controlled by the motors 309, so that each slide 239 performs the same movement in the direction of the double arrow f239, i.e. so that the slides 239 move in synchronization in the direction of the double arrow f239.

Each slide may carry an engaging member 241A, the two engaging members 241A forming in combination a manipulator for moving the embossing rollers 207, 209, 251-259. The motors 309 control the synchronous lifting and lowering movement of the engaging members 241A for the manipulation and movement of the embossing rollers.

The side members 203 of the structure 201 of the embossing-laminating device 200 may have two seats 321 and 323, in which the first embossing roller 207 and the second embossing roller 209 engage, in the manner described below.

Each seat 321, 323 is defined by a fixed portion 321A, 323A and a movable portion 321B, 323B. The movable portion 321B is provided with an oscillating movement in the direction of the double arrow f321, which may be controlled by an actuator, for example an electric motor, a hydraulic motor or another actuator, labeled 325. Similarly, the movable portion 323B of the seat 323 is provided with a movement in the direction of the double arrow f323, controlled by a respective actuator, for example an electric or hydraulic motor 327. The arrangement of the movable portions 321B, 323B and of the respective motors 325, 327 is replicated on the two side members 203, so as to define two opposed seats 321, 323, respectively, for the first embossing roller 207 and for the second embossing roller 209.

In some embodiments, for greater safety, the movable portions 321B, 323B of the seats 321, 323 may be provided with mechanisms for locking in the closed seat position, for example a gripper, a latch or another locking mechanism, e.g. with hydraulic or mechanical control.

Figure 32:
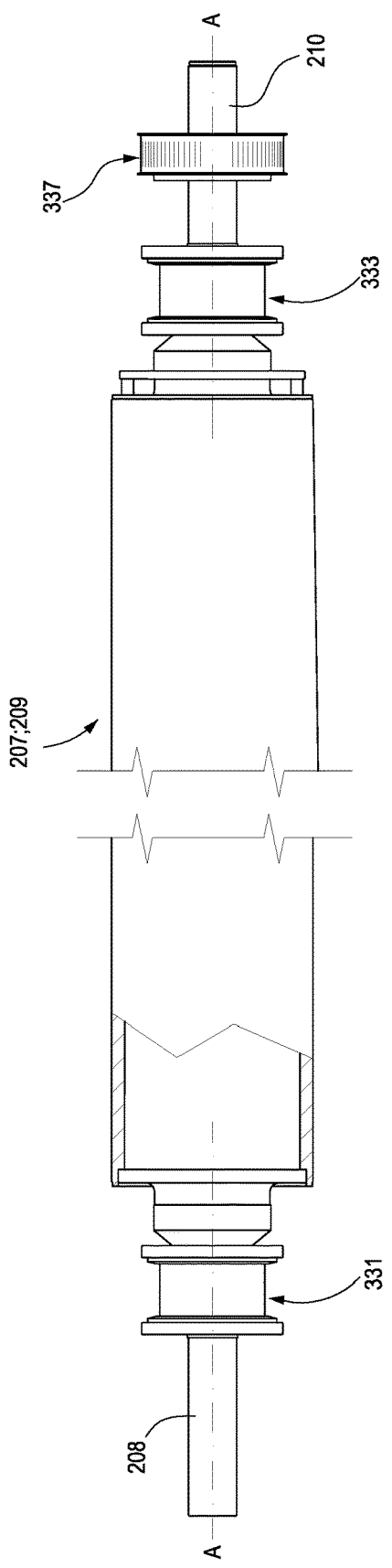
FIG. 32 shows a partial cross-section view of an embossing roller.

As can be seen in particular in FIG. 32, a generic embossing roller 207, 209 may have two ends or necks 208, 210, each of which is provided with a respective support and rotation bearing 331, 333. When the embossing roller 207, 209 is mounted by means of the manipulator 241 on the side members 203 of the load bearing structure of the embossing-laminating device, the two support and rotation bearings 331, 333 of the embossing roller are inserted in the seats 321 or 323 on the two op-posing side members 203. To that end, to enable insertion of the roller, the movable portions 321B or 323B are opened as shown in particular in the accompanying drawing, in which the portions 323B of the seats 323 are open to allow the insertion/removal of the respective embossing roller 209, while le portions 321B are closed to hold the operating roller 207 in the operating position.

Movement of the embossing rollers 207, 209 by means of the manipulator 241 follows trajectories substantially corresponding to those described with reference to FIGS. 13-28. Movement of the manipulator 241, and therefore of the embossing roller carried thereby, is synchronized with the opening and closing movement of the movable portions 321B, 323B of the seats 321 and 323. More particularly, the aforementioned movements are coordinated such that advantageously the movable portion 321B or 323B of the respective seat 321, 323 is opened only after the ends or necks 208, 210 of the respective embossing roller 207, 209 have been engaged by the op-posing engaging members 241A of the manipulator 241. Once the necks or ends 208, 210 of the embossing roller 207, 209 have been engaged and the movable portions 321B or 323B of the respective seats 321, 323 have been opened, the embossing roller may be removed. The new embossing roller taken for example from the magazine 245 underneath will be inserted by means of the manipulator 241 with a movement for neck 208, 210 insertion, once again in a direction orthogonal to the axis of rotation A-A of the roller, while the movable portions 321B or 323B of the seat 321 or 323 are open. Only after the closure of these movable portions of the seats, is the manipulator 241 disengaged from the embossing roller that has just been mounted in its seat.

The seats 321, 323 with the respective movable portions 321B, 323B and the actuators 325, 327, and the support and rotation bearings 331, 333 constitute part of a support and rotation system for the embossing rollers 207, 209. This support and rotation system constitutes an alternative embodiment to the support and rotation system formed by the tailstocks described with reference to the previous embodiments. A similar support and rotation system as illustrated in FIGS. 29 to 32 may also be used in the embodiments illustrated in FIGS. 1 to 28.

To transmit the rotation movement to each embossing roller 207, 209, without obstructing the extraction and insertion of the embossing rollers, according to some embodiments each embossing roller 207, 209 may have a pulley 337 (see FIG. 32) which may be fitted onto one or other of the two ends or necks 208, 210. Each pulley 337 constitutes part of a mechanical transmission for rotating the respective embossing roller 207, 209 and co-acts with a corresponding continuous flexible member carried on one or other of the two side members 203 of the load bearing structure of the embossing-laminating device.

Figure 31:
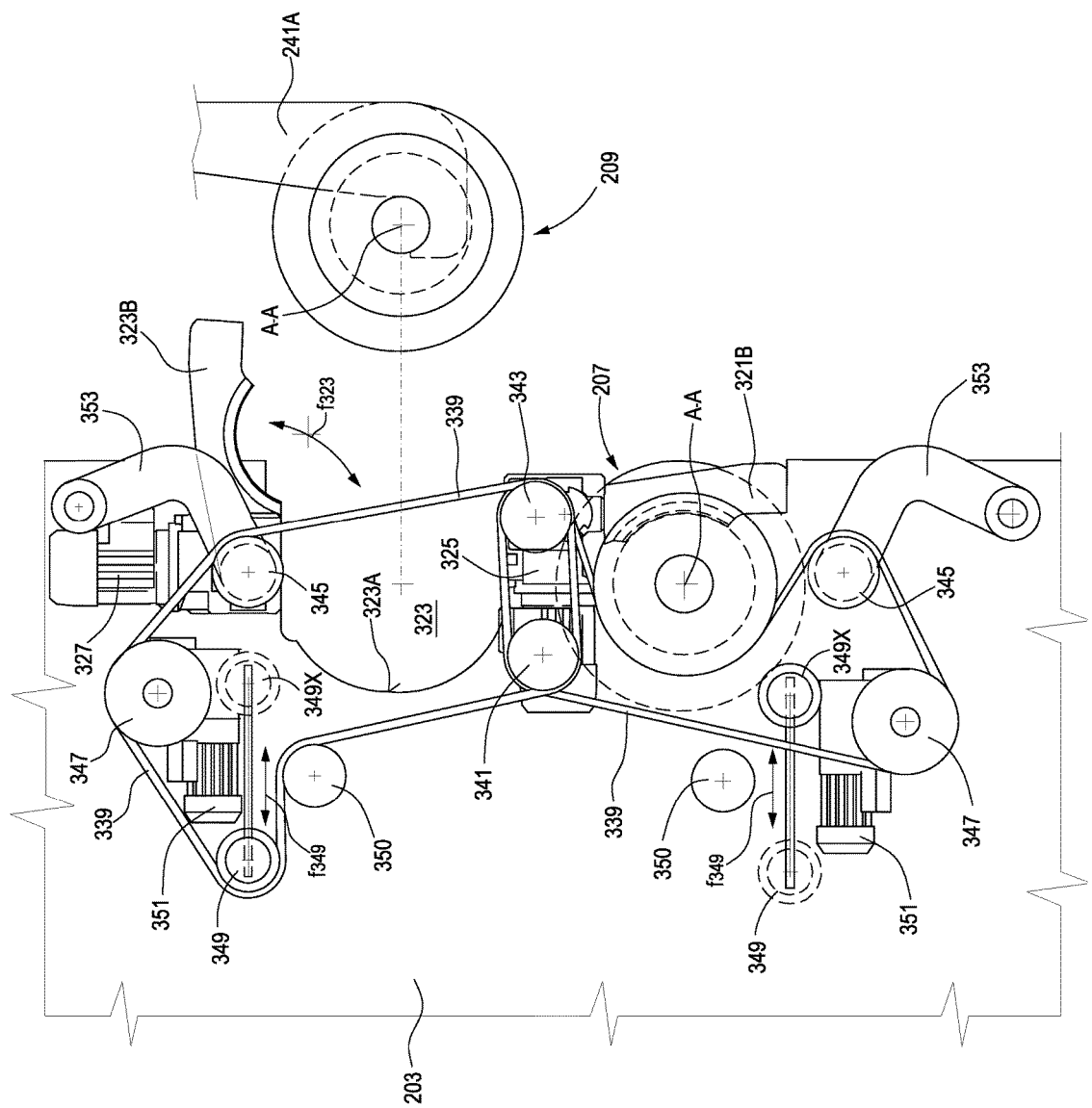
FIG. 31 shows a portion of the side of the embossing-laminating device opposite that shown in FIGS. 29 and 30.

By way of example, FIG. 31 shows two continuous flexible members 339, arranged in configurations that are substantially symmetrical with respect to a horizontal plane, and are intended to rotate the two overlying embossing rollers 207, 209. Each continuous flexible member 339 may in substance consist of a dual-toothed belt, i.e. a belt with teeth on both sides. In other embodiments, each continuous flexible member 339 may comprise a chain.

Advantageously, each continuous flexible member 339 forms a closed path with respect to which the axis of rotation A-A of the respective roller 207 and 209 is external, i.e. a path configured so as not to encircle the axis of rotation A-A of the respective embossing roller.

Each continuous flexible member 339 may be entrained around pulleys or return wheels 341, 343, 345, 347, 349, 350. At least one of these return members 341-350 is motorized and preferably one or two have movable axes. In the embodiment illustrated, each return member 347 is motorized and can be driven by a respective motor 351, which constitutes the motorization that rotates the respective embossing roller 207, 209. The return member 345 may be mounted on a pivoting arm 353 and may act as a tensioner, while the return member 349 may be movable in the direction of the double arrow f349 to take two alternative positions, the second of which is indicated with 349X in FIG. 31. In this figure, the continuous flexible member 339 associated with the embossing roller 207 is shown in the operating position, with the embossing roller 207 mounted between the side members 203, while the continuous flexible member 339 associated with the embossing roller 209 is in the position assumed when the respective embossing roller 209 has been removed from its seat.

In operating conditions, the continuous flexible member 339 partially wraps around the pulley 337 of the respective embossing roller 207, 209 and is tightened by means of a return member 345. The return member 349 is in the position 349X. When the embossing roller 207, 209 needs to be removed, the return member 349 moves from the position 349X to the position indicated with 349 in the figure, so as to tighten the respective flexible member 339 bringing it to a position tangential to the return members 343, 345, while the pulley 337 is removed as a result of the moving away of the respective embossing roller 207, 209.

In this manner it is possible to transmit a rotation movement to each embossing roller 207, 209, by means of the respective motorization 351, and at the same time to allow the removal and insertion of each embossing roller 207, 209 orthogonal to its axis, so that it can be extracted from and reinserted in its seat, without the motion transmission interfering with the insertion and removal movement of the respective embossing roller.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. An embossing-laminating device comprising:
   a load bearing structure comprising at least two side members;
   a first path, for a first ply of web material;
   a second path, for a second ply of web material;
   along the first path, a first pressure roller, co-acting with a first interchangeable embossing roller, the first interchangeable embossing roller and the first pressure roller defining a first embossing nip for the first ply of web material;
   along the second path, a second pressure roller, co-acting with a second interchangeable embossing roller, the second interchangeable embossing roller and the second pressure roller defining a second embossing nip for the second ply of web material;
   a magazine comprising a plurality of seats for a plurality of interchangeable embossing rollers;
   at least one first manipulator for replacing interchangeable embossing rollers;

wherein the first manipulator is configured and controlled to selectively engage with an interchangeable embossing roller for moving said interchangeable embossing roller and release of the interchangeable embossing roller, and to selectively: take an interchangeable embossing roller from an operating position, transfer the interchangeable embossing roller to the magazine and release the interchangeable embossing roller in one of the plurality of seats of the magazine, take another interchangeable embossing roller from a respective one of said plurality of seats, transfer and release the interchangeable embossing roller into an operating position.

2. The embossing-laminating device according to claim 1, further comprising a first support and rotation system for the first interchangeable embossing roller and a second support and rotation system for the second interchangeable embossing roller, and wherein said first support and rotation system and said second support and rotation system are configured to allow removal and replacement of the first interchangeable embossing roller and the second interchangeable embossing roller, separately from one another, by said at least one first manipulator.

3. The embossing-laminating device according to claim 2, wherein the first pressure roller and the second pressure roller are each supported movably with respect to the load bearing structure, to take up an operating position, wherein a respective one of the first pressure roller and the second pressure roller is pressed against a respective interchangeable embossing roller, and an open position, wherein the respective one of the first pressure roller and the second pressure roller is spaced from the respective interchangeable embossing roller.

4. The embossing-laminating device according to claim 1, wherein the first manipulator is arranged between the side members of the load bearing structure, between which the first pressure roller, the second pressure roller, the first interchangeable embossing roller, the second interchangeable embossing roller and the magazine are arranged.

5. The embossing-laminating device according to claim 2, wherein the first manipulator is arranged between the side members of the load bearing structure, between which the first pressure roller, the second pressure roller, the first interchangeable embossing roller, the second interchangeable embossing roller and the magazine are arranged.

6. The embossing-laminating device according to claim 1, wherein the first pressure roller and the second pressure roller are each supported movably with respect to the load bearing structure, to take up an operating position, wherein a respective one of the first pressure roller and the second pressure roller is pressed against a respective interchangeable embossing roller, and an open position, wherein the respective one of the first pressure roller and the second pressure roller is spaced from the respective interchangeable embossing roller.

7. The embossing-laminating device according to claim 1, wherein the first manipulator comprises opposed support members of a respective interchangeable embossing roller, which engage with respective ends of the respective interchangeable embossing roller to take the respective interchangeable embossing roller and release the respective interchangeable embossing roller in the magazine, and vice-versa.

8. The embossing-laminating device according to claim 1, wherein the first manipulator is arranged and configured to manipulate and replace the first interchangeable embossing roller and the second interchangeable embossing roller with respective interchangeable embossing rollers contained in the magazine.

9. The embossing-laminating device according to claim 1, wherein the first manipulator comprises an elevator movable between a first height, at which the first interchangeable embossing roller or the second interchangeable embossing roller is located, and a second height, lower than the first height, at which the magazine is located.

10. The embossing-laminating device according to claim 1, wherein the magazine is located at a lower height with respect to the first interchangeable embossing roller and to the second interchangeable embossing roller and with respect to the first pressure roller and to the second pressure roller.

11. The embossing-laminating device according to claim 1, wherein the magazine comprises a plurality of seats movable orthogonally to axes of the first interchangeable embossing roller and of the second interchangeable embossing roller with a translational movement in a substantially horizontal direction.

12. The embossing-laminating device according to claim 1, wherein the first manipulator is provided with a lifting and lowering movement between a lower position, at which the magazine is located, and one or more higher positions at which the first interchangeable embossing roller or the second interchangeable embossing roller is located, and wherein the first manipulator is provided with a movement toward or away from the first interchangeable embossing roller or the second interchangeable embossing roller, the movement toward or away from being a translational movement substantially transverse with respect to the lifting and lowering movement.

13. The embossing-laminating device according to claim 1, wherein the first interchangeable embossing roller along the first path and the second interchangeable embossing roller along the second path are rotatingly constrained to the load bearing structure by reversible constraining members, configured to disengage a respective interchangeable embossing roller and allow removal thereof by the manipulator and replacement thereof with an interchangeable embossing roller taken and transferred from the magazine by said manipulator.

14. The embossing-laminating device according to claim 13, wherein the reversible constraining members comprise, for each interchangeable embossing roller, a pair of openable seats, into which support bearings for a respective interchangeable embossing roller are inserted, and wherein each openable seat comprises an actuator for controlling opening and closing of the openable seat.

15. The embossing-laminating device according claim 1, wherein each interchangeable embossing roller is associated with a transmission for rotary movement from a motorization device, said transmission being configured to allow removal of the interchangeable embossing roller and replacement thereof with another interchangeable embossing roller taken from the magazine by a movement of the interchangeable embossing roller in a direction orthogonal to a rotation axis of the interchangeable embossing roller.

16. The embossing-laminating device according to claim 15, wherein the transmission comprises, for each interchangeable embossing roller, a pulley fitted onto a shaft of the interchangeable embossing roller and a continuous flexible member, configured to partially wrap around the pulley when the interchangeable embossing roller is mounted in an operating position, said continuous flexible member forming a closed path that does not surround the rotation axis of the interchangeable embossing roller, when the interchangeable embossing roller is mounted in an operating position.

17. The embossing-laminating device according to claim 1, wherein each interchangeable embossing roller comprises a pair of support and rotation bearings, which are moved with the interchangeable embossing roller when the interchangeable embossing roller is transferred to or from the magazine.

18. The embossing-laminating device according to claim 1, wherein the magazine is integrated in the bearing structure of the embossing-laminating unit, and the manipulator is supported by the bearing structure.

19. The embossing-laminating device comprising:
   a load bearing structure comprising at least two side members;
   a first path, for a first ply of web material;
   a second path, for a second ply of web material;
   along the first path, a first pressure roller, co-acting with a first interchangeable embossing roller, the first interchangeable embossing roller and the first pressure roller defining a first embossing nip for the first ply of web material;
   along the second path, a second pressure roller, co-acting with a second interchangeable embossing roller, the second interchangeable embossing roller and the second pressure roller defining a second embossing nip for the second ply of web material;
   a magazine comprising a plurality of seats for a plurality of interchangeable embossing rollers;
   at least one first manipulator for replacing interchangeable embossing rollers;
   wherein the at least one first manipulator comprises at least one slide provided with a lifting and lowering movement, and a carriage provided with a movement transverse to the lifting and lowering movement, to move toward and away from the first interchangeable embossing roller and the second interchangeable embossing roller, the magazine being located under the carriage.

20. The embossing-laminating device according to claim 19, wherein the magazine is located under the first embossing nip and the second embossing nip.

21. The embossing-laminating device according to claim 19, wherein the carriage carries a gluing unit configured to apply glue to one of said first ply or said second ply.

22. The embossing-laminating device comprising:
   a load bearing structure comprising at least two side members;
   a first path, for a first ply of web material;
   a second path, for a second ply of web material;
   along the first path, a first pressure roller, co-acting with a first interchangeable embossing roller, the first interchangeable embossing roller and the first pressure roller defining a first embossing nip for the first ply of web material;
   along the second path, a second pressure roller, co-acting with a second interchangeable embossing roller, the second interchangeable embossing roller and the second pressure roller defining a second embossing nip for the second ply of web material;
   a magazine comprising a plurality of seats for a plurality of interchangeable embossing rollers;
   at least one first manipulator for replacing interchangeable embossing rollers;
   wherein the first interchangeable embossing roller along the first path and the second interchangeable embossing roller along the second path are rotatingly constrained to the load bearing structure by reversible constraining members, configured to disengage a respective interchangeable embossing roller and allow removal thereof by the manipulator and replacement thereof with an interchangeable embossing roller taken and transferred from the magazine by said manipulator;
   wherein the reversible constraining members comprise, for each interchangeable embossing roller, a pair of openable seats, into which support bearings for a respective interchangeable embossing roller are inserted, and wherein each openable seat comprises an actuator for controlling opening and closing of the openable seat; and
   wherein the openable seats and the first manipulator are configured and controlled so that opening and closing of the openable seats are coordinated with movements of the manipulator, so that the openable seats open only once an interchangeable embossing roller has been engaged by the first manipulator when the embossing roller has to be removed from the openable seats; and that the openable seats close before the manipulator releases the embossing roller when the embossing roller has to be inserted in the openable seats.

* * * * *